US00RE34737E

United States Patent [19]

Niwa et al.

[11] E Patent Number: Re. 34,737

[45] Reissued Date of Patent: Sep. 20, 1994

[54] DYE TRANSFER SHEET FOR SUBLIMATION HEAT-SENSITIVE TRANSFER RECORDING

[75] Inventors: Toshio Niwa, Yokohama; Yukichi Murata, Sagamihara; Shuichi Maeda, Saitama, all of Japan

[73] Assignees: Mitsubishi Kasei Corporation; Matsushita Electric Industrial Co., Ltd., both of Tokyo, Japan

[21] Appl. No.: 696,929

[22] Filed: May 8, 1991

Related U.S. Patent Documents

Reissue of:

[64] Patent No.: 4,829,047
Issued: May 9, 1989
Appl. No.: 8,268
Filed: Jan. 29, 1987

U.S. Applications:

[63] Continuation-in-part of Ser. No. 749,408, Jun. 27, 1985, abandoned.

[30] Foreign Application Priority Data

| | | | |
|---|---|---|---|
| Jul. 11, 1984 | [JP] | Japan | 59-143928 |
| Jul. 24, 1984 | [JP] | Japan | 59-153742 |
| Jul. 30, 1984 | [JP] | Japan | 59-160135 |
| Aug. 16, 1984 | [JP] | Japan | 59-170740 |
| Aug. 30, 1984 | [JP] | Japan | 59-181230 |
| Dec. 21, 1984 | [JP] | Japan | 59-270495 |
| Apr. 12, 1985 | [JP] | Japan | 60-78016 |

[51] Int. Cl.[5] ..... B41M 5/035; B41M 5/38

[52] U.S. Cl. ..... 503/227; 428/195; 428/211; 428/473.5; 428/474.4; 428/480; 428/913; 428/914

[58] Field of Search ..... 8/471; 428/195, 211, 428/473.5, 474.4, 480, 913, 914; 503/227

[56] References Cited

U.S. PATENT DOCUMENTS

| | | | |
|---|---|---|---|
| 4,097,230 | 6/1978 | Sandhu | 503/227 |
| 4,614,521 | 9/1986 | Niwa et al. | 8/471 |
| 4,840,870 | 6/1989 | Iwagaki et al. | 430/201 |

FOREIGN PATENT DOCUMENTS

| | | | |
|---|---|---|---|
| 2565528 | 12/1985 | France | 503/227 |
| 1148096 | 7/1986 | Japan | 503/227 |
| 1305442 | 1/1973 | United Kingdom | 8/405 |
| 1445797 | 8/1976 | United Kingdom | 8/405 |
| 1449378 | 9/1976 | United Kingdom | 8/405 |
| 1449379 | 9/1976 | United Kingdom | 8/405 |
| 1454830 | 11/1976 | United Kingdom | 430/348 |
| 2161824A | 1/1986 | United Kingdom | 503/227 |

*Primary Examiner*—B. Hamilton Hess
*Attorney, Agent, or Firm*—Oblon, Spivak, McClelland, Maier & Neustadt

[57] ABSTRACT

A dye transfer sheet for heat-sensitive transfer recording which has an ink layer containing a sublimable dye formed on a base film, said sublimable dye being of the formula:

wherein —B represents

—$Z^1$ and —$Z^2$ each represents hydrogen, alkyl option-

Abstract continued on next page.

ABSTRACT ally substituted by fluorine, alkoxy, halogen or —NHB, K represents

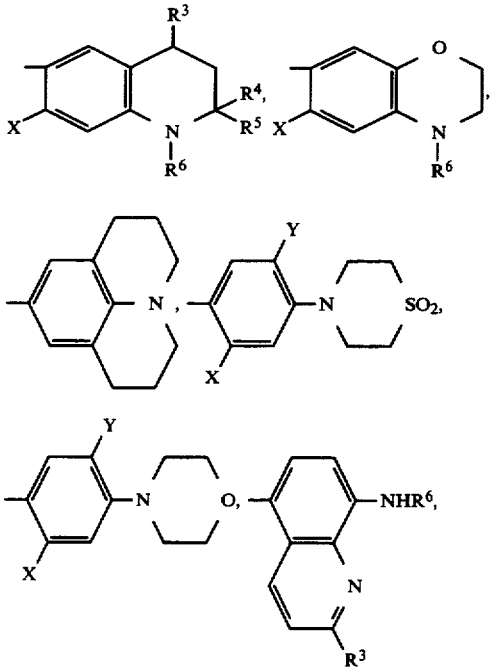

-continued

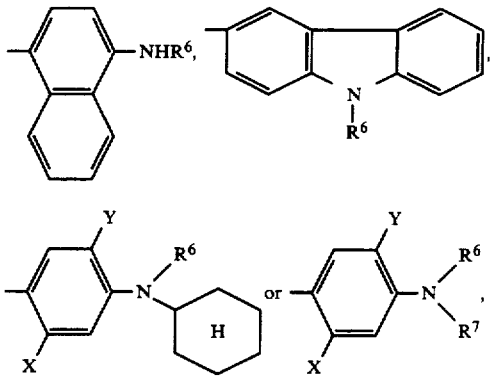

—$R^1$, —$R^2$, —$R^6$ and —$R^7$ each represents hydrogen, $C_1$–$C_8$ substituted or unsubstituted alkyl, substituted or unsubstituted vinyl, allyl or aryl, —$R^3$, —$R^4$ and —$R^5$ each represents hydrogen or methyl, —X represents hydrogen, alkyl optionally substituted by fluorine, alkoxy, formylamino, alkylcarbonylamino optionally substituted by fluorine, arylcarbonylamino or halogen, and —Y represents hydrogen, alkyl optionally substituted by fluorine, alkoxy or halogen.

168 Claims, No Drawings

DYE TRANSFER SHEET FOR SUBLIMATION HEAT-SENSITIVE TRANSFER RECORDING

Matter enclosed in heavy brackets [ ] appears in the original patent but forms no part of this reissue specification; matter printed in italics indicates the additions made by reissue.

This application is a continuation-in-part application of U.S. patent application Ser. No. 749,408 filed June 27, 1985.

BACKGROUND OF THE INVENTION

1. Field of the Invention

This invention relates to a dye transfer sheet for use in sublimation heat-sensitive transfer recording.

2. Description of the Prior Art

Heretofore, techniques for color recording facsimile printers, copying machines, television images etc. have been sought, and color recording techniques by electron photography, ink-jet process, heat-sensitive transfer etc. have been under study.

The heat-sensitive transfer recording process is considered more advantageous as compared with other processes since the maintenance and operation of the device are easier and the device and expendable supplies are less expensive.

The heat-sensitive transfer process is roughly classified into two processes, that is, a molten heat-sensitive transfer recording process which comprises heating a transfer sheet having a heat-melting ink layer formed on a base film by a heat-sensitive head to melt said ink thereby transfer recording onto a recording body, and a sublimation heat-sensitive transfer recording process which comprises heating a transfer sheet having an ink layer containing a sublimable dye formed on a base film to sublime the dye thereby transfer recording onto a recording body.

And, said sublimation heat-sensitive transfer recording process is believed suitable for full color recording since it is possible to control the amount of the dye to be sublimed and transferred by controlling the energy applied to the heat-sensitive head and hence gradation expression is easy.

In general, full color recording is conducted by using tricolor dyes, that is, a cyan color dye, a magenta dye and a yellow color dye, and sometimes, four color dyes, that is, these three plus a black color dye, but in order to obtain full color recording having good color reproducibility, the following requirements must be satisfied: the respective dyes easily sublime under the operational conditions of the heat-sensitive recording head, do not undergo thermal decomposition under the operational conditions of the heat-sensitive recording head, have preferred hues for color reproduction, have great molecular absorption coefficients, are stable against light, moisture, chemicals etc., are easily sythesized, have excellent adaptability to inks, etc.

However, no conventional cyan dye has satisfied the above requirements.

Accordingly, one object of this invention aims to provide cyan color dyes which fulfill such requirements that they easily sublime under the operational conditions of the heat-sensitive recording head, do not undergo thermal decomposition under the operational conditions of the heat-sensitive recording head, are stable against light, are easily synthesized, are readily and uniformly dissolved or dispersed to prepare an ink of a high concentration, etc. Another object of this invention is to provide a dye transfer sheet which has an ink layer containing such cyan color dyes coated on a base film.

SUMMARY OF THE INVENTION

The gist of this invention resides in a dye transfer sheet for heat-sensitive transfer recording which has an ink layer containing a sublimable dye coated on a base film, said sublimable dye being of the formula [I].

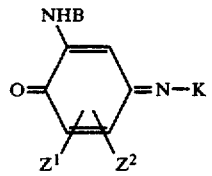

[I]

wherein —B represents

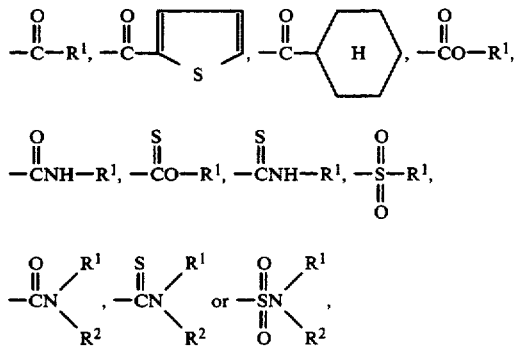

—$Z^1$ and —$Z^2$ each represents hydrogen, alkyl optionally substituted by fluorine, alkoxy, halogen or —NHB, K represents

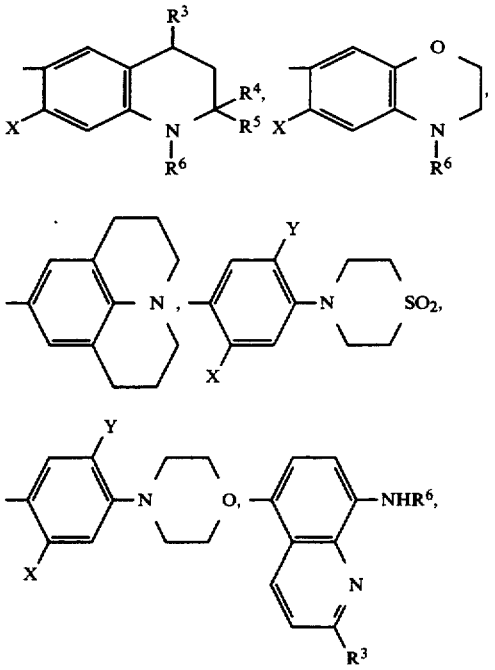

-continued

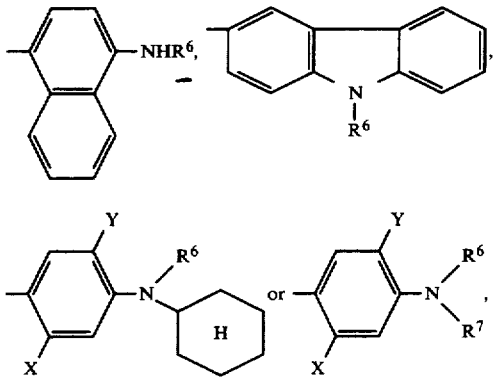

—$R^1$, —$R^2$, —$R^6$ and —$R^7$ each represents hydrogen $C_1$–$C_8$ substituted or unsubstituted alkyl, substituted or unsubstituted vinyl, allyl or aryl, —$R^3$, —$R^4$ and —$R^5$ each represents hydrogen or methyl, —X represents hydrogen, alkyl optionally substituted by fluorine, alkoxy, formylamino, alkylcarbonylamino optionally substituted by fluorine, arylcarbonylamino or halogen, and —Y represents hydrogen, alkyl optionally substituted by fluorine, alkoxy or halogen.

DETAILED DESCRIPTION OF THE INVENTION

Of the dyes for heat-sensitive transfer recording of the above formula [I] of this invention, those of the formulae [II]–[IX] shown below are preferred dyes for heat-sensitive transfer recording.

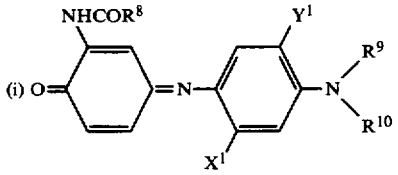

[II]

wherein —$X^1$ represents hydrogen, methyl, methoxy, formylamino, acetylamino, propionylamino, chlorine, bromine, iodine or fluorine, —$Y^1$ represents hydrogen, methoxy, ethoxy, chlorine, bromine, iodine, fluorine or methyl, and —$R^8$, —$R^9$ and —$R^{10}$ each represents hydrogen, $C_1$–$C_8$ substituted or unsubstituted alkyl, allyl or aryl;

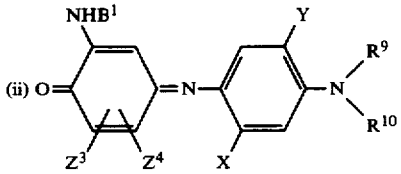

[III]

wherein —X, —Y, —$R^9$ and —$R^{10}$ are as defined above, —$B^1$ represents

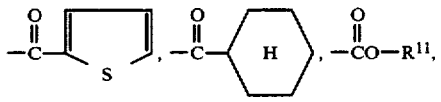

-continued

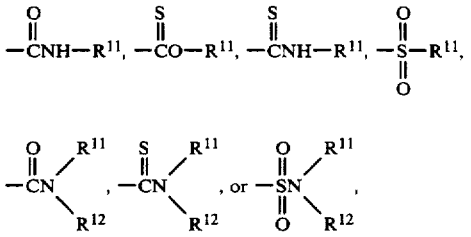

—$Z^3$ and —$Z^4$ each represents hydrogen, alkyl optionally substituted by fluorine, alkoxy or halogen, and —$R^{11}$ and —$R^{12}$ each represents $C_1$–$C_8$ substituted or unsubstituted alkyl or aryl.

In the above formula [III], examples of the substituents for the substituted alkyl include alkoxy, hydroxy, aryl etc. Of the dyes of the above formula [III], especially preferred are those wherein —X, —Y, —$Z^3$ and —$Z^4$ are each hydrogen, methyl, methoxy, ethoxy, chlorine, bromine or trifluoromethyl, —$R^9$ and —$R^{10}$ are each hydrogen, hydroxyalkyl, aralkyl or $C_1$–$C_6$ alkyl, —$B^1$ is

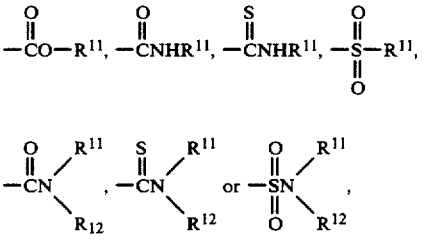

and —$R^{11}$ and —$R^{12}$ are each $C_1$–$C_4$ alkyl.

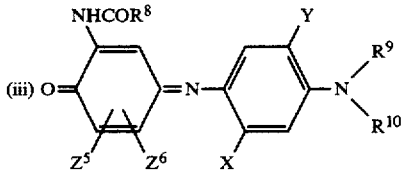

[IV]

wherein —X, —Y, —$R^8$, —$R^9$ and —$R^{10}$ are as defined above, and —$Z^5$ and —$Z^6$ each represents alkyl optionally substituted by fluorine, alkoxy or halogen.

In the above formula [IV], examples of the substituents for the substituted alkyl represented by —$R^8$, —$R^9$ and —$R^{10}$ include alkoxy, alkoxyalkoxy, aryl, aryloxy, tetrahydrofurfuryl, alkylcarbonyloxy, alkoxycarbonyl, alkoxycarbonyloxy, hydroxy, cyano, halogen etc. Of the dyes of the above formula [IV], especially preferred are those wherein —X and —Y are each hydrogen, methyl, methoxy, ethoxy, chlorine, bromine or trifluoromethyl, —$Z^5$ and —$Z^6$ are each methyl, methoxy, ethoxy, chlorine, bromine or trifluoromethyl, —$R^8$ is $C_1$–$C_6$ alkyl, trifluoromethyl, perfluoroethyl or perfluoropropyl, and —$R^9$ and —$R^{10}$ are each hydrogen, hydroxyalkyl, aralkyl or $C_1$–$C_6$ alkyl.

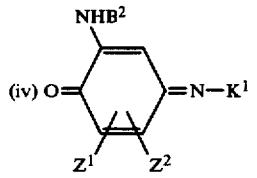

[V]

wherein —$Z^1$ and —$Z^2$ are as defined above, —$B^2$ represents

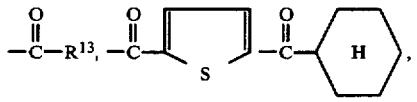

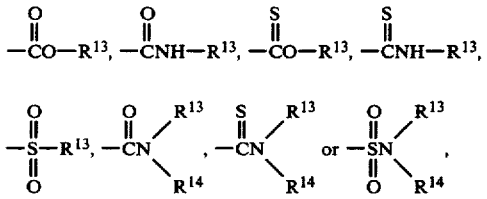

—$K^1$ represents

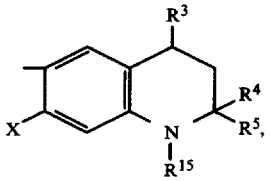

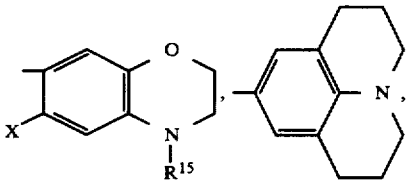

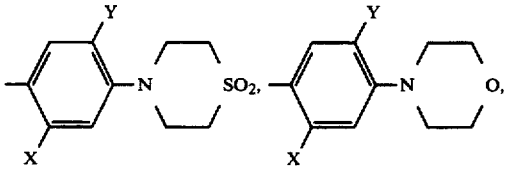

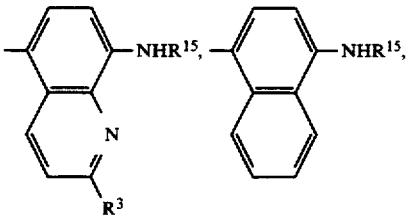

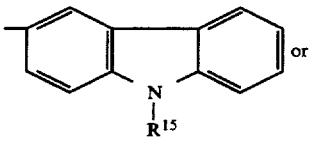

-continued

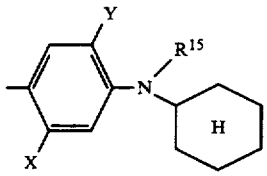

, —$R^{13}$, —$R^{14}$ and —$R^{15}$ each represents $C_1$–$C_8$ substituted or unsubstituted alkyl.

In the above formula [V], examples of the substituents for the substituted alkyl represented by —$R^{13}$, —$R^{14}$ and —$R^{15}$ include halogen, vinyl, alkoxy etc. Of the dyes of the above formula [V], especially preferred are those wherein —$B^2$ is

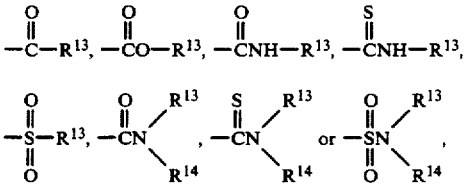

—$Z^1$ and —$Z^2$ are each hydrogen, methyl, trifluoromethyl, methoxy, chlorine, bromine,

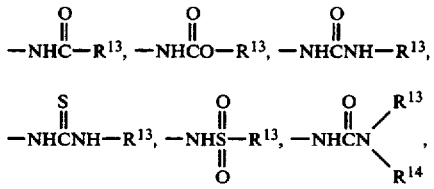

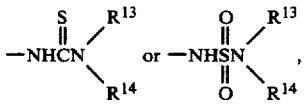

—$K^1$ is

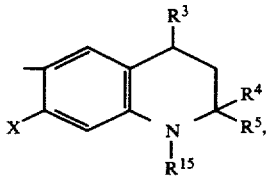

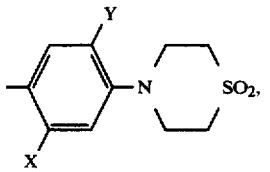

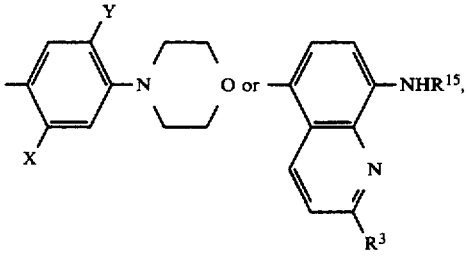

—$R^{13}$, —$R^{14}$ and —$R^{15}$ are each $C_1$–$C_6$ alkyl, trifluoromethyl, perfluoroethyl or perfluoropropyl, —$R^3$, —$R^4$ and —$R^5$ are each hydrogen or methyl, and —X and —Y are each hydrogen, methyl, trifluoromethyl, methoxy, ethoxy, chlorine or bromine.

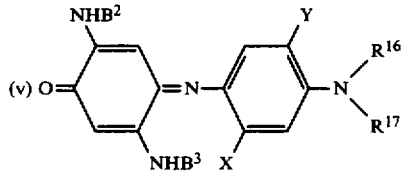

[VI]

wherein —$B^2$, —X and —Y are as defined above, —$B^3$ is as defined for —$B^2$, and —$R^{16}$ and —$R^{17}$ are each hydrogen or $C_1$–$C_8$ substituted for unsubstituted alkyl. In the above formula [IV], examples of the substituents for the substituted alkyl represented by —$R^{13}$, —$R^{14}$, —$R^{16}$ and —$R^{17}$ include halogen, alkoxy, vinyl, hydroxy, aryl etc. Of the dyes of the above formula [VI], especially preferred are those wherein —X and —Y are each hydrogen, methyl, methoxy, ethoxy, chlorine, bromine or trifluoromethyl, —$R^{16}$ and —$R^{17}$ are each hydrogen, hydroxyalkyl, aralkyl or $C_1$–$C_6$ alkyl, —$B^2$ and —$B^3$ are each

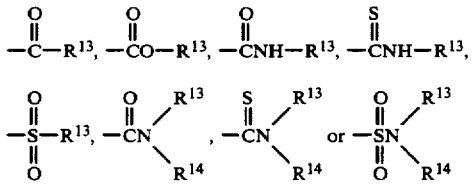

and —$R^{13}$ and —$R^{14}$ are each $C_1$–$C_4$ alkyl or halogenated alkyl.

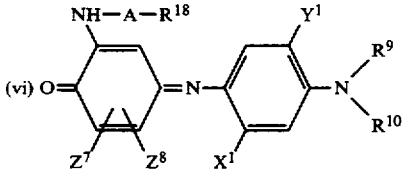

[VII]

wherein —$X^1$, —$Y^1$, —$R^9$ and —$R^{10}$ are as defined above, and —$Z^7$ and —$Z^8$ each represents hydrogen, alkyl optionally substituted by fluorine, alkoxy, halogen or —NH—A—$R^{18}$ wherein —$R^{18}$ represents substituted or unsubstituted vinyl, and —A— represents —CO— or —COO—.

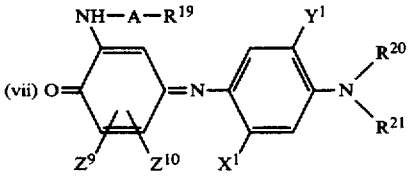

[VIII]

wherein —$X^1$, —$Y^1$ and —A are as defined above, —$Z^9$ and —$Z^{10}$ each represents hydrogen, methyl, trifluoromethyl, methoxy, ethoxy, chlorine, bromine or —NH—A—$R^{19}$ wherein —$R^{19}$ represents hydrogen, $C_1$–$C_8$ straight-chain or branched-chain alkyl, allyl, vinyl, methylvinyl, $C_3$–$C_8$ alkoxyalkyl, aralkyl, cyclohexyl, thienyl, trifluoromethyl or aryl, and —$R^{20}$ and —$R^{21}$ each represents hydrogen, $C_1$–$C_8$ straight-chain or branched-chain alkyl, $C_3$–$C_8$ alkoxyalkyl, $C_2$–$C_4$ hydroxyalkyl, $C_1$–$C_8$ halogenated alkyl, β-cyanoethyl, alkenyl, methylalkenyl or tetrahydrofurfuryl.

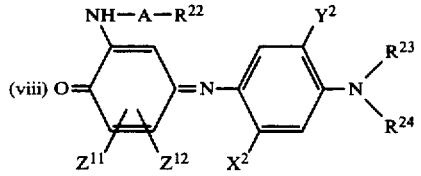

[IX]

wherein —A— is as defined above, —$X^2$, —$Y^2$, —$Z^{11}$ and —$Z^{12}$ each represents hydrogen, methyl, methoxy or chlorine, and —$R^{22}$, —$R^{23}$ and —$R^{24}$ each represents $C_1$–$C_8$ straight-chain or branched-chain alkyl or alkenyl.

Among those dyes above mentioned, more preferred dyes for heat-sensitive transfer recording are shown as the following formulae [X] and [XI].

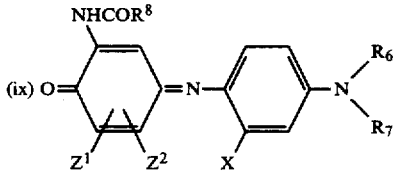

[X]

wherein $R^8$ represents $C_1$–$C_4$ alkyl, $CF_3$, —CH=$CH_2$, —C($CH_3$)=$CH_2$ or —CH=$CHCH_3$, $R^6$ represents $C_1$–$C_6$ alkyl, $C_3$–$C_8$ alkoxyalkyl, $C_2$–$C_3$ hydroxyalkyl, —$C_2H_4CN$, —$C_2H_4Cl$,

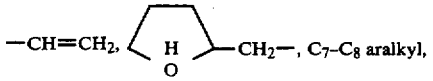

—CH=$CH_2$, —$CH_2$—, $C_7$–$C_8$ aralkyl,

—$C_2H_4OCOCH_3$, —$C_2H_4COOCH_3$, —$C_2H_4OCOOC_2H_5$,

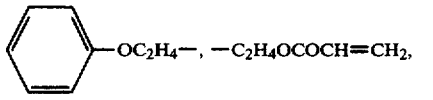

—$OC_2H_4$—, —$C_2H_4OCOCH$=$CH_2$,

—$C_2H_4OCOCH$=$CHCH_3$ or —$C_2H_4OCOC(CH_3)$=$CH_2$, $R^7$ represents $R^6$ or

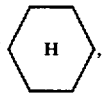

X represents hydrogen, —$CH_3$, —$NHCOCH_3$, —NHCHO or —$NHCOC_2H_5$, $Z^1$ and $Z^2$ each represents hydrogen, —$CH_3$, —Cl, —$OCH_3$, —$NHCOCH_3$, —$NHCOC_2H_5$ or —NHCOCH=$CH_2$.

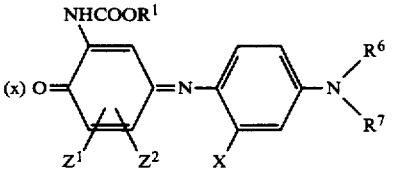

[XI]

wherein $R^1$ represents $C_1$–$C_4$ alkyl or $C_7$–$C_8$ aralkyl. $R^6$ and $R^7$ each represents —$CH_3$, —$C_2H_5$ or —$C_2H_4OH$, X represents hydrogen or —$CH_3$, $Z^1$ and $Z^2$ each represents hydrogen, —$CH_3$, —Cl, —$NHCOOCH_3$ or —$NHCOOC_2H_5$. Most preferable dyes are of the following formula [XIII].

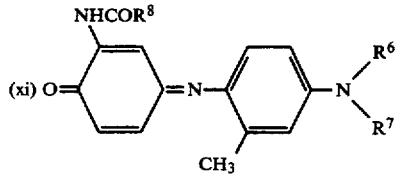

[XII]

wherein $R^6$, $R^7$ and $R^8$ each represents $C_1$–$C_4$ alkyl.

Further, the dyes to be used in the preparation of the dye transfer sheet of this invention may be used in combination.

For example, there may be used mixtures of dyes [A] of the following formula [XIII].

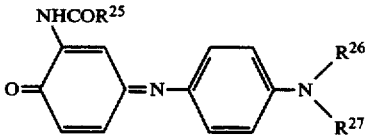

[XIII]

wherein $R^{25}$, $R^{26}$ and $R^{27}$ each represents $C_1$–$C_8$ straight-chain or branched-chain alkyl and dyes [B]of the following formula [XIV]:

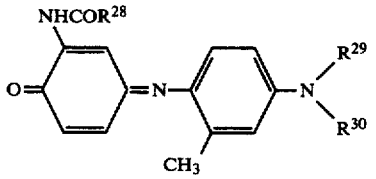

[XIV]

wherein $R^{28}$, $R^{29}$ and $R^{30}$ each represents $C_1$–$C_8$ straight-chain or branched-chain alkyl.

In the above general formula [XIII] and [XIV], preferred combinations are those wherein $R^{25}$ and $R^{28}$ are each $C_1$–$C_4$ straight-chain or branched-chain alkyl, and $R^{26}$, $R^{27}$, $R^{29}$ and $R^{30}$ are each $C_1$–$C_4$ straight-chain alkyl, and especially preferred is a mixture of a dye of the following structural formula:

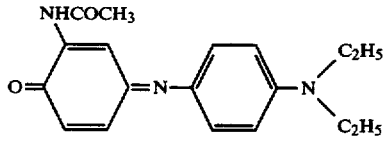

and a dye of the following structural formula:

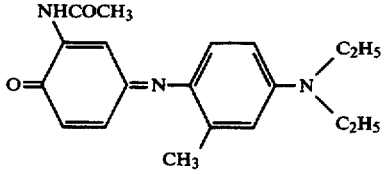

The mixing ratio (by weight) of these dyes is suitably such that the former ranges from 5 to 95% and the latter ranges from 95 to 5%, especially preferably the former ranges from 30 to 70% and the latter ranges from 70 to 30%.

The dyes for heat-sensitive transfer recording of the above general formula [I] of this invention may be produced by, for example, the following process:

That is, a phenol of the following general formula [a]:

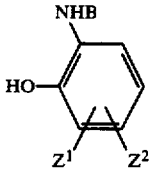

[a]

wherein —B, —$Z^1$ and —$Z^2$ are as defined above and an aniline of the following general formula [b]:

$H_2N$—K [b]

wherein —K is as defined above are heated in the presence of silver nitrate, thereby a dye for heat-sensitive transfer recording of the above formula [I]of this invention may be produced.

For applying the dyes of the formula [I] to prepare the dye transfer sheet of this invention in the sublimation heat-sensitive transfer recording process, the dye may be dissolved, or dispersed in a fine particle form, in a medium together with a binder to prepare an ink, then said ink is coated on a base film and dried, thereby a transfer sheet is prepared.

As the binder for the preparation of the ink, there may be used water-soluble resins such as cellulosic type, acrylic acid type, starch type etc.; resins soluble in water or organic solvents, such as acrylic resins, methacrylic resins, polystyrene, polycarbonates, polysulfones, polyether sulfones, polyvinylbutyral, ethyl cellulose, acetyl cellulose etc.; and the like. In the case of the resin soluble in organic solvents, it may be used not only as a solution in an organic solvent but also in the form of an aqueous dispersion.

Examples of the medium for the preparation of the ink include, in addition to water, organic solvents, for example, alcohols such as methyl alcohol, isopropyl alcohol, isobutyl alcohol etc.; cellosolves such as methyl cellosolve, ethyl cellosolve etc.; aromatics such as toluene, xylene, chlorobenzene etc.; ester such as ethyl acetate, butyl acetate etc., ketones such as acetone, methyl ethyl ketone, methyl isobutyl ketone, cyclohexanone etc.; chlorine type solvents such as methylene chloride, chloroform, trichloroethylene etc.; ethers such as tetrahydrofuran, dioxane etc., N,N-dimethylformamide, N-methylpyrrolidone etc.

As a base film according to the present invention, the film should satisfy the properties such that the film is dense and thin in order to improve a thermal conductivity; is excellent in heat resistant; has smooth and lubricating surface in order to coat a uniform transfer layer thereover and in order to intimately contact with a thermal head; protects ink to be blotted onto the back face of the film, so forth.

As an embodiment of the base film used for the transfer sheet, tissue paper such as condenser paper, glassine paper, etc. and a film of a plastic having good heat resistance, e.g. polyesters, polyamides, polyimides etc. are suitable, and the thickness of said base film is suitably in the range of 3–50 μm. Among such films, those of polyethylene terephthalate and polyimide are more preferred.

As the method for coating the ink on the base film, it may be conducted by using a reverse roll coater, a gravure coater, a rod coater, an air doctor coater etc., and the thickness of the ink coated layer after drying may suitably be in the range of 0.1–5 μm (Yuji Harazaki, published from Maki Shoten in 1979, "Coating Method").

The dye transfer sheet of the present invention basically comprises a color layer containing the aforementioned dye on the surface of the base film and optionally may further comprise a heat-resisting and lubricating layer on the back face of the base film in order to improve running characteristics and heat-resisting properties. These heat-resisting and lubrication layer may be provided by coating the back face of the base film with an inactive inorganic compound such as fine silica powder, etc.; and additives such as a lubricant; incorporated with resins such as epoxy type, acryl type, urethane type, polycarbonate type, etc.

Since the dyes for heat-sensitive transfer recording of the above formula [I] of this invention have a brilliant cyan color, they are suitable for obtaining full color recording having good color reproduciblity by combining with appropriate magenta and yellow color dyes, and further since they easily sublime and have great molecular absorption coefficients, it is possible to obtain recording having a high color density at a high speed without imposing much burden on the heat-sensitive heat. Further, since they are stable against heat, light, moisture, chemicals, etc., they do not undergo thermal decomposition during transfer recording and also the obtained recording has excellent storage stability. Furthermore, since the dyes of the above formula [I] are good in solubility in organic solvents and dispersibility in water, it is easy to prepare a uniformly dissolved or dispersed ink of a high concentration, and by using such an ink, a transfer sheet of this invention on which the dye has been uniformly coated at a high concentration may be obtained. Therefore, by using such a transfer sheet of this invention, recording having excellent uniformity and color density may be obtained.

Still further, where a mixture of the dyes of the above general formula [XIII] and [XIV] is used, since the dyes do not separate when an ink of a high concentration is prepared or the ratio to the binder is increased, it is possible to prepare a more uniformly dissolved ink at a high concentration as compared with the cases where the respective dyes are used singly, and by using such an ink, a transfer sheet of this invention on which the mixed dye has been uniformly coated at high concentration may be obtained. In addition, by using this transfer sheet of this invention cyan color transfer recording having neither unevenness of the image nor abrasion staining may be obtained.

This invention is more particularly described by the following examples, but it should be noted that this invention be not restricted by these examples.

EXAMPLE 1

(i) Preparation of an Ink

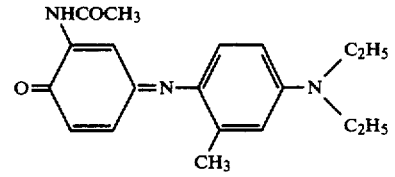

| | |
|---|---|
| Above dye | 10 g |
| Polysulfone resin* | 10 g |
| Chlorobenzene | 80 g |
| Total | 100 g |

*UDEL P-1700 (trade name) produced by Nissan Chemicals Industries Ltd.

The mixture of the above composition was treated by a paint conditioner for 10 minutes to prepare an ink. The dye and the resin had been completely dissolved and thus it was possible to obtain an ink in a uniform solution.

(ii) Preparation of a Transfer Sheet

The aforsaid ink was coated on a polyimide film (15 μm thick) using a bar coated (produced by RK Print Coat Instruments Co., (No. 1) and dried in air, to obtain a transfer sheet.

(iii) Transfer Recording

The ink coated surface of the aforesaid transfer sheet was overlapped with a recording body, and recording was effected using a heat-sensitive head under the following conditions thereby it was possible to obtain uniform brilliant cyan color recording having a high color density of 1.40.

| Recording Conditions | |
|---|---|
| Linear density of main scanning and minor scanning: | .4 dots/mm |
| Recording electric power: | 0.6 W/dot |
| Heating time of the head: | 10 m sec. |

The recording body was produced by coating a liquid prepared by mixing 10 g of an aqueous dispersion of 34% by weight of a saturated polyester (produced by Toyo Spinning Co., Ltd., VYLONAL MD-1200, trade name) and 1 g of silica (produced by Nippon Silica Industry Co., Ltd., Nipsil E220A, trade name) on a wood free paper sheet (200 μm thick) using a bar coater (produced by RK Print Coat Instruments Co., No. 3) and thereafter drying.

The color density was measured by using a densitometer Model RD-514 manufactured by Macbeth Co., U.S.A. (filter: latten No. 25).

A light fastness test was conducted on the obtained recording using a carbon arc fade-o-meter (manufactured by Suga Tester Co., Ltd.) at a black panel temperature of 63±2° C. to find that there was hardly decoloration or change in color after exposure to light for 40 hours.

The dye used in this example was produced as follows:

3.0 g of acetamidophenol of the following structural formula:

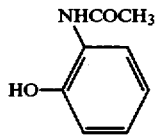

and 4.3 of a compound of the following structural formula:

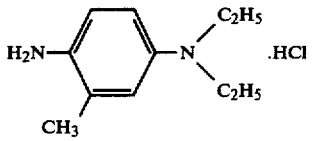

were added to 150 ml of ethanol, stirred at room temperature, and then a solution of 3.4 g of silver nitrate in 15 ml of water was added dropwise. Thereafter, 15 ml of a 28% ammonia water was added thereto, further a solution of 10.5 g of silver nitrate in 10 ml of water was added dropwise, and the reaction was effected at 30°–40° C. for 3 hours. After completion of the reaction, it was extracted with chloroform, the solvent was distilled off, and the residue was purified by column chromatography, to obtain 5.2 g (yield 80% based on the theoretical yield) of a purified product of an indoaniline type dye of the following structural formula:

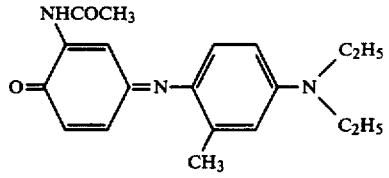

The dye thus obtained had a melting point of 128°–130° C. and a maximum absorption wavelength (chloroform) of 656 nm.

EXAMPLE 2

Preparation of the ink, preparation of the transfer sheet and transfer recording were carried out according to the procedures described in Example 1 except that the dye used in Example 1 was replaced by the dyes set forth in Table 1 respectively, thereby brilliant cyan color recording having the color density set forth in Table 1 was obtained in each case.

TABLE 1

| No. | Structural Formula of the Dye | Color Density of the Recording | Maximum Absorption Wavelength (Chloroform) (nm) |
|---|---|---|---|
| 2-1 | 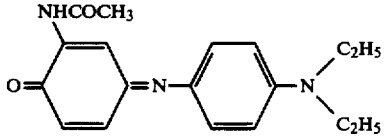 | 1.40 | 636 |
| 2-2 | 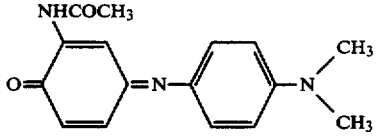 | 1.40 | 626 |
| 2-3 | 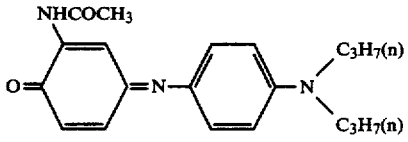 | 1.40 | 637 |
| 2-4 | 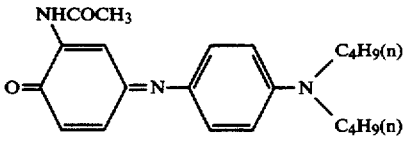 | 1.40 | 638 |
| 2-5 | 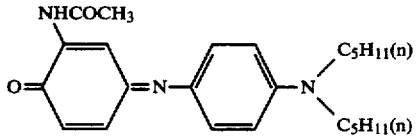 | 1.35 | 639 |
| 2-6 | 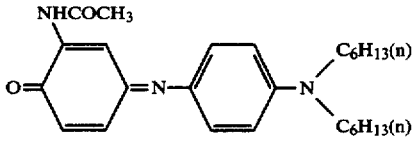 | 1.35 | 639 |

TABLE 1-continued
| No. | Structural Formula of the Dye | Color Density of the Recording | Maximum Absorption Wavelength (Chloroform) (nm) |
|---|---|---|---|
| 2-7 | 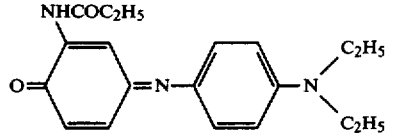 | 1.40 | 636 |
| 2-8 | 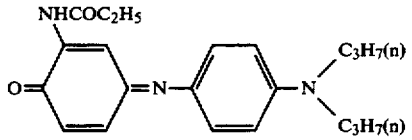 | 1.40 | 637 |
| 2-9 | 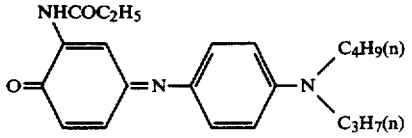 | 1.40 | 638 |
| 2-10 | 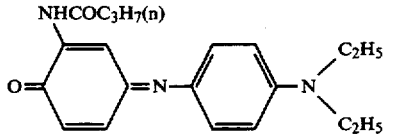 | 1.40 | 636 |
| 2-11 | 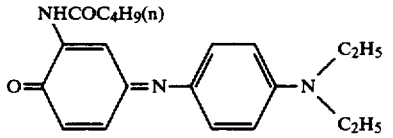 | 1.40 | 636 |
| 2-12 | 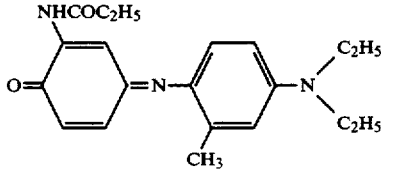 | 1.40 | 656 |
| 2-13 | 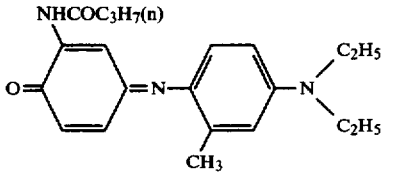 | 1.40 | 656 |
| 2-14 | 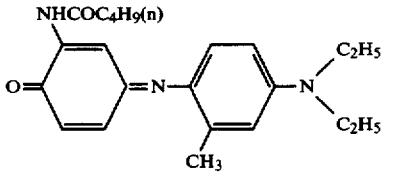 | 1.40 | 656 |
| 2-15 | 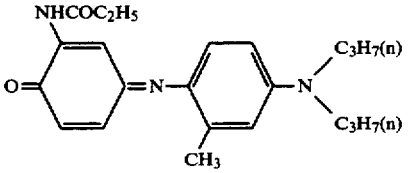 | 1.40 | 657 |

TABLE 1-continued
| No. | Structural Formula of the Dye | Color Density of the Recording | Maximum Absorption Wavelength (Chloroform) (nm) |
|---|---|---|---|
| 2-16 | 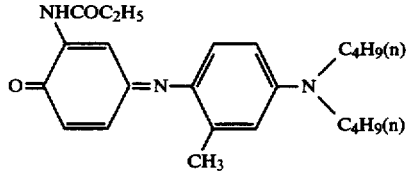 | 1.35 | 658 |
| 2-17 | 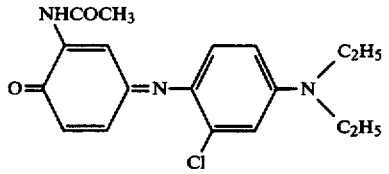 | 1.35 | 632 |
| 2-18 | 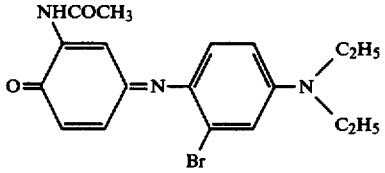 | 1.35 | 632 |
| 2-19 | 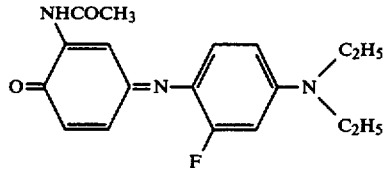 | 1.40 | 632 |
| 2-20 | 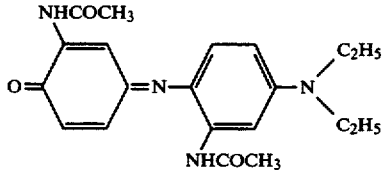 | 1.30 | 660 |
| 2-21 | 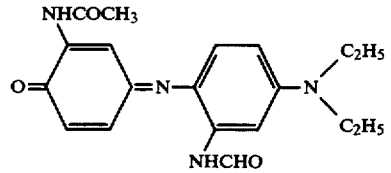 | 1.30 | 658 |
| 2-22 | 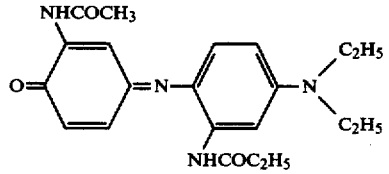 | 1.30 | 660 |
| 2-23 | 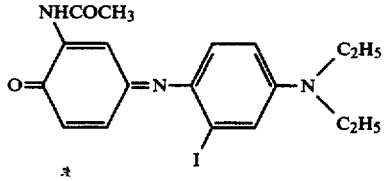 | 1.35 | 632 |

TABLE 1-continued
| No. | Structural Formula of the Dye | Color Density of the Recording | Maximum Absorption Wavelength (Chloroform) (nm) |
|---|---|---|---|
| 2-24 | 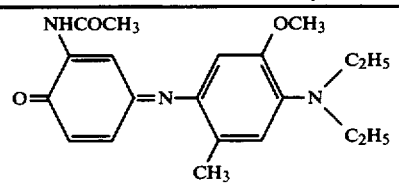 | 1.35 | 661 |
| 2-25 | 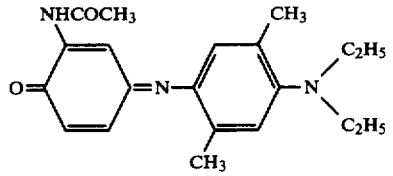 | 1.35 | 657 |
| 2-26 | 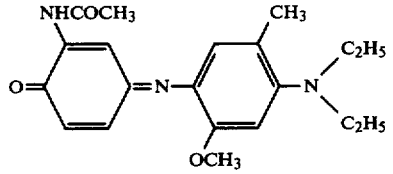 | 1.35 | 658 |
| 2-27 | 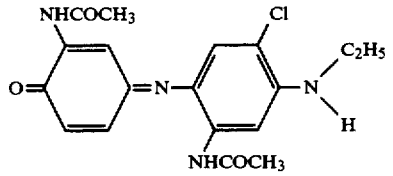 | 1.25 | 656 |
| 2-28 | 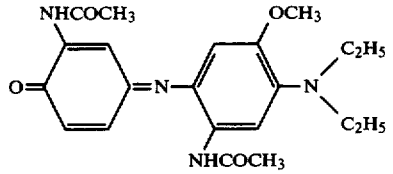 | 1.25 | 675 |
| 2-29 | 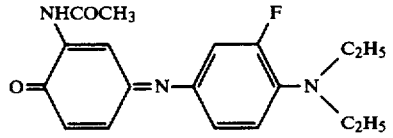 | 1.40 | 630 |
| 2-30 | 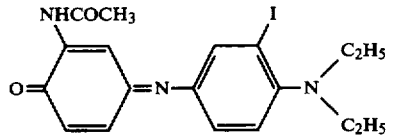 | 1.35 | 630 |
| 2-31 | 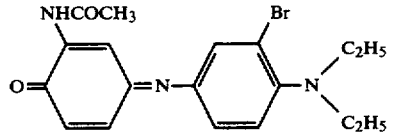 | 1.35 | 630 |
| 2-32 | 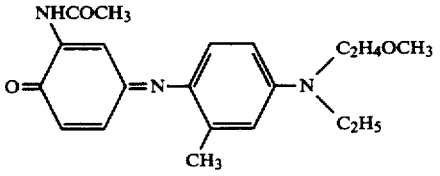 | 1.35 | 652 |

TABLE 1-continued
| No. | Structural Formula of the Dye | Color Density of the Recording | Maximum Absorption Wavelength (Chloroform) (nm) |
|---|---|---|---|
| 2-33 | 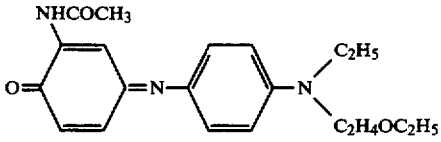 | 1.35 | 633 |
| 2-34 | 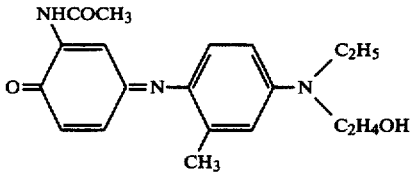 | 1.35 | 652 |
| 2-35 | 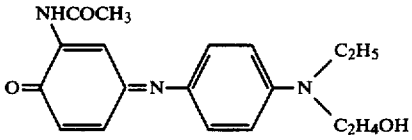 | 1.35 | 633 |
| 2-36 | 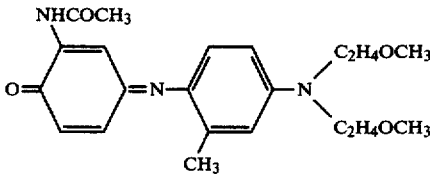 | 1.30 | 626 |
| 2-37 | 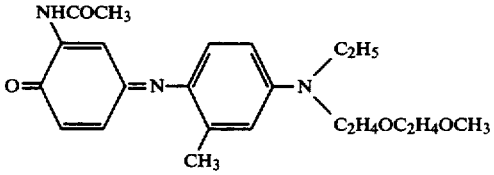 | 1.30 | 651 |
| 2-38 | 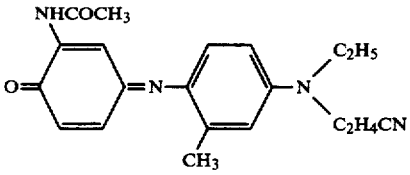 | 1.25 | 620 |
| 2-39 | 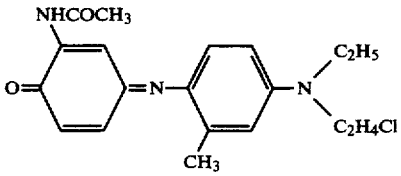 | 1.30 | 625 |
| 2-40 | 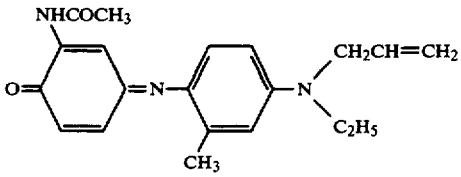 | 1.40 | 633 |

TABLE 1-continued
| No. | Structural Formula of the Dye | Color Density of the Recording | Maximum Absorption Wavelength (Chloroform) (nm) |
|---|---|---|---|
| 2-41 | 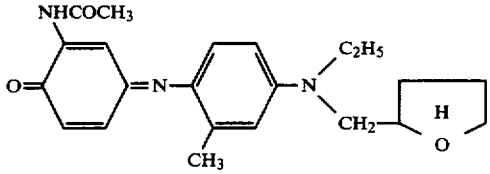 | 1.30 | 652 |
| 2-42 | 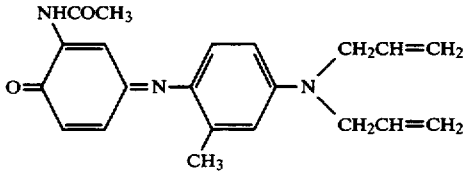 | 1.40 | 623 |
| 2-43 | 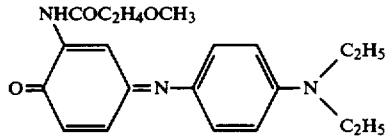 | 1.35 | 636 |
| 2-44 | 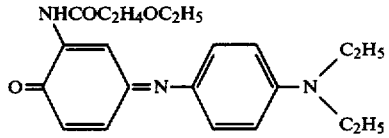 | 1.35 | 636 |
| 2-45 | 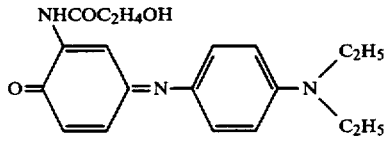 | 1.30 | 636 |
| 2-46 | 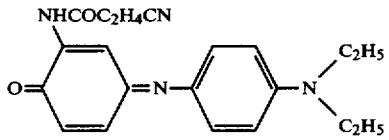 | 1.30 | 632 |
| 2-47 | 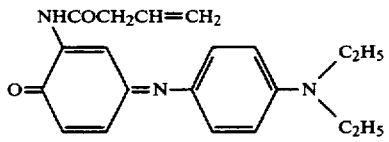 | 1.40 | 633 |
| 2-48 | 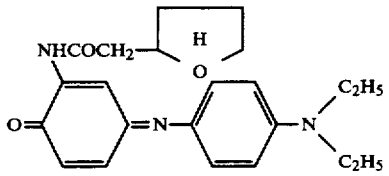 | 1.30 | 635 |
| 2-49 | 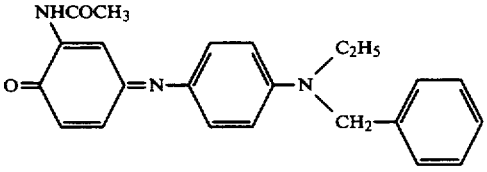 | 1.30 | 626 |

TABLE 1-continued
| No. | Structural Formula of the Dye | Color Density of the Recording | Maximum Absorption Wavelength (Chloroform) (nm) |
|---|---|---|---|
| 2-50 | 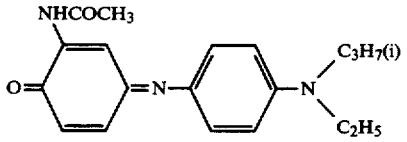 | 1.40 | 636 |
| 2-51 | 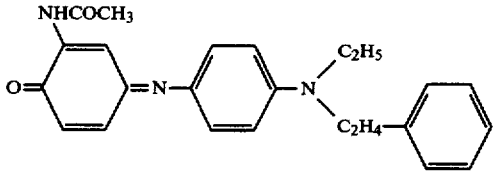 | 1.30 | 636 |
| 2-52 | 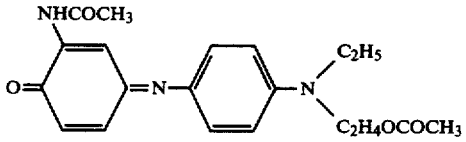 | 1.30 | 630 |
| 2-53 | 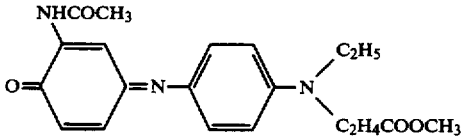 | 1.30 | 630 |
| 2-54 | 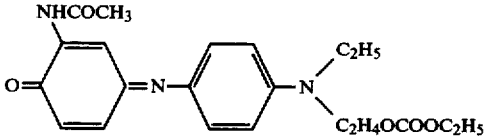 | 1.30 | 630 |
| 2-55 | 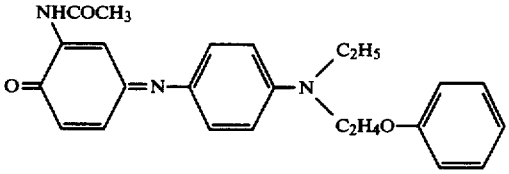 | 1.30 | 631 |
| 2-56 | 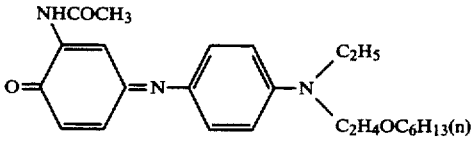 | 1.30 | 633 |
| 2-57 | 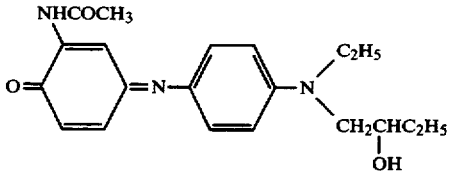 | 1.30 | 633 |
| 2-58 | 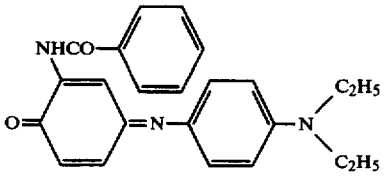 | 1.20 | 657 |

TABLE 1-continued
| No. | Structural Formula of the Dye | Color Density of the Recording | Maximum Absorption Wavelength (Chloroform) (nm) |
|---|---|---|---|
| 2-59 | 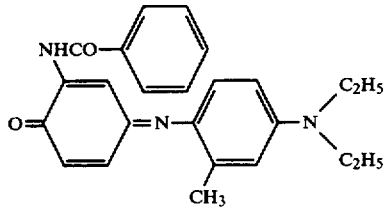 | 1.20 | 670 |
| 2-60 | 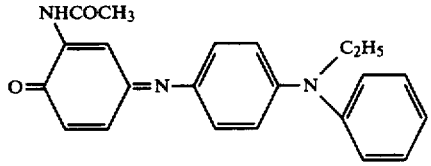 | 1.20 | 620 |
| 2-61 | 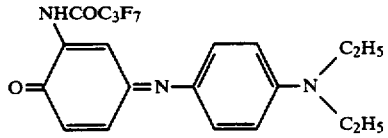 | 1.40 | 634 |
| 2-62 | 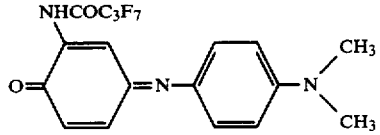 | 1.40 | 625 |
| 2-63 | 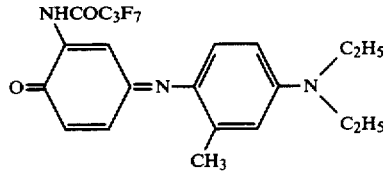 | 1.40 | 653 |
| 2-64 | 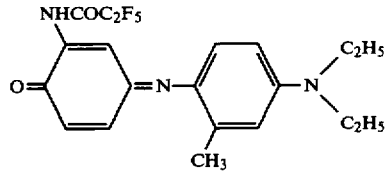 | 1.40 | 653 |
| 2-65 | 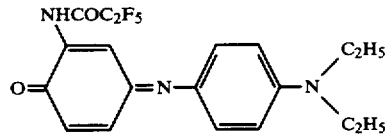 | 1.40 | 634 |
| 2-66 | 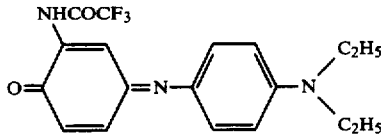 | 1.40 | 634 |
| 2-67 | 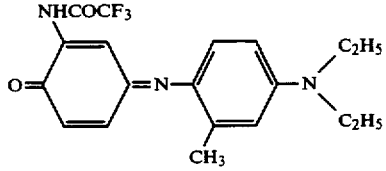 | 1.40 | 653 |

TABLE 1-continued

| No. | Structural Formula of the Dye | Color Density of the Recording | Maximum Absorption Wavelength (Chloroform) (nm) |
|---|---|---|---|
| 2-68 | 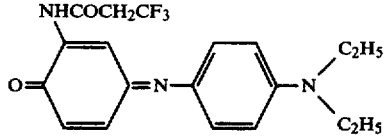 | 1.35 | 635 |
| 2-69 | 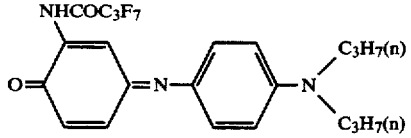 | 1.35 | 636 |
| 2-70 | 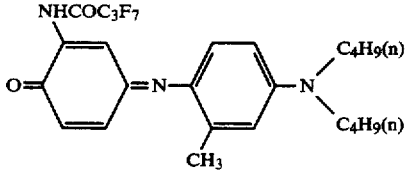 | 1.30 | 656 |
| 2-71 | 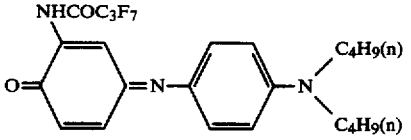 | 1.35 | 635 |
| 2-72 | 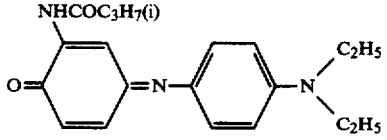 | 1.40 | 636 |
| 2-73 | 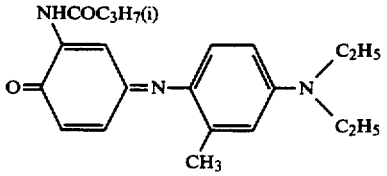 | 1.40 | 656 |

EXAMPLE 3

Preparation of the ink, preparation of the transfer sheet and transfer recording were carried out according to the procedures described in Example 1 except that the dye used in Example 1 was replaced by a dye of the following structural formula:

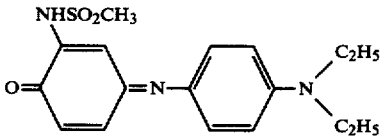

thereby it was possible to obtain uniform brilliant cyan color recording having a high color density of 1.40.

A light fastness test was conducted on the obtained recording according to the procedures described in Example 1 to find that there was hardly decoloration or change in color after exposure to light for 40 hours. Further, the transfer sheet and the recording were both stable against heat and moisture, and were excellent in dark place storability.

The dye used in this example was produced as follows:

150 ml of ethanol was added to 3.7 g of 2-methylsulfonylaminophenol of the following structural formula:

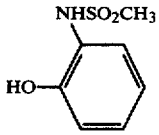

and 5.24 g of a compound of the following structural formula:

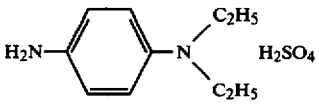

stirred at room temperature, and then a solution of 3.4 g of silver nitrate in 15 ml of water was added dropwise. 15 ml of a 28% ammonia water was added thereto, further a solution of 1.5 g of silver nitrate in 10 ml of water was added dropwise, and the reaction was effected at 30°–40° C. for 3 hours. After completion of the reaction, it was extracted with chloroform, the solvent was distilled off, and the residue was purified by column chromatography using chloroform to obtain 5.27 g (yield 76% based on the theoretical yield) of a purified product of an indoaniline type dye of the following structural formula:

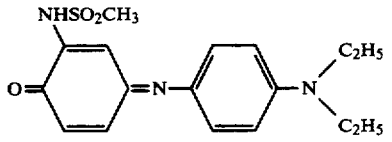

The dye thus obtained had a melting pont of 135°–137° C. and a maximum absorption wavelength (chloroform) of 640 nm.

EXAMPLE 4

Preparation of the ink, preparation of the transfer sheet and transfer recording were carried out according to the procedures described in Example 1 except that the dye used in Example 1 was replaced by the dyes set forth in Table 2 respectively, thereby brilliant cyan color recording having the color density set forth in Table 2 was obtained in each case.

The results of a light fastness test on the obtained recording and a dark place storability test on the transfer sheet and the recording were both good.

TABLE 2

| No. | Structural Fromula of the dye | Color Density of the Recording | Maximum Absorption Wavelength (Chloroform) (nm) |
|---|---|---|---|
| 4-1 | 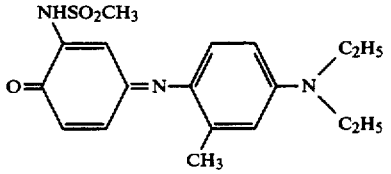 | 1.40 | 660 |
| 4-2 | 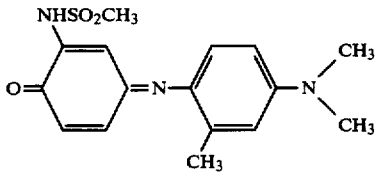 | 1.35 | 645 |
| 4-3 | 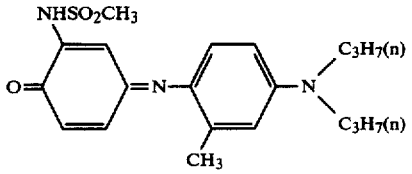 | 1.40 | 662 |
| 4-4 | 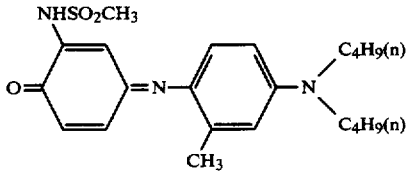 | 1.35 | 663 |
| 4-5 | 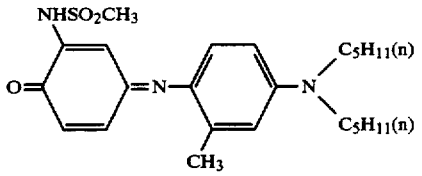 | 1.35 | 664 |

TABLE 2-continued
| No. | Structural Fromula of the dye | Color Density of the Recording | Maximum Absorption Wavelength (Chloroform) (nm) |
|---|---|---|---|
| 4-6 | 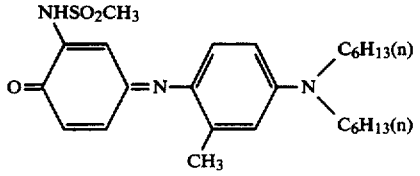 | 1.30 | 665 |
| 4-7 | 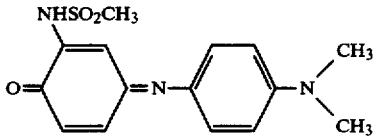 | 1.35 | 626 |
| 4-8 | 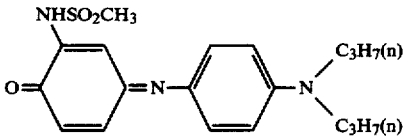 | 1.40 | 640 |
| 4-9 | 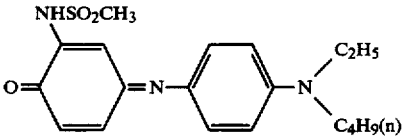 | 1.40 | 641 |
| 4-10 | 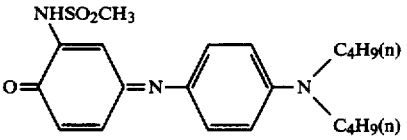 | 1.35 | 642 |
| 4-11 | 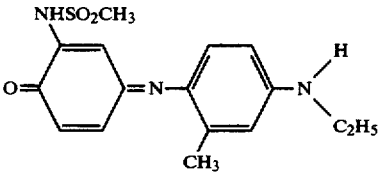 | 1.30 | 606 |
| 4-12 | 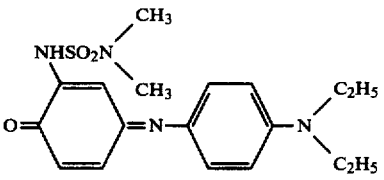 | 1.30 | 636 |
| 4-13 | 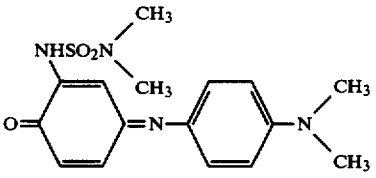 | 1.30 | 620 |
| 4-14 | 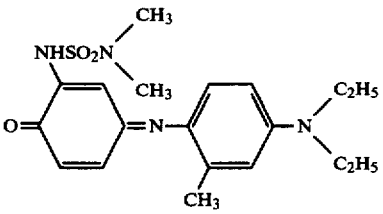 | 1.30 | 655 |

TABLE 2-continued
| No. | Structural Fromula of the dye | Color Density of the Recording | Maximum Absorption Wavelength (Chloroform) (nm) |
|---|---|---|---|
| 4-15 | 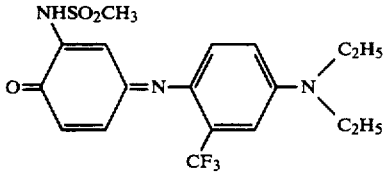 | 1.40 | 649 |
| 4-16 | 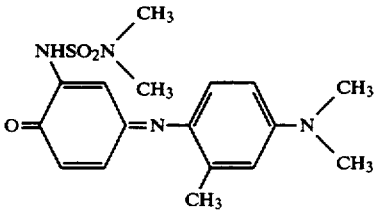 | 1.30 | 639 |
| 4-17 | 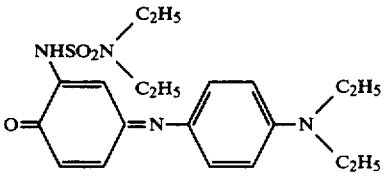 | 1.30 | 635 |
| 4-18 | 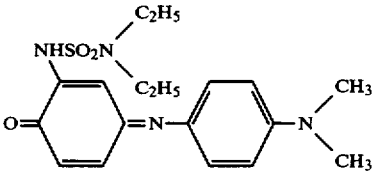 | 1.30 | 619 |
| 4-19 | 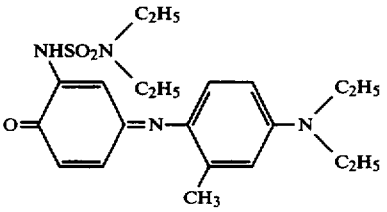 | 1.30 | 654 |
| 4-20 | 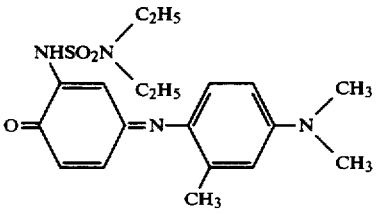 | 1.30 | 638 |
| 4-21 | 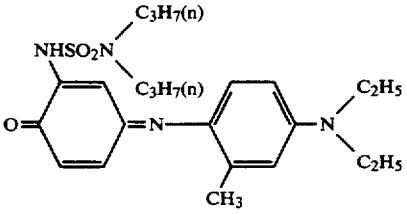 | 1.25 | 653 |

TABLE 2-continued
| No. | Structural Fromula of the dye | Color Density of the Recording | Maximum Absorption Wavelength (Chloroform) (nm) |
|---|---|---|---|
| 4-22 | 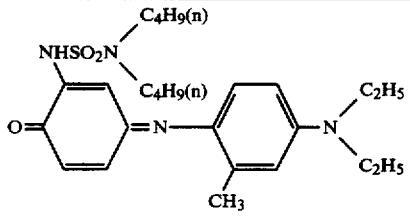 | 1.25 | 652 |
| 4-23 | 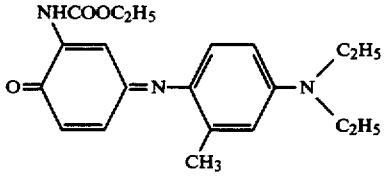 | 1.35 | 656 |
| 4-24 | 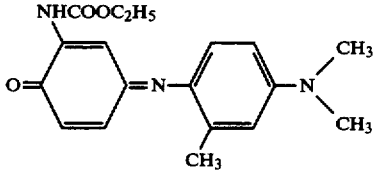 | 1.35 | 640 |
| 4-25 | 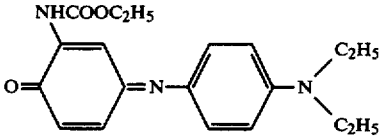 | 1.40 | 636 |
| 4-26 | 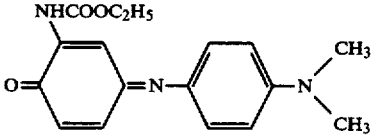 | 1.35 | 620 |
| 4-27 | 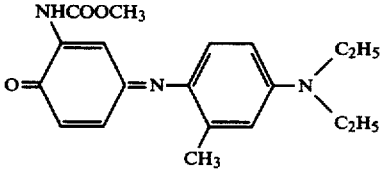 | 1.35 | 656 |
| 4-28 | 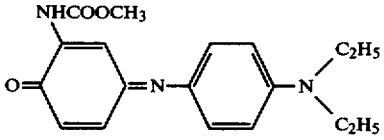 | 1.35 | 636 |
| 4-29 | 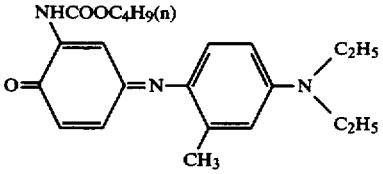 | 1.30 | 653 |
| 4-30 | 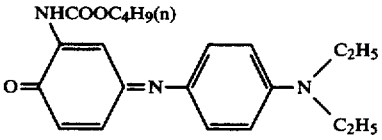 | 1.30 | 633 |

TABLE 2-continued
| No. | Structural Fromula of the dye | Color Density of the Recording | Maximum Absorption Wavelength (Chloroform) (nm) |
|---|---|---|---|
| 4-31 | 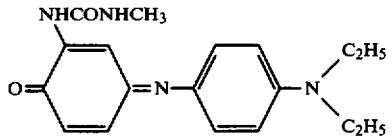 | 1.35 | 634 |
| 4-32 | 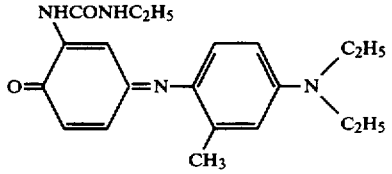 | 1.35 | 653 |
| 4-33 | 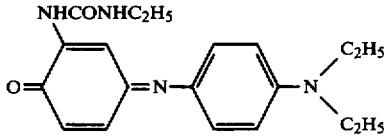 | 1.35 | 633 |
| 4-34 | 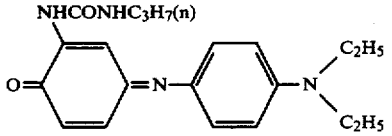 | 1.30 | 633 |
| 4-35 | 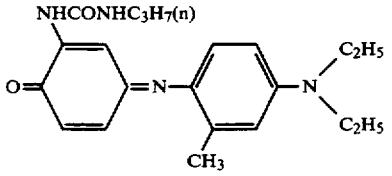 | 1.30 | 653 |
| 4-36 | 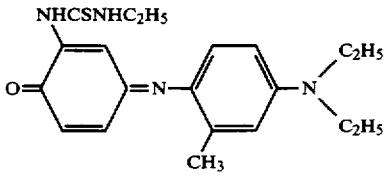 | 1.30 | 653 |
| 4-37 | 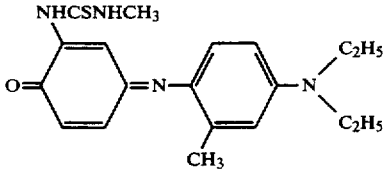 | 1.30 | 654 |
| 4-38 | 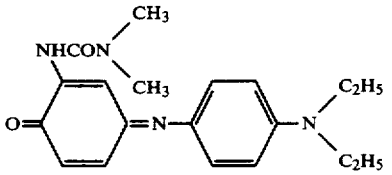 | 1.30 | 633 |
| 4-39 | 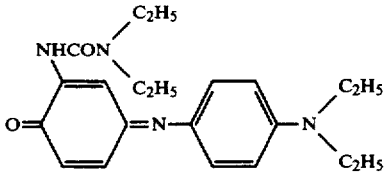 | 1.30 | 632 |

TABLE 2-continued
| No. | Structural Fromula of the dye | Color Density of the Recording | Maximum Absorption Wavelength (Chloroform) (nm) |
|---|---|---|---|
| 4-40 | 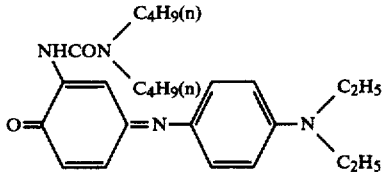 | 1.25 | 631 |
| 4-41 | 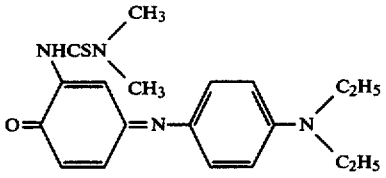 | 1.30 | 634 |
| 4-42 | 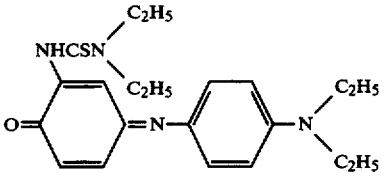 | 1.30 | 632 |
| 4-43 | 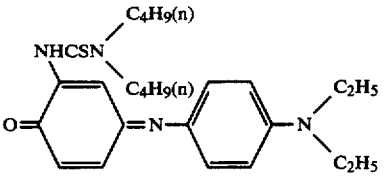 | 1.25 | 632 |
| 4-44 | 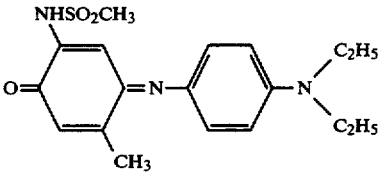 | 1.30 | 642 |
| 4-45 | 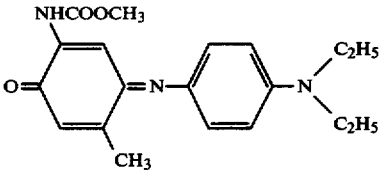 | 1.30 | 638 |
| 4-46 | 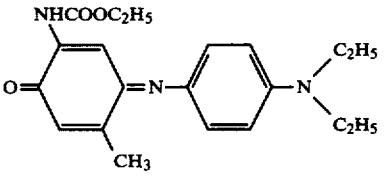 | 1.30 | 638 |
| 4-47 | 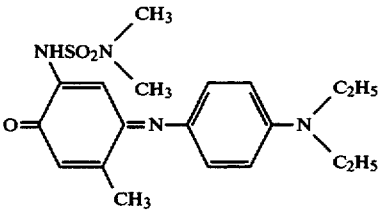 | 1.30 | 637 |

TABLE 2-continued
| No. | Structural Fromula of the dye | Color Density of the Recording | Maximum Absorption Wavelength (Chloroform) (nm) |
|---|---|---|---|
| 4-48 | 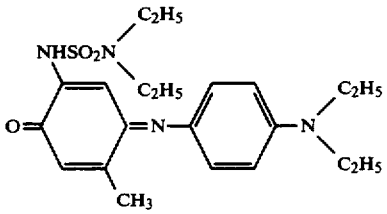 | 1.30 | 637 |
| 4-49 | 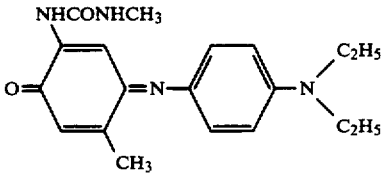 | 1.30 | 636 |
| 4-50 | 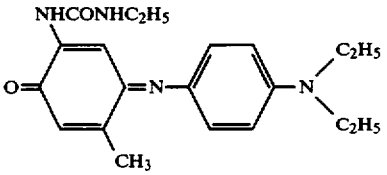 | 1.30 | 636 |
| 4-51 | 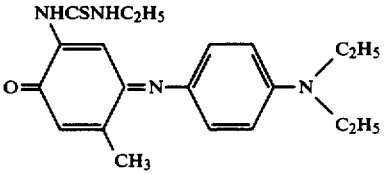 | 1.25 | 636 |
| 4-52 | 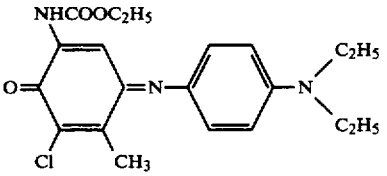 | 1.20 | 658 |
| 4-53 | 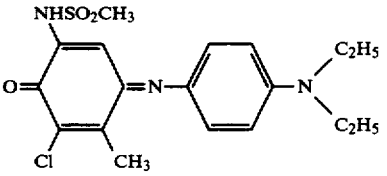 | 1.20 | 662 |
| 4-54 | 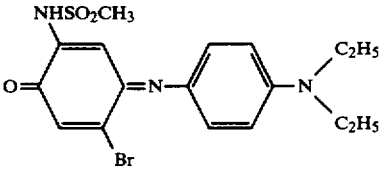 | 1.25 | 643 |
| 4-55 | 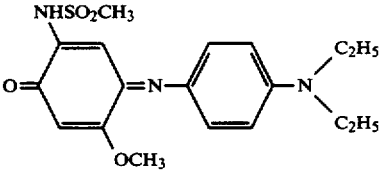 | 1.25 | 641 |

TABLE 2-continued
| No. | Structural Fromula of the dye | Color Density of the Recording | Maximum Absorption Wavelength (Chloroform) (nm) |
|---|---|---|---|
| 4-56 | 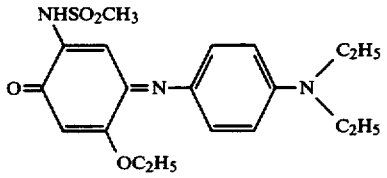 | 1.25 | 641 |
| 4-57 | 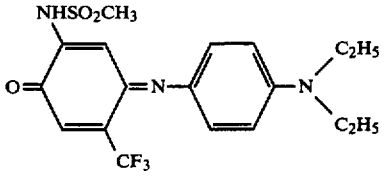 | 1.25 | 642 |
| 4-58 | 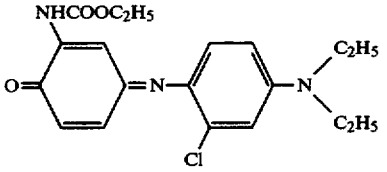 | 1.30 | 630 |
| 4-59 | 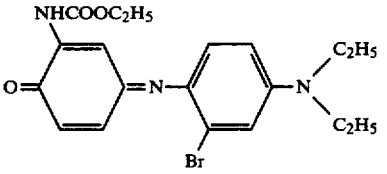 | 1.30 | 630 |
| 4-60 | 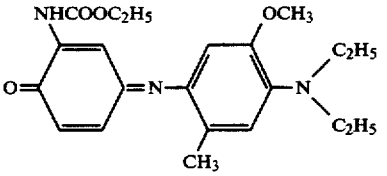 | 1.25 | 667 |
| 4-61 | 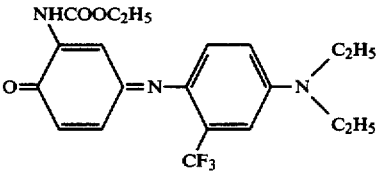 | 1.35 | 650 |
| 4-62 | 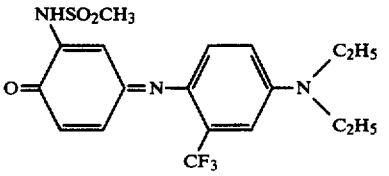 | 1.35 | 648 |
| 4-63 | 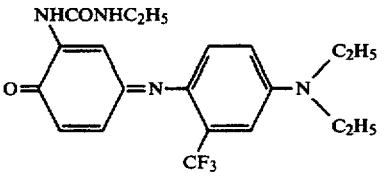 | 1.30 | 646 |

TABLE 2-continued
| No. | Structural Fromula of the dye | Color Density of the Recording | Maximum Absorption Wavelength (Chloroform) (nm) |
|---|---|---|---|
| 4-64 | 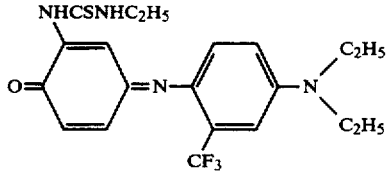 | 1.30 | 643 |
| 4-65 | 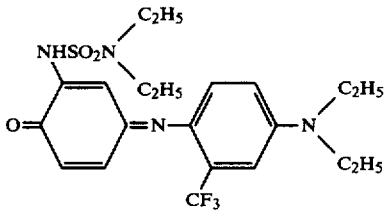 | 1.30 | 644 |
| 4-66 | 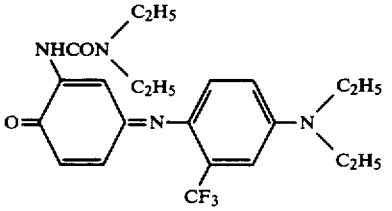 | 1.30 | 643 |
| 4-67 | 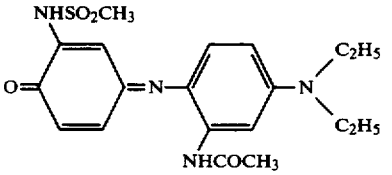 | 1.25 | 664 |
| 4-68 | 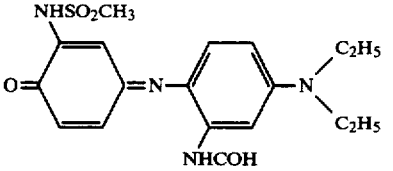 | 1.25 | 663 |
| 4-69 | 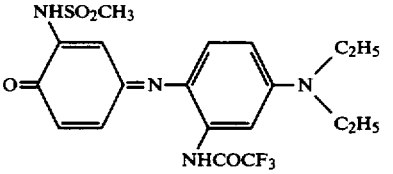 | 1.25 | 662 |
| 4-70 | 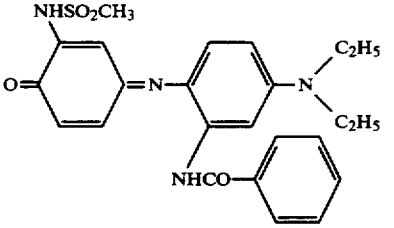 | 1.20 | 660 |

TABLE 2-continued
| No. | Structural Fromula of the dye | Color Density of the Recording | Maximum Absorption Wavelength (Chloroform) (nm) |
|---|---|---|---|
| 4-71 | 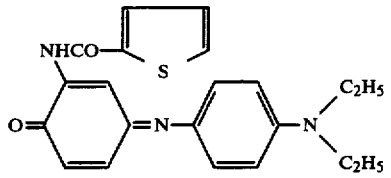 | 1.20 | 642 |
| 4-72 | 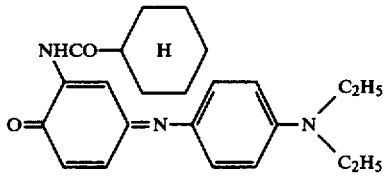 | 1.25 | 636 |
| 4-73 | 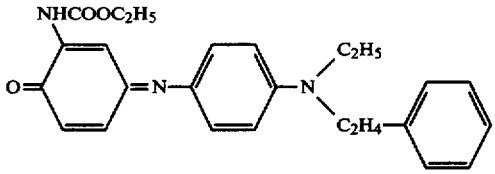 | 1.20 | 634 |
| 4-74 | 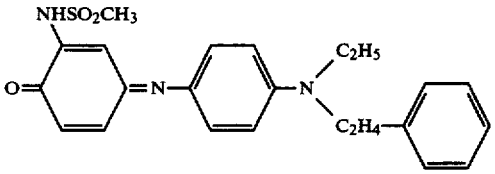 | 1.20 | 635 |
| 4-75 | 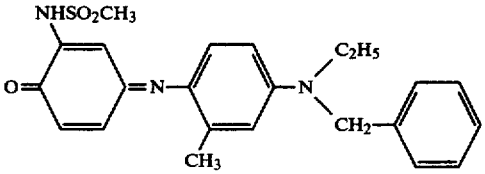 | 1.15 | 650 |
| 4-76 | 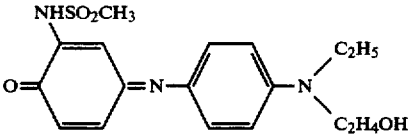 | 1.30 | 634 |
| 4-77 | 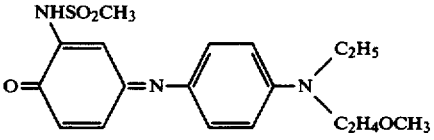 | 1.35 | 632 |
| 4-78 | 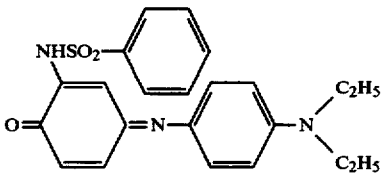 | 1.25 | 643 |

TABLE 2-continued
| No. | Structural Fromula of the dye | Color Density of the Recording | Maximum Absorption Wavelength (Chloroform) (nm) |
|---|---|---|---|
| 4-79 | 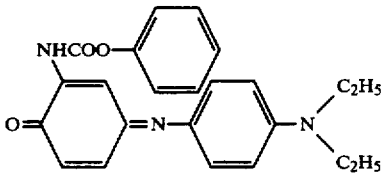 | 1.20 | 638 |
| 4-80 | 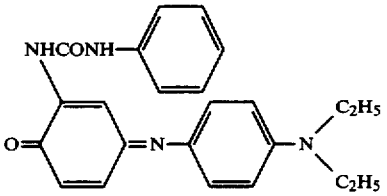 | 1.15 | 636 |
| 4-81 | 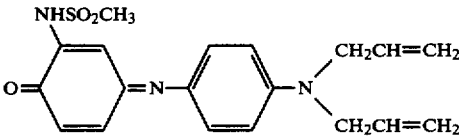 | 1.35 | 630 |
| 4-82 | 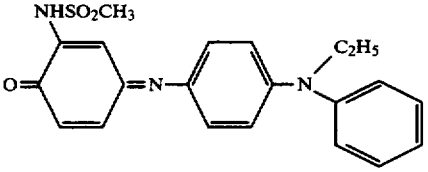 | 1.20 | 634 |
| 4-83 | 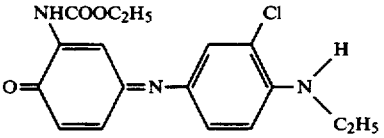 | 1.25 | 594 |
| 4-84 | 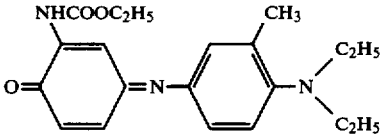 | 1.30 | 635 |
| 4-85 | 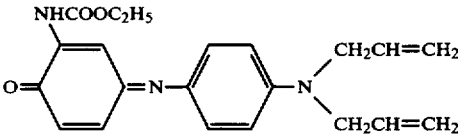 | 1.30 | 624 |
| 4-86 | 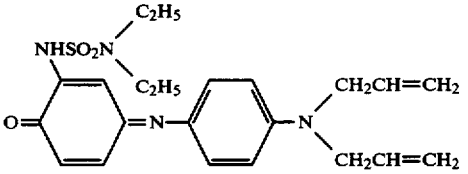 | 1.25 | 626 |
| 4-87 | 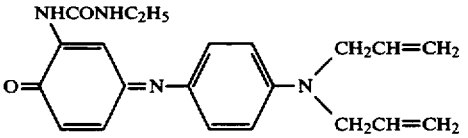 | 1.30 | 624 |

TABLE 2-continued

| No. | Structural Fromula of the dye | Color Density of the Recording | Maximum Absorption Wavelength (Chloroform) (nm) |
|---|---|---|---|
| 4-88 | 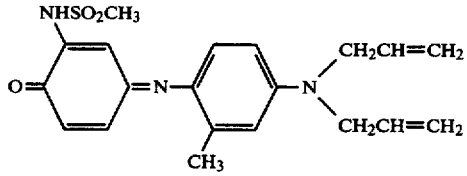 | 1.30 | 650 |
| 4-89 | 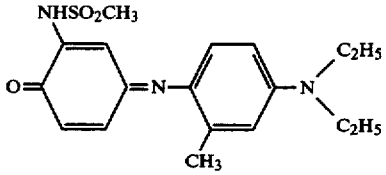 | 1.25 | 665 |
| 4-90 | 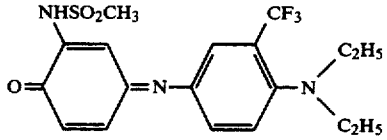 | 1.35 | 646 |
| 4-91 | 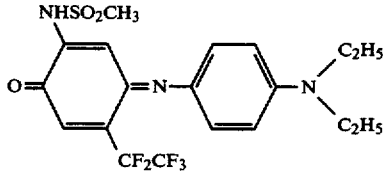 | 1.35 | 643 |
| 4-92 | 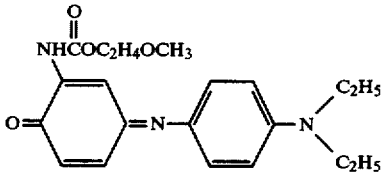 | 1.20 | 619 |
| 4-93 | 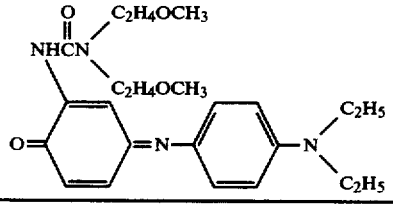 | 1.20 | 633 |

EXAMPLES 5

Preparation of the ink, preparation of the transfer sheet and transfer recording were carried out according to the procedures described in Example 1 except that the dye used in Example 1 was replaced by a dye of the following structural formula:

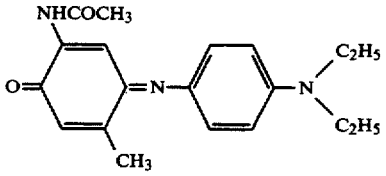

thereby it was possible to obtain uniform brilliant cyan color recording having a high color density of 1.40.

A light fastness test was conducted on the obtained recording, according to the procedures described in Example 1, to find that there was hardly decoloration or change in color after exposure to light for 40 hours. Further, the transfer sheet and the recording were both stable against heat and moisture, and were excellent in dark place storability.

The dye used in this example was produced as follows:

150 ml of ethanol was added to 3.28 g of 5-methyl-2-acetamidophenol of the following structural formula:

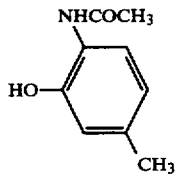

and 5.24 g of a sulfate salt of a compound of the following structural formula:

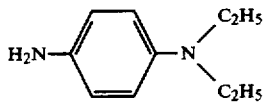

stirred at room temperature, and then a solution of 3.4 g of silver nitrate in 15 ml of water was added dropwise. 15 ml of a 28% ammonia water was added thereto, further a solution of 10.5 g of silver nitrate in 10 ml of water was added dropwise, and the reaction was effected at 30°–40° C. for 3 hours. After completion of the reaction, it was extracted with chloroform, the solvent was distilled off, and the residue was purified by column chromatography using chloroform to obtain 5.6 g (yield 82% based on the theoretical yield) of a purified product of an indoaniline type dye of the following structural formula:

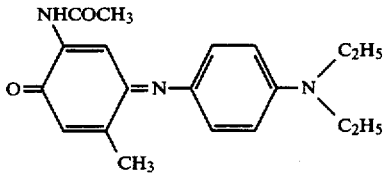

The maximum absorption wavelength of the above dye was 637 nm (chloroform).

EXAMPLE 6

Preparation of the ink, preparation of the transfer sheet and transfer recording were carried out according to the procedures described in Example 1 except that the dye used in Example 1 was replaced by the dyes set forth in Table 3 respectively, thereby brilliant cyan color recording having the color density set forth in Table 3 was obtained in each case.

The results of a light fastness test on the obtained recording and a dark place storability test on the transfer sheet and the recording were both good.

TABLE 3

| No. | Structural Formula of the Dye | Color Density of the Recording | Maximum Absorption Wavelength (Chloroform) (nm) |
|---|---|---|---|
| 6-1 | 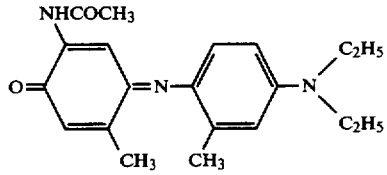 | 1.35 | 658 |
| 6-2 | 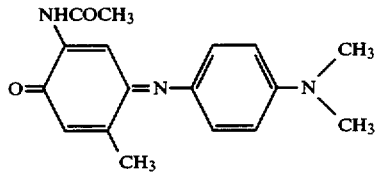 | 1.35 | 628 |
| 6-3 | 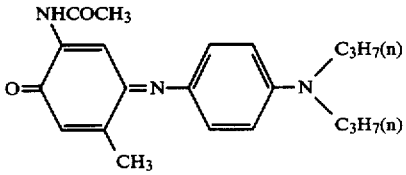 | 1.35 | 639 |
| 6-4 | 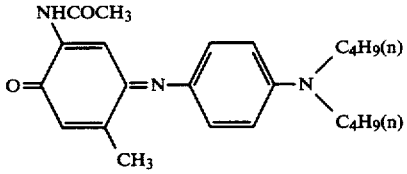 | 1.35 | 640 |
| 6-5 | 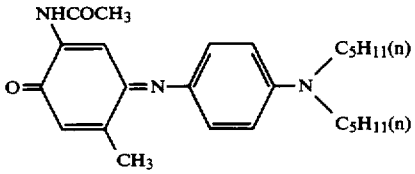 | 1.30 | 641 |

TABLE 3-continued
| No. | Structural Formula of the Dye | Color Density of the Recording | Maximum Absorption Wavelength (Chloroform) (nm) |
|---|---|---|---|
| 6-6 | 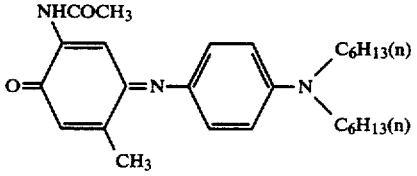 | 1.30 | 641 |
| 6-7 | 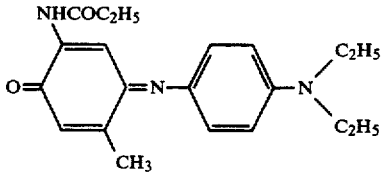 | 1.35 | 638 |
| 6-8 | 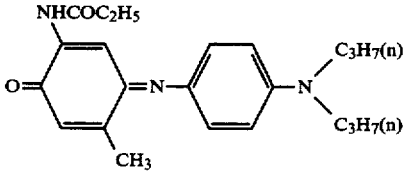 | 1.35 | 639 |
| 6-9 | 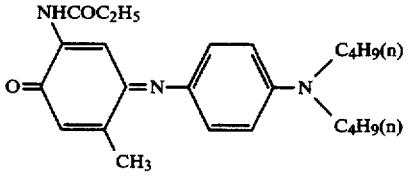 | 1.35 | 640 |
| 6-10 | 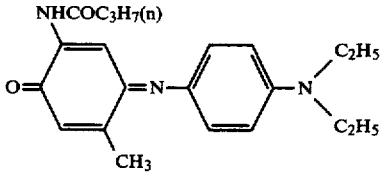 | 1.35 | 638 |
| 6-11 | 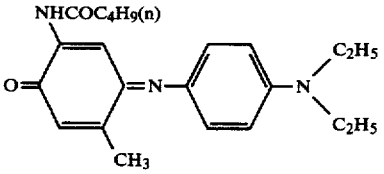 | 1.35 | 638 |
| 6-12 | 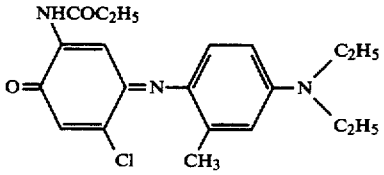 | 1.30 | 657 |
| 6-13 | 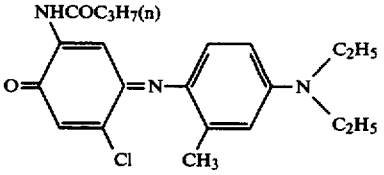 | 1.30 | 657 |

TABLE 3-continued
| No. | Structural Formula of the Dye | Color Density of the Recording | Maximum Absorption Wavelength (Chloroform) (nm) |
|---|---|---|---|
| 6-14 | 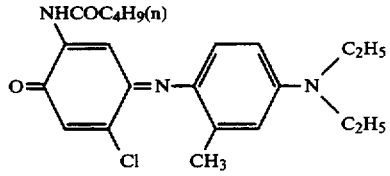 | 1.30 | 657 |
| 6-15 | 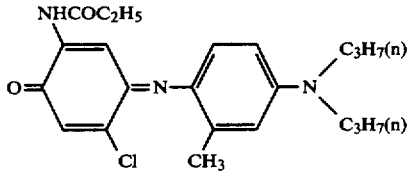 | 1.30 | 658 |
| 6-16 | 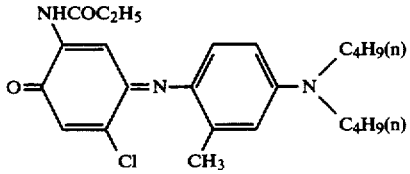 | 1.25 | 659 |
| 6-17 | 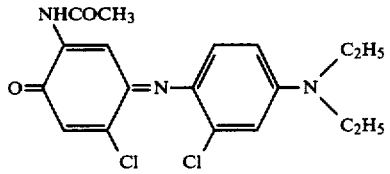 | 1.25 | 633 |
| 6-18 | 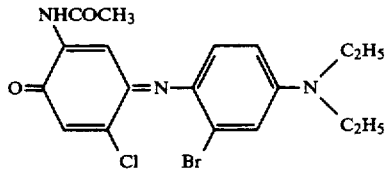 | 1.25 | 633 |
| 6-19 | 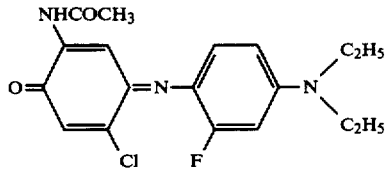 | 1.30 | 633 |
| 6-20 | 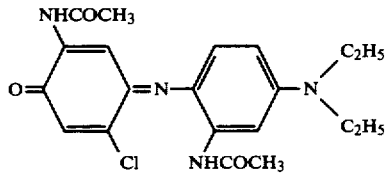 | 1.20 | 661 |
| 6-21 | 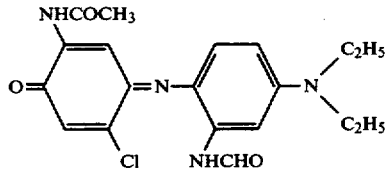 | 1.20 | 699 |

TABLE 3-continued
| No. | Structural Formula of the Dye | Color Density of the Recording | Maximum Absorption Wavelength (Chloroform) (nm) |
|---|---|---|---|
| 6-22 | 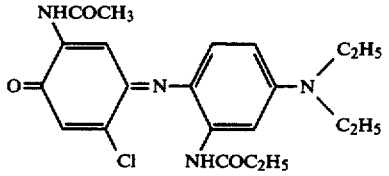 | 1.20 | 661 |
| 6-23 | 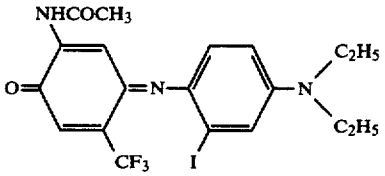 | 1.30 | 633 |
| 6-24 | 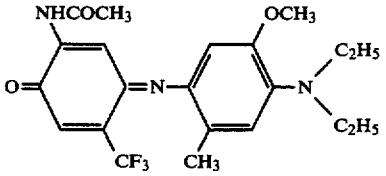 | 1.20 | 662 |
| 6-25 | 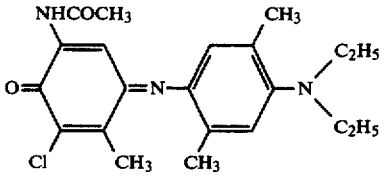 | 1.15 | 678 |
| 6-26 | 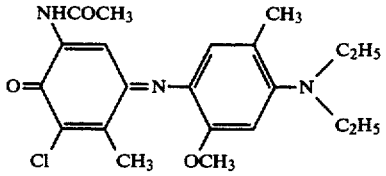 | 1.15 | 678 |
| 6-27 | 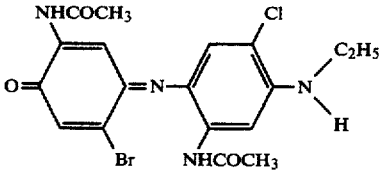 | 1.15 | 657 |
| 6-28 | 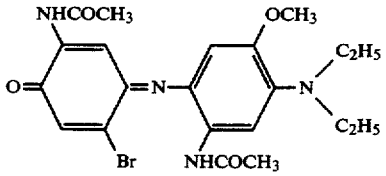 | 1.15 | 676 |
| 6-29 | 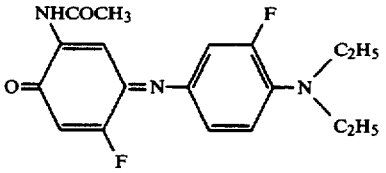 | 1.25 | 631 |

TABLE 3-continued
| No. | Structural Formula of the Dye | Color Density of the Recording | Maximum Absorption Wavelength (Chloroform) (nm) |
|---|---|---|---|
| 6-30 | 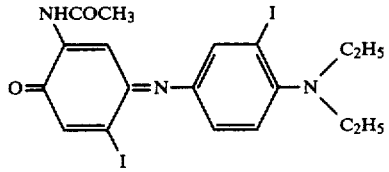 | 1.25 | 631 |
| 6-31 | 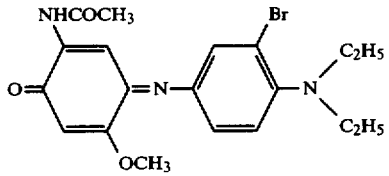 | 1.25 | 629 |
| 6-32 | 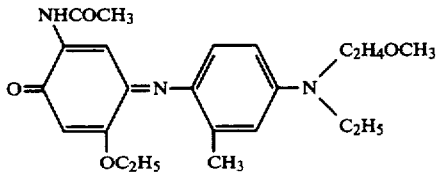 | 1.25 | 651 |
| 6-33 | 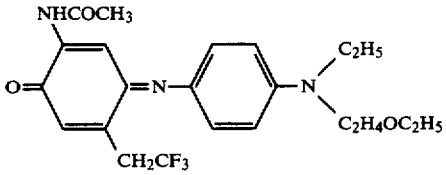 | 1.25 | 634 |
| 6-34 | 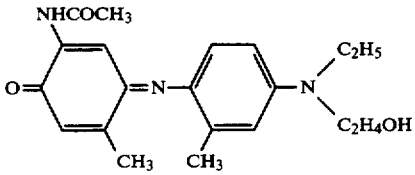 | 1.30 | 654 |
| 6-35 | 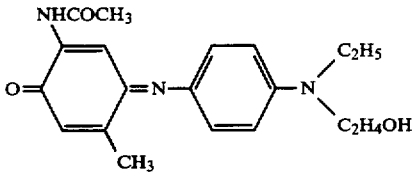 | 1.30 | 635 |
| 6-36 | 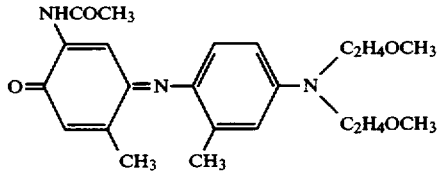 | 1.25 | 628 |
| 6-37 | 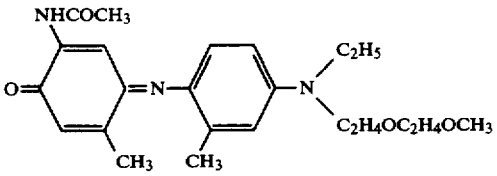 | 1.25 | 653 |

TABLE 3-continued
| No. | Structural Formula of the Dye | Color Density of the Recording | Maximum Absorption Wavelength (Chloroform) (nm) |
|---|---|---|---|
| 6-38 | 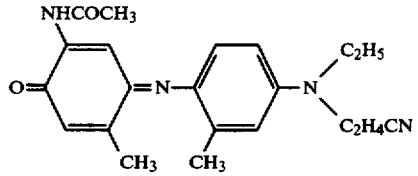 | 1.20 | 622 |
| 6-39 | 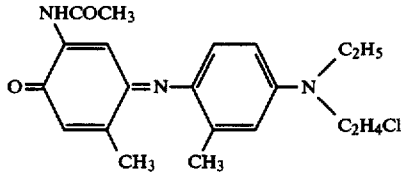 | 1.25 | 627 |
| 6-40 | 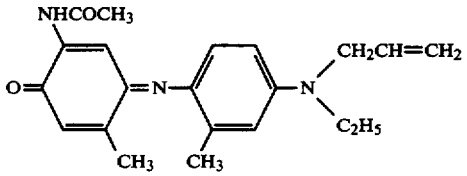 | 1.30 | 635 |
| 6-41 | 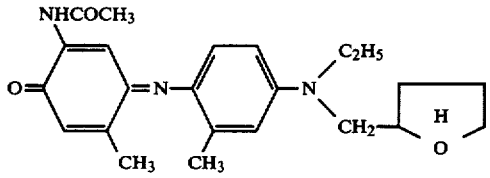 | 1.25 | 654 |
| 6-42 | 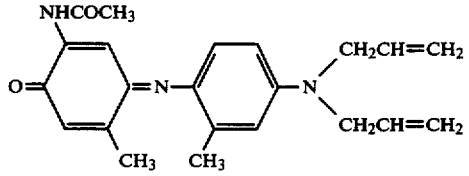 | 1.30 | 625 |
| 6-43 | 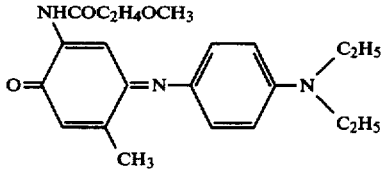 | 1.25 | 638 |
| 6-44 | 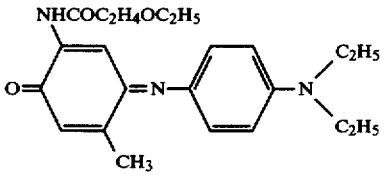 | 1.25 | 638 |
| 6-45 | 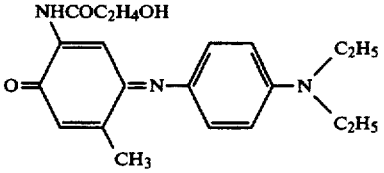 | 1.25 | 638 |

TABLE 3-continued
| No. | Structural Formula of the Dye | Color Density of the Recording | Maximum Absorption Wavelength (Chloroform) (nm) |
|---|---|---|---|
| 6-46 | 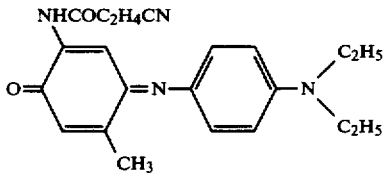 | 1.26 | 634 |
| 6-47 | 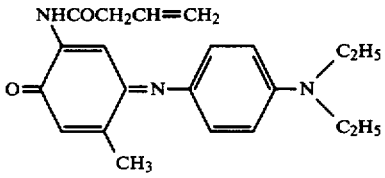 | 1.35 | 635 |
| 6-48 | 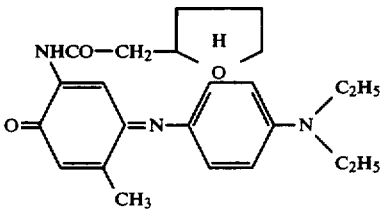 | 1.25 | 636 |
| 6-49 | 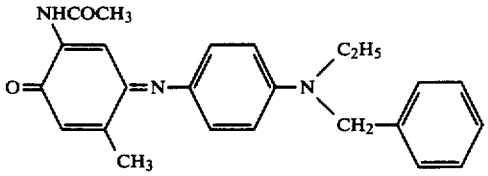 | 1.25 | 628 |
| 6-50 | 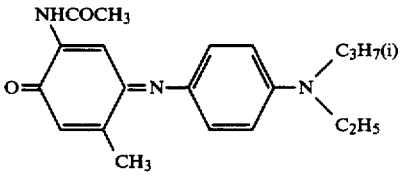 | 1.35 | 638 |
| 6-51 | 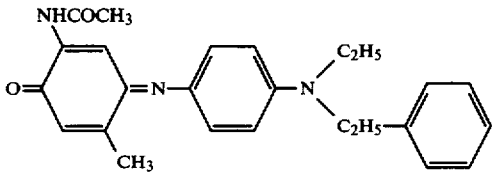 | 1.25 | 638 |
| 6-52 | 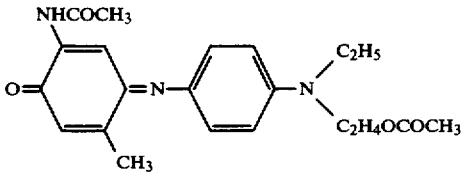 | 1.25 | 631 |
| 6-53 | 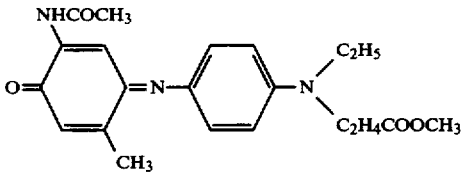 | 1.25 | 632 |

TABLE 3-continued
| No. | Structural Formula of the Dye | Color Density of the Recording | Maximum Absorption Wavelength (Chloroform) (nm) |
|---|---|---|---|
| 6-54 | 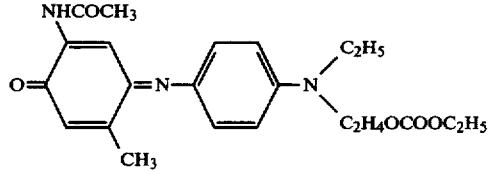 | 1.25 | 632 |
| 6-55 | 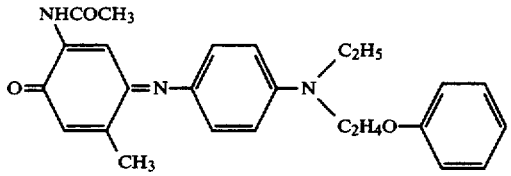 | 1.25 | 633 |
| 6-56 | 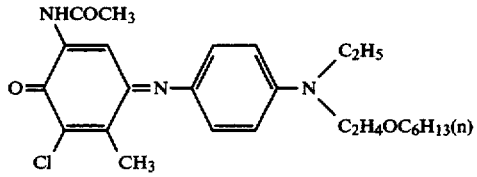 | 1.20 | 653 |
| 6-57 | 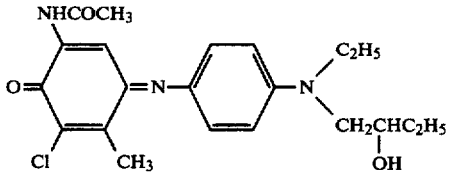 | 1.20 | 654 |
| 6-58 | 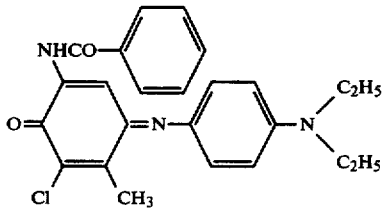 | 1.10 | 678 |
| 6-59 | 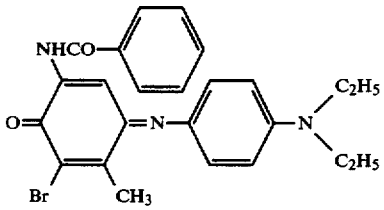 | 1.10 | 690 |
| 6-60 | 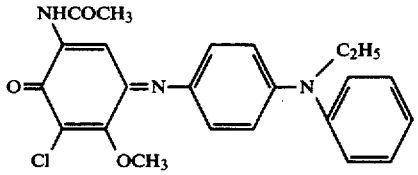 | 1.10 | 640 |
| 6-61 | 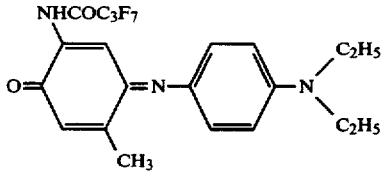 | 1.35 | 636 |

TABLE 3-continued
| No. | Structural Formula of the Dye | Color Density of the Recording | Maximum Absorption Wavelength (Chloroform) (nm) |
|---|---|---|---|
| 6-62 | 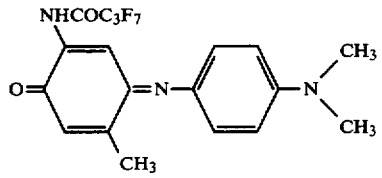 | 1.35 | 627 |
| 6-63 | 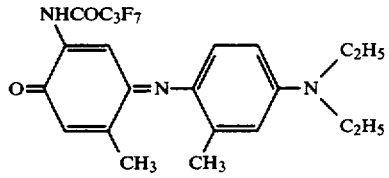 | 1.35 | 655 |
| 6-64 | 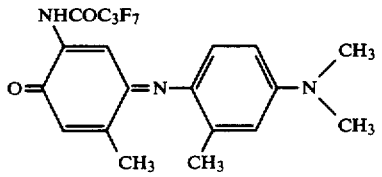 | 1.35 | 626 |
| 6-65 | 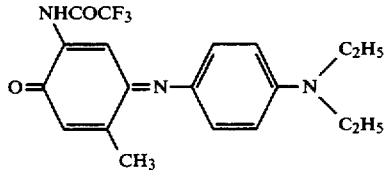 | 1.35 | 636 |
| 6-66 | 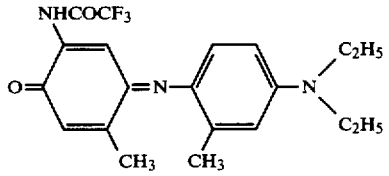 | 1.35 | 655 |
| 6-67 | 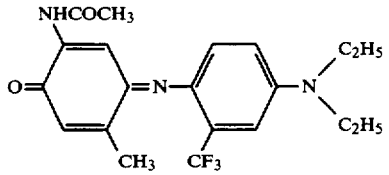 | 1.35 | 648 |
| 6-68 | 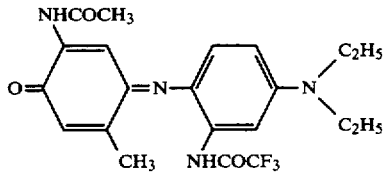 | 1.20 | 660 |
| 6-69 | 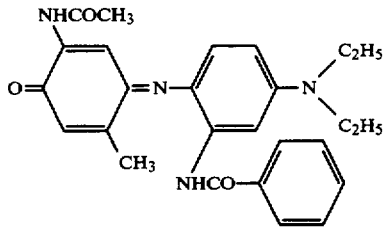 | 1.10 | 647 |

TABLE 3-continued

| No. | Structural Formula of the Dye | Color Density of the Recording | Maximum Absorption Wavelength (Chloroform) (nm) |
|---|---|---|---|
| 6-70 | 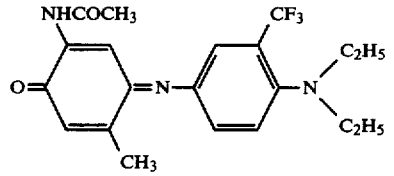 | 1.30 | 646 |

EXAMPLE 7

Preparation of the ink, preparation of the transfer sheet and transfer recording were carried out according to the procedures described in Example 1 except that the dye used in Example 1 was replaced by a dye of the following structural formula:

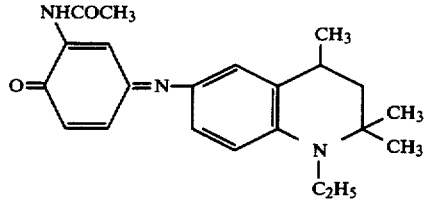

thereby it was possible to obtain uniform brilliant cyan color recording having a high color density. The color density of the obtained recording was 1.25.

A light fastness test was conducted on the obtained recording according to the procedures described in Example 1, to find that there was hardly decoloration or change in color after exposure to light for 40 hours. Further, the transfer sheet and the obtained recording were both stable against heat and moisture, and were excellent in dark place storability.

The dye used in this example was produced as follows:

3.0 g of 2-acetamidophenol of the following structural formula:

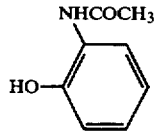

and 5.1 g of a compound of the following structural formula:

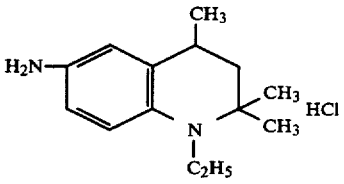

were added to 200 ml of methanol, stirred at room temperature, and then a solution of 3.4 g of silver nitrate in 15 ml of water was added dropwise. 15 ml of a 28% ammonia water was added thereto, further a solution of 10.5 g of silver nitrate in 10 ml of water was added dropwise, and the reaction was effected at 30°-40° C. for 3 hours. After completion of the reaction, it was extracted with chloroform, the solvent was distilled off, and the residue was purified by column chromatography using chloroform to obtain 5.3 g (yield 73% based on the theoretical yield) of a purified product of an indoaniline type dye of the following structural formula:

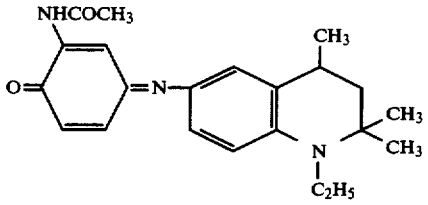

The maximum absorption wavelength of the above dye was 652 nm (chloroform).

EXAMPLE 8

Preparation of the ink, preparation of the transfer sheet and transfer recording were carried out according to the procedures described in Example 1 except that the dye used in Example 1 was placed by the dyes set forth in Table 4 respectively, thereby brilliant cyan color recording having the color density set forth in Table 4 was obtained in each case.

The results of a light fastness test on the obtained recording and a dark place storability test on the transfer sheet and the recording were both good.

TABLE 4
| No. | Structural Formula of the Dye | Color Density of the Recording | Maximum Absorption Wavelength (Chloroform) (nm) |
|---|---|---|---|
| 8-1 | 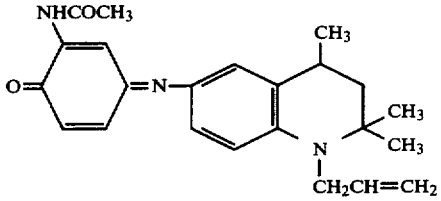 | 1.25 | 646 |
| 8-2 | 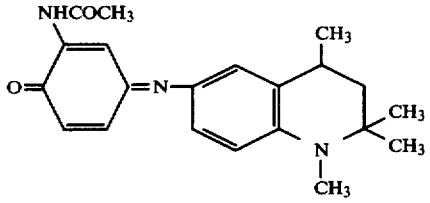 | 1.20 | 648 |
| 8-3 | 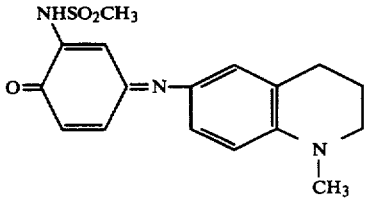 | 1.20 | 646 |
| 8-4 | 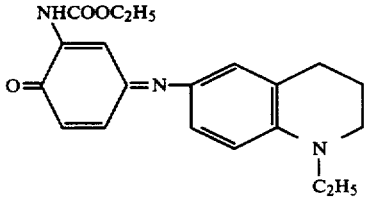 | 1.25 | 650 |
| 8-5 | 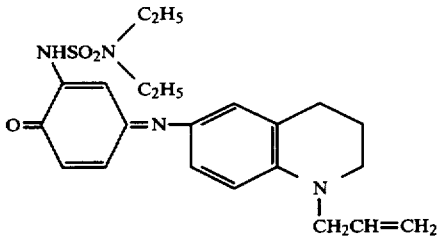 | 1.25 | 614 |
| 8-6 | 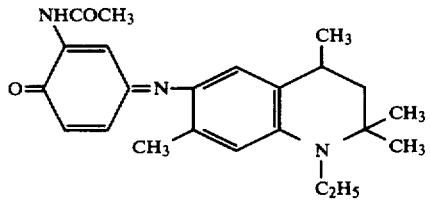 | 1.15 | 672 |
| 8-7 | 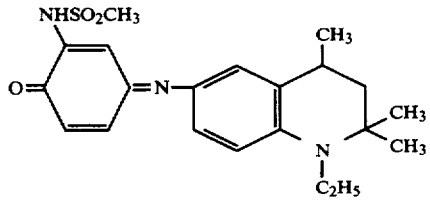 | 1.20 | 653 |

TABLE 4-continued
| No. | Structural Formula of the Dye | Color Density of the Recording | Maximum Absorption Wavelength (Chloroform) (nm) |
|---|---|---|---|
| 8-8 | 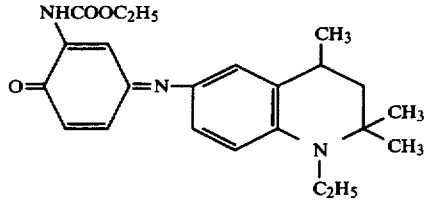 | 1.20 | 653 |
| 8-9 | 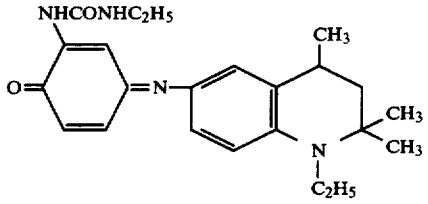 | 1.10 | 653 |
| 8-10 | 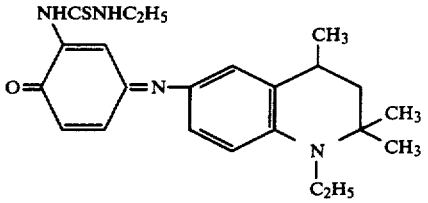 | 1.10 | 653 |
| 8-11 | 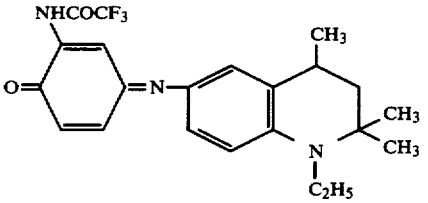 | 1.25 | 655 |
| 8-12 | 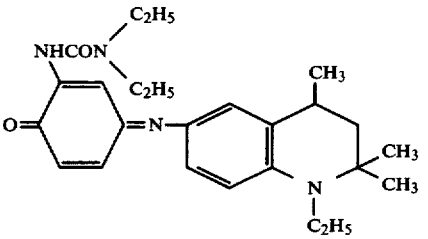 | 1.10 | 653 |
| 8-13 | 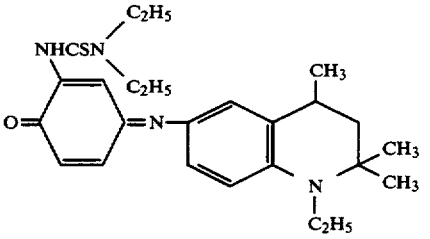 | 1.10 | 653 |
| 8-14 | 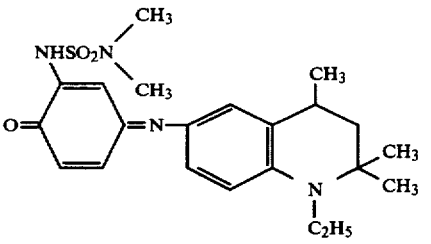 | 1.10 | 654 |

TABLE 4-continued
| No. | Structural Formula of the Dye | Color Density of the Recording | Maximum Absorption Wavelength (Chloroform) (nm) |
|---|---|---|---|
| 8-15 | 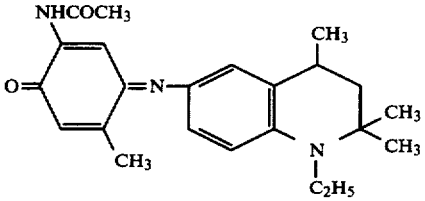 | 1.15 | 657 |
| 8-16 | 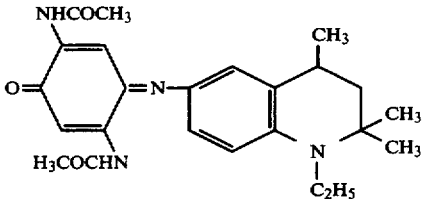 | 1.10 | 657 |
| 8-17 | 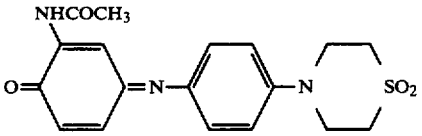 | 1.30 | 620 |
| 8-18 | 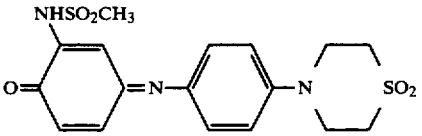 | 1.30 | 621 |
| 8-19 | 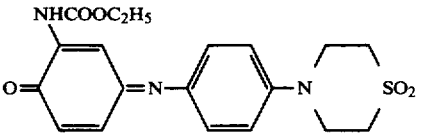 | 1.30 | 621 |
| 8-20 | 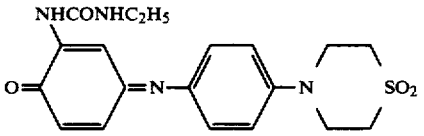 | 1.25 | 621 |
| 8-21 | 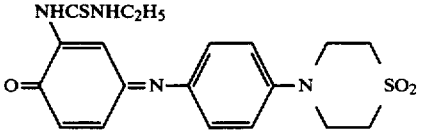 | 1.25 | 622 |
| 8-22 | 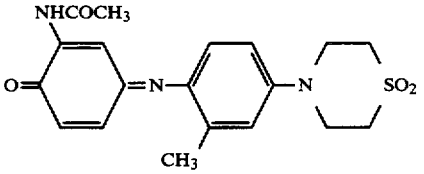 | 1.30 | 636 |
| 8-23 | 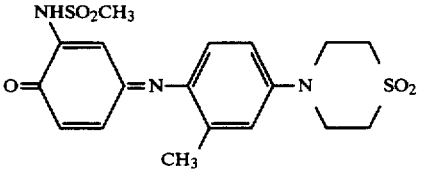 | 1.30 | 637 |

TABLE 4-continued
| No. | Structural Formula of the Dye | Color Density of the Recording | Maximum Absorption Wavelength (Chloroform) (nm) |
|---|---|---|---|
| 8-24 | 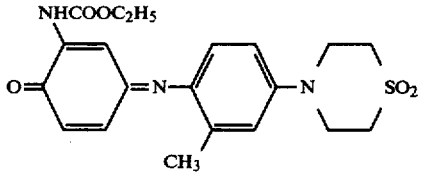 | 1.30 | 637 |
| 8-25 | 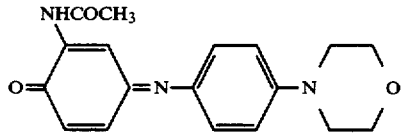 | 1.30 | 623 |
| 8-26 | 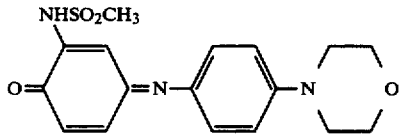 | 1.30 | 624 |
| 8-27 | 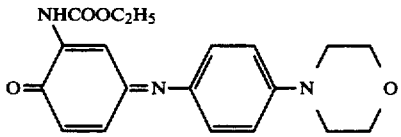 | 1.30 | 624 |
| 8-28 | 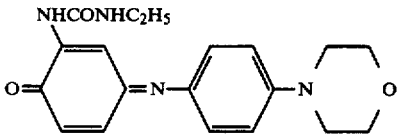 | 1.25 | 624 |
| 8-29 | 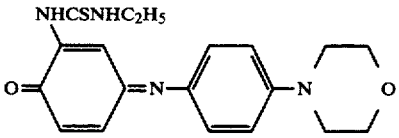 | 1.25 | 625 |
| 8-30 | 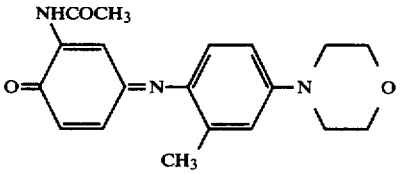 | 1.30 | 638 |
| 8-31 | 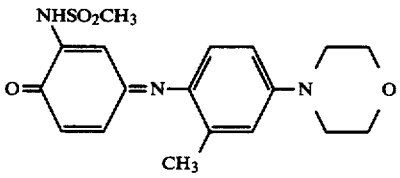 | 1.30 | 639 |
| 8-32 | 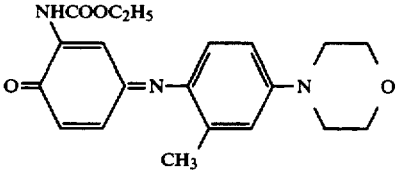 | 1.30 | 639 |

TABLE 4-continued
| No. | Structural Formula of the Dye | Color Density of the Recording | Maximum Absorption Wavelength (Chloroform) (nm) |
|---|---|---|---|
| 8-33 | 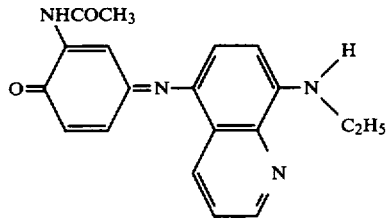 | 1.15 | 660 |
| 8-34 | 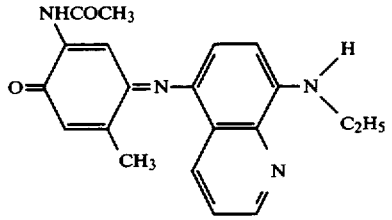 | 1.10 | 662 |
| 8-35 | 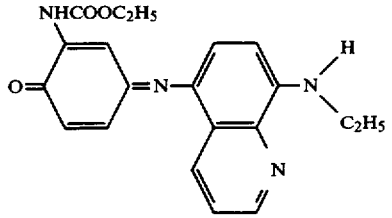 | 1.10 | 661 |
| 8-36 | 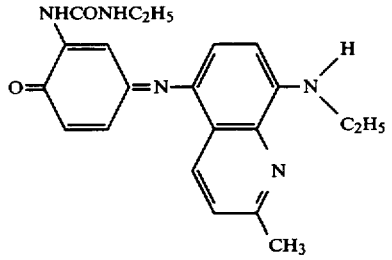 | 1.10 | 659 |
| 8-37 | 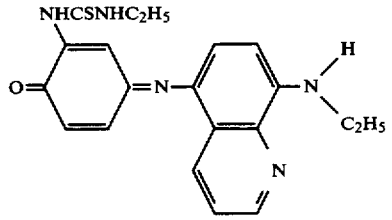 | 1.10 | 661 |
| 8-38 | 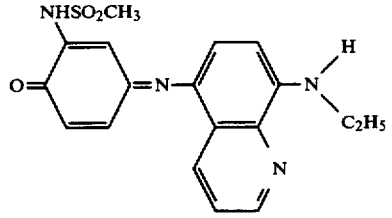 | 1.15 | 661 |

TABLE 4-continued
| No. | Structural Formula of the Dye | Color Density of the Recording | Maximum Absorption Wavelength (Chloroform) (nm) |
|---|---|---|---|
| 8-39 | 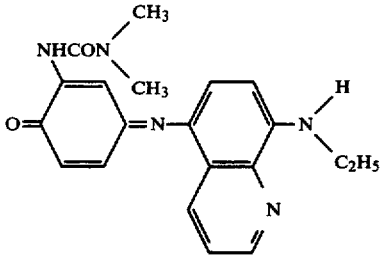 | 1.10 | 661 |
| 8-40 | 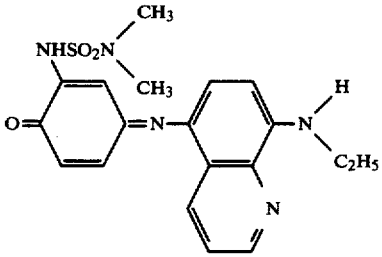 | 1.10 | 661 |
| 8-41 | 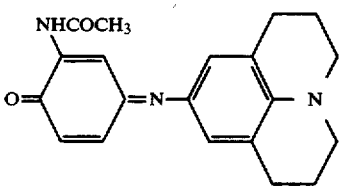 | 1.15 | 663 |
| 8-42 | 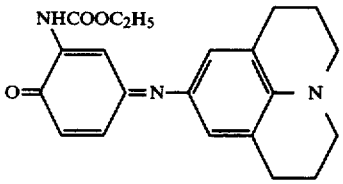 | 1.15 | 665 |
| 8-43 | 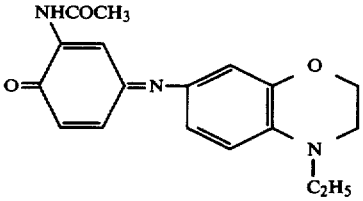 | 1.20 | 656 |
| 8-44 | 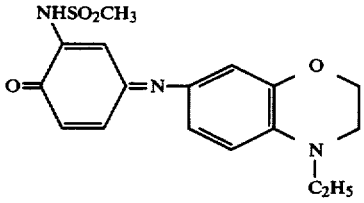 | 1.20 | 657 |
| 8-45 | 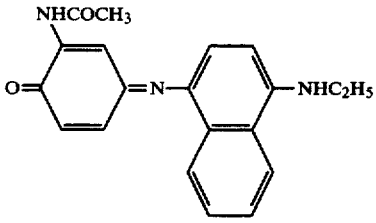 | 1.15 | 658 |

TABLE 4-continued
| No. | Structural Formula of the Dye | Color Density of the Recording | Maximum Absorption Wavelength (Chloroform) (nm) |
|---|---|---|---|
| 8-46 | 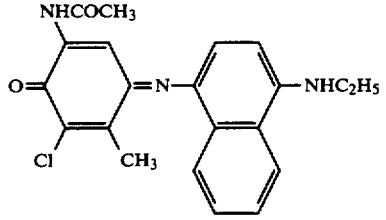 | 1.05 | 680 |
| 8-47 | 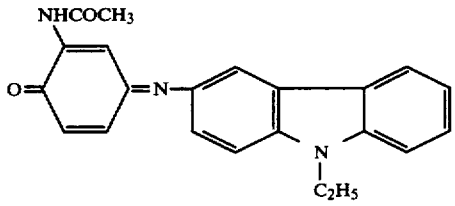 | 1.05 | 660 |
| 8-48 | 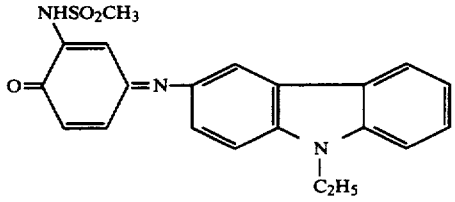 | 1.05 | 661 |
| 8-49 | 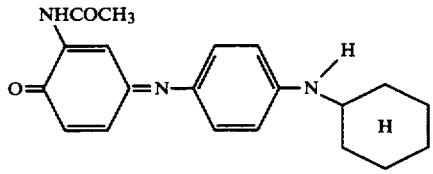 | 1.15 | 620 |
| 8-50 | 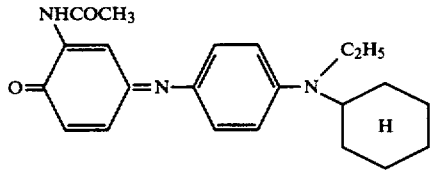 | 1.15 | 634 |
| 8-51 | 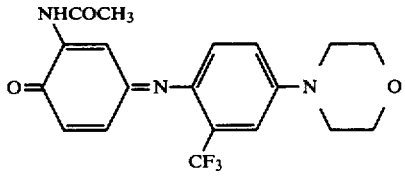 | 1.30 | 630 |
| 8-52 | 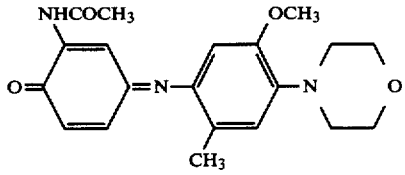 | 1.20 | 642 |
| 8-53 | 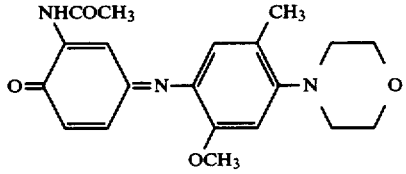 | 1.20 | 643 |

TABLE 4-continued
| No. | Structural Formula of the Dye | Color Density of the Recording | Maximum Absorption Wavelength (Chloroform) (nm) |
|---|---|---|---|
| 8-54 | 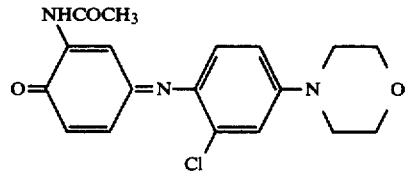 | 1.20 | 618 |
| 8-55 | 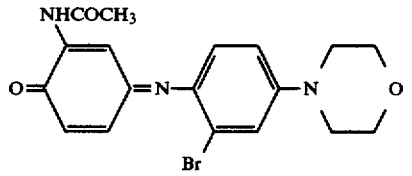 | 1.20 | 618 |
| 8-56 | 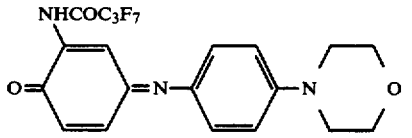 | 1.30 | 625 |
| 8-57 | 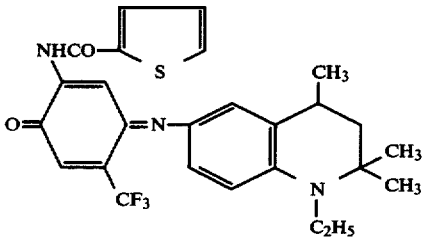 | 1.10 | 657 |
| 8-58 | 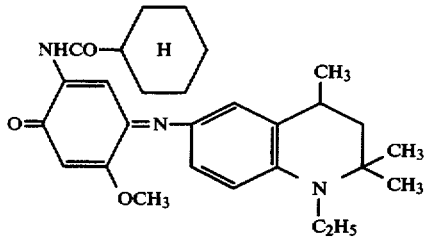 | 1.10 | 656 |
| 8-59 | 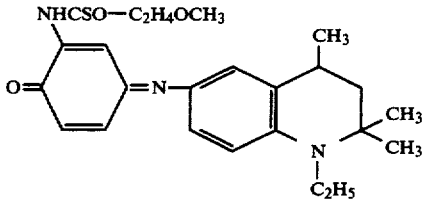 | 1.05 | 652 |
| 8-60 | 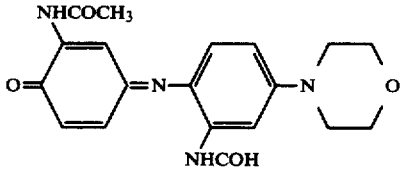 | 1.25 | 645 |
| 8-61 | 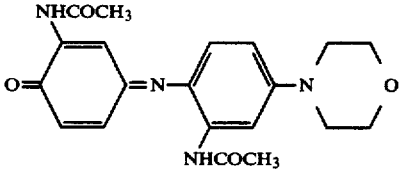 | 1.20 | 646 |

TABLE 4-continued

| No. | Structural Formula of the Dye | Color Density of the Recording | Maximum Absorption Wavelength (Chloroform) (nm) |
|---|---|---|---|
| 8-62 | 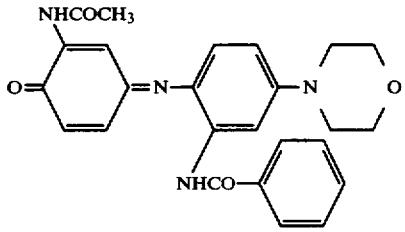 | 1.15 | 640 |
| 8-63 | 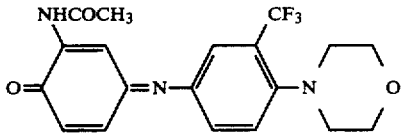 | 1.25 | 628 |

EXAMPLE 9

Preparation of the ink, preparation of the transfer sheet and transfer recording were carried out according to the procedures described in Example 1 except that the dye used in Example 1 was replaced by a dye of the following structural formula:

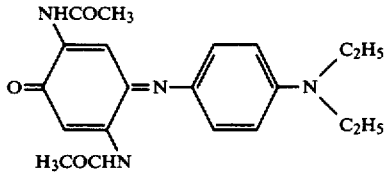

thereby it was possible to obtain uniform brilliant cyan color reproducing having a high color density of 1.30.

A light fastness test was conducted on the obtained recording according to the procedures described in Example 1 to find that there was hardly decoloration or change in color after exposure to light for 40 hours. Further, the transfer sheet and the recording were both stable against heat and moisture, and were excellent in dark place storability.

The dye used in this example was produced as follows:

300 ml of ethanol was added to 4.1 g of 2,5-bisacetamidophenol of the following structural formula:

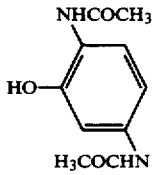

and 5.3 g of a compound of the following structural formula:

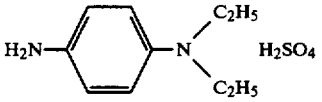

stirred at room temperature, and then a solution of 3.4 g of silver nitrate in 15 ml of water was added dropwise. 15 ml of a 28% ammonia water was added thereto, further a solution of 10.5 g of silver nitrate in 10 ml of water was added dropwise, and the reaction was effected at 30°-40° C. for 3 hours. After completion of the reaction, it was extracted with chloroform, the solvent was distilled off, and the residue was purified by column chromatography using chloroform to obtain 5.7 g (yield 78% based on the theoretical yield) of a purified product of an indoaniline type dye of the following structural formula:

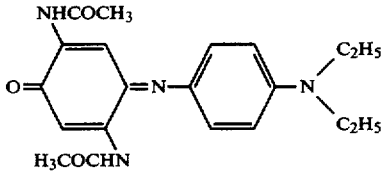

The mass spectrum of the above dye was m/e=368, and its maximum absorption wavelength was 634 nm (chloroform).

EXAMPLE 10

Preparation of the ink, preparation of the transfer sheet and transfer recording were carried out according to the procedures described in Example 1 except that the dye used in Example 1 was replaced by the dyes set forth in Table 5 respectively, thereby brilliant cyan color recording having the color density set forth in Table 5 was obtained in each case.

The results of a light fastness test on the obtained recording and a dark place storability test on the transfer sheet and the recording were both good.

TABLE 5
| No. | Structural Formula of the Dye | Color Density of the Recording | Maximum Absorption Wavelength (Chloroform (nm) |
|---|---|---|---|
| 10-1 | 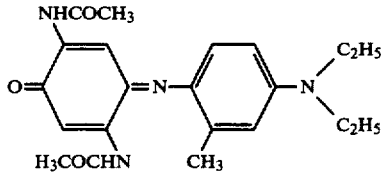 | 1.30 | 654 |
| 10-2 | 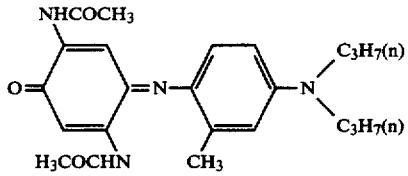 | 1.30 | 655 |
| 10-3 | 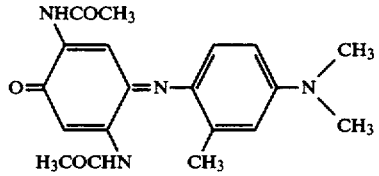 | 1.25 | 640 |
| 10-4 | 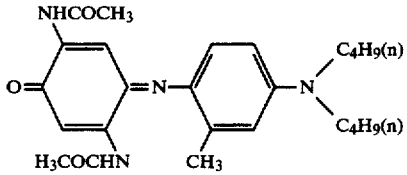 | 1.25 | 656 |
| 10-5 | 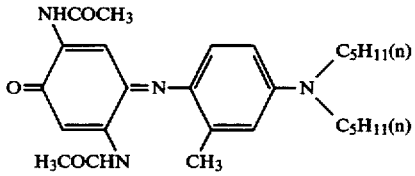 | 1.20 | 657 |
| 10-6 | 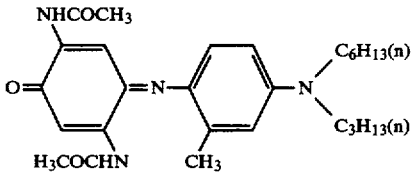 | 1.15 | 658 |
| 10-7 | 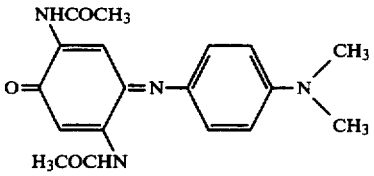 | 1.25 | 620 |
| 10-8 | 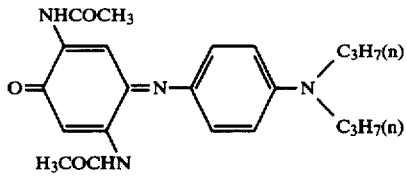 | 1.30 | 635 |

TABLE 5-continued
| No. | Structural Formula of the Dye | Color Density of the Recording | Maximum Absorption Wavelength (Chloroform (nm) |
|---|---|---|---|
| 10-9 | 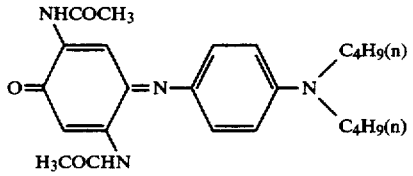 | 1.25 | 636 |
| 10-10 | 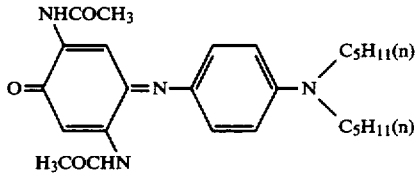 | 1.25 | 637 |
| 10-11 | 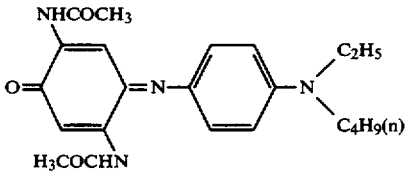 | 1.30 | 635 |
| 10-12 | 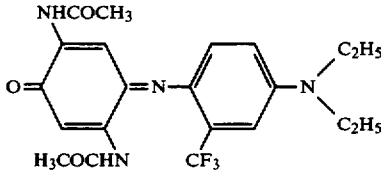 | 1.30 | 644 |
| 10-13 | 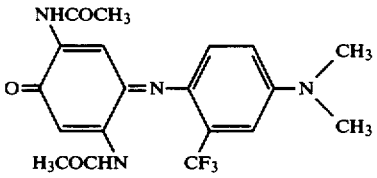 | 1.25 | 630 |
| 10-14 | 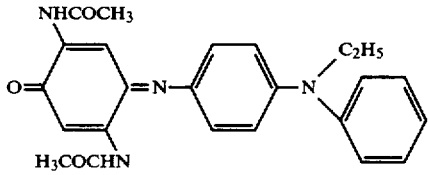 | 1.15 | 630 |
| 10-15 | 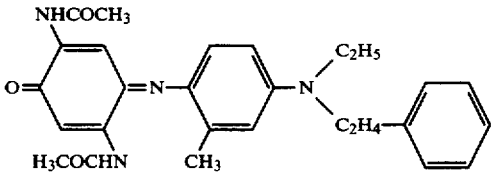 | 1.10 | 650 |
| 10-16 | 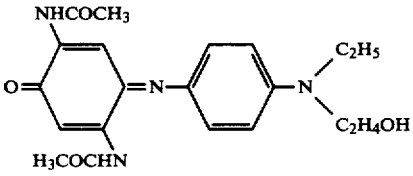 | 1.15 | 634 |

TABLE 5-continued
| No. | Structural Formula of the Dye | Color Density of the Recording | Maximum Absorption Wavelength (Chloroform (nm) |
|---|---|---|---|
| 10-17 | 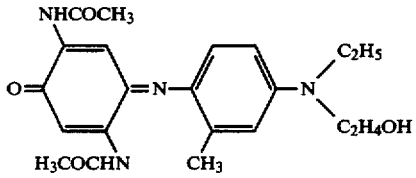 | 1.10 | 654 |
| 10-18 | 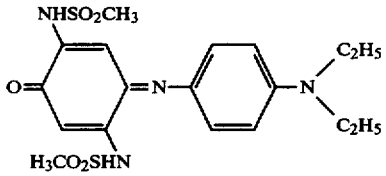 | 1.30 | 638 |
| 10-19 | 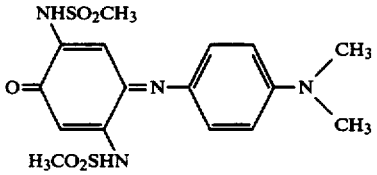 | 1.25 | 622 |
| 10-20 | 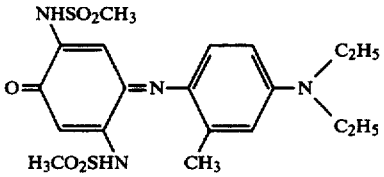 | 1.30 | 658 |
| 10-21 | 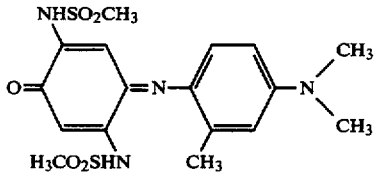 | 1.25 | 642 |
| 10-22 | 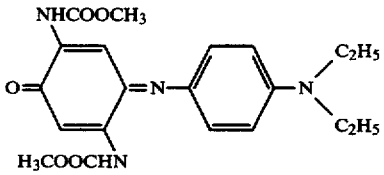 | 1.25 | 638 |
| 10-23 | 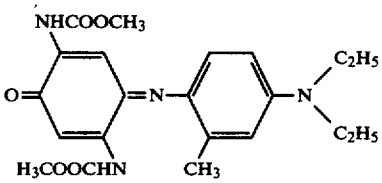 | 1.25 | 657 |
| 10-24 | 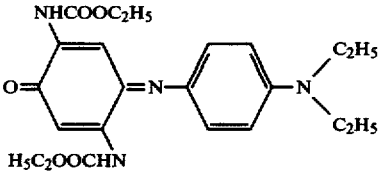 | 1.25 | 638 |

TABLE 5-continued
| No. | Structural Formula of the Dye | Color Density of the Recording | Maximum Absorption Wavelength (Chloroform (nm) |
|---|---|---|---|
| 10-25 | 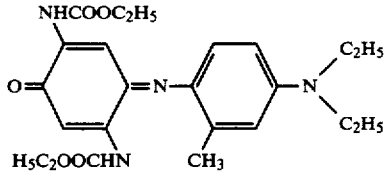 | 1.25 | 658 |
| 10-26 | 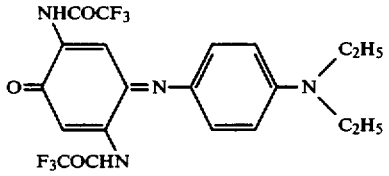 | 1.30 | 638 |
| 10-27 | 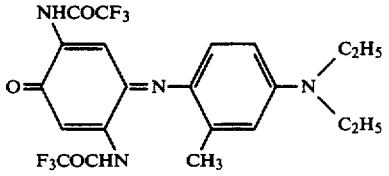 | 1.30 | 658 |
| 10-28 | 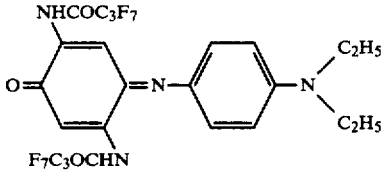 | 1.25 | 639 |
| 10-29 | 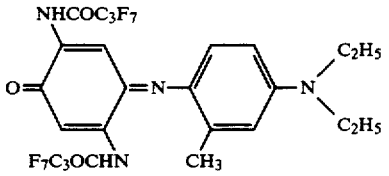 | 1.25 | 659 |
| 10-30 | 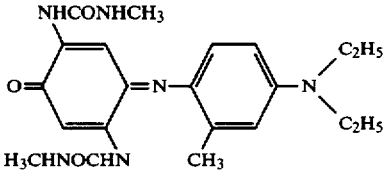 | 1.20 | 657 |
| 10-31 | 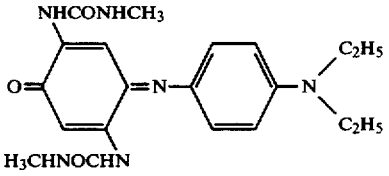 | 1.20 | 637 |
| 10-32 | 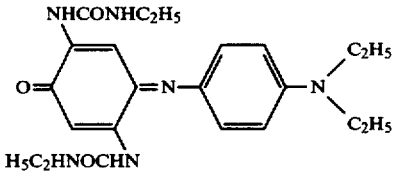 | 1.20 | 637 |

TABLE 5-continued
| No. | Structural Formula of the Dye | Color Density of the Recording | Maximum Absorption Wavelength (Chloroform (nm) |
|---|---|---|---|
| 10-33 | 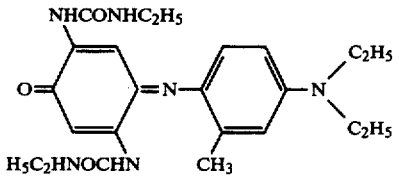 | 1.20 | 658 |
| 10-34 | 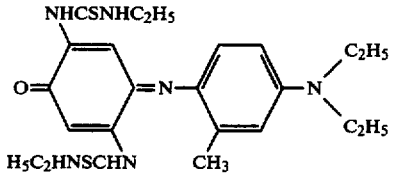 | 1.20 | 658 |
| 10-35 | 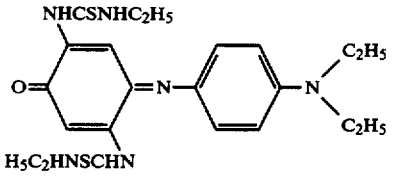 | 1.20 | 637 |
| 10-36 | 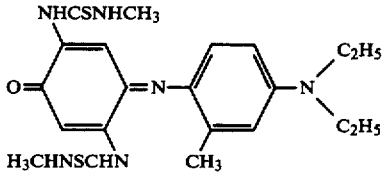 | 1.20 | 658 |
| 10-37 | 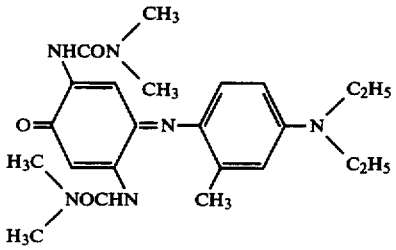 | 1.15 | 657 |
| 10-38 | 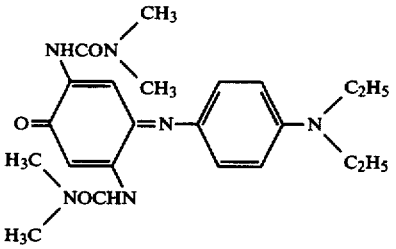 | 1.15 | 636 |
| 10-39 | 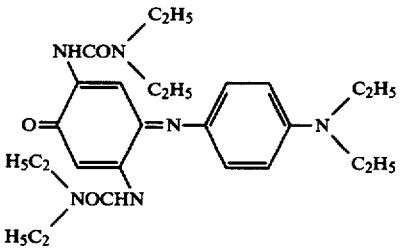 | 1.15 | 636 |

TABLE 5-continued
| No. | Structural Formula of the Dye | Color Density of the Recording | Maximum Absorption Wavelength (Chloroform (nm) |
|---|---|---|---|
| 10-40 | 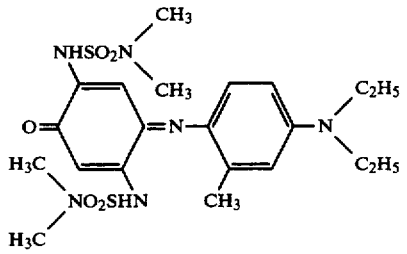 | 1.10 | 656 |
| 10-41 | 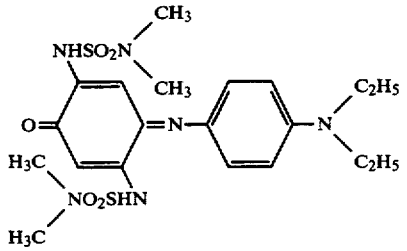 | 1.10 | 636 |
| 10-42 | 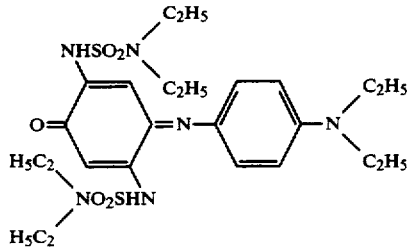 | 1.10 | 636 |
| 10-43 | 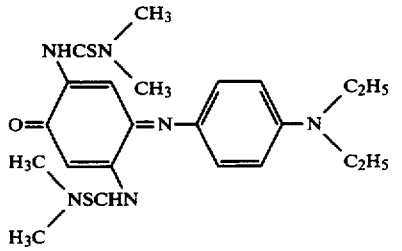 | 1.15 | 636 |
| 10-44 | 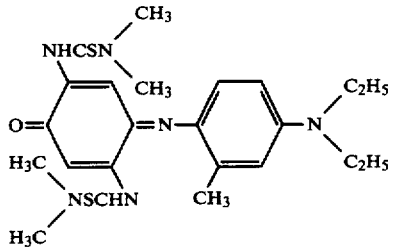 | 1.15 | 657 |
| 10-45 | 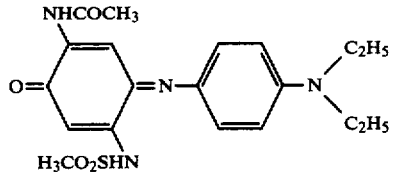 | 1.30 | 635 |

TABLE 5-continued
| No. | Structural Formula of the Dye | Color Density of the Recording | Maximum Absorption Wavelength (Chloroform (nm) |
|---|---|---|---|
| 10-46 | 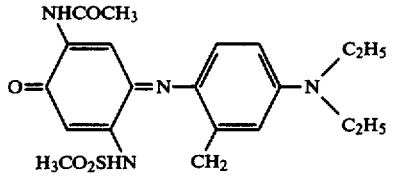 | 1.30 | 655 |
| 10-47 | 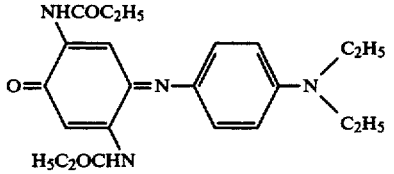 | 1.30 | 634 |
| 10-48 | 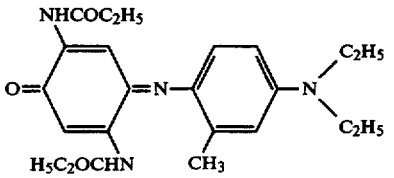 | 1.30 | 654 |
| 10-49 | 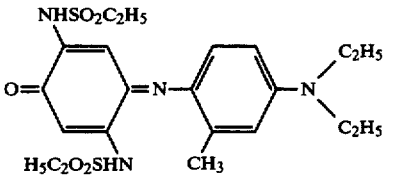 | 1.30 | 658 |
| 10-50 | 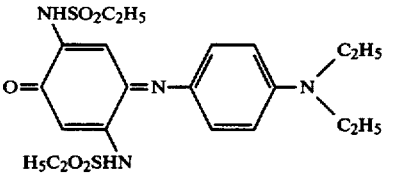 | 1.30 | 638 |
| 10-51 | 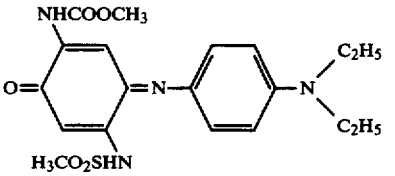 | 1.25 | 635 |
| 10-52 | 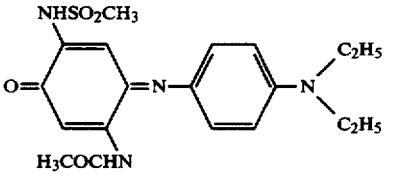 | 1.30 | 635 |
| 10-53 | 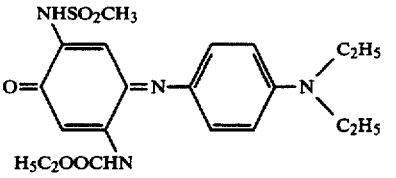 | 1.25 | 636 |

TABLE 5-continued
| No. | Structural Formula of the Dye | Color Density of the Recording | Maximum Absorption Wavelength (Chloroform (nm) |
|---|---|---|---|
| 10-54 | 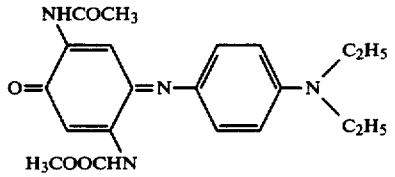 | 1.25 | 636 |
| 10-55 | 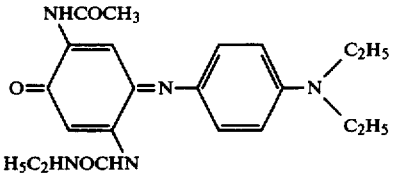 | 1.25 | 636 |
| 10-56 | 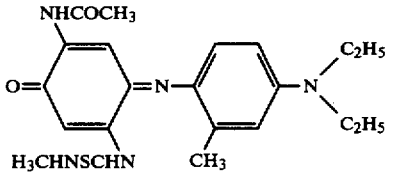 | 1.25 | 656 |
| 10-57 | 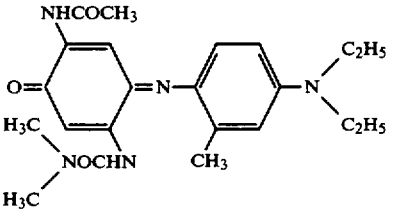 | 1.20 | 656 |
| 10-58 | 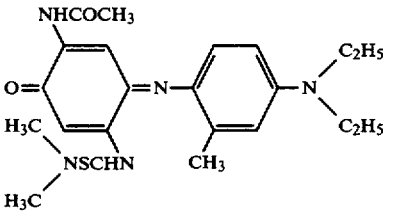 | 1.20 | 657 |
| 10-59 | 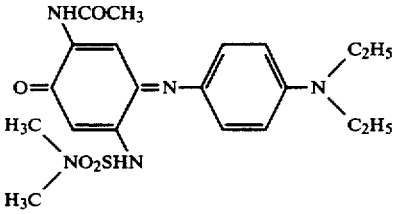 | 1.20 | 635 |
| 10-60 | 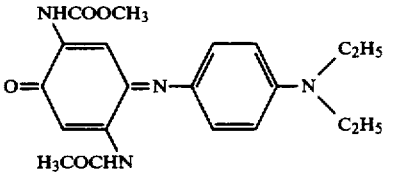 | 1.30 | 636 |
| 10-61 | 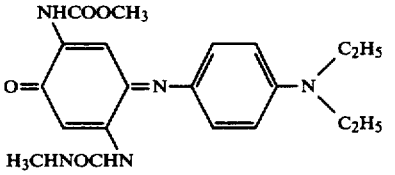 | 1.25 | 638 |

TABLE 5-continued
| No. | Structural Formula of the Dye | Color Density of the Recording | Maximum Absorption Wavelength (Chloroform (nm) |
|---|---|---|---|
| 10-62 | 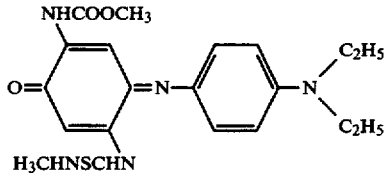 | 1.25 | 638 |
| 10-63 | 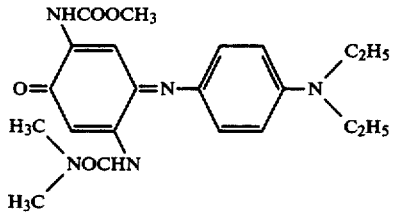 | 1.20 | 638 |
| 10-64 | 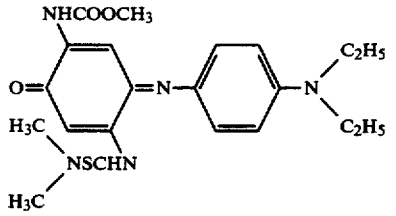 | 1.20 | 638 |
| 10-65 | 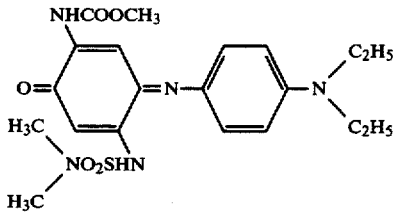 | 1.20 | 638 |
| 10-66 | 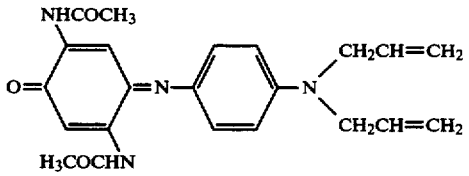 | 1.30 | 620 |
| 10-67 | 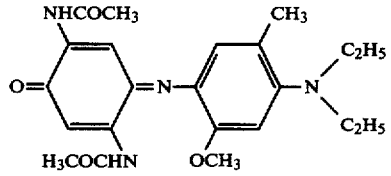 | 1.15 | 672 |
| 10-68 | 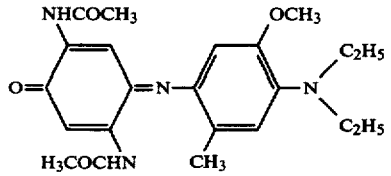 | 1.15 | 670 |

TABLE 5-continued
| No. | Structural Formula of the Dye | Color Density of the Recording | Maximum Absorption Wavelength (Chloroform (nm) |
|---|---|---|---|
| 10-69 | 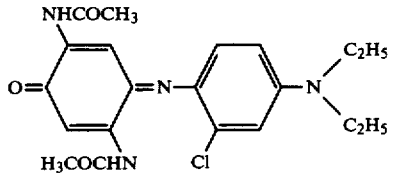 | 1.20 | 628 |
| 10-70 | 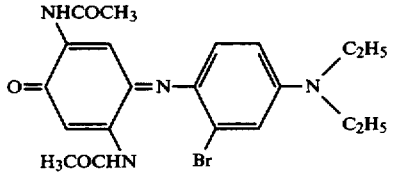 | 1.15 | 628 |
| 10-71 | 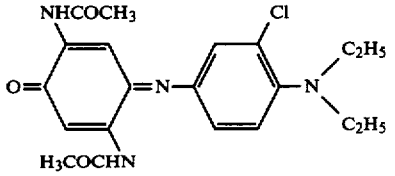 | 1.20 | 627 |
| 10-72 | 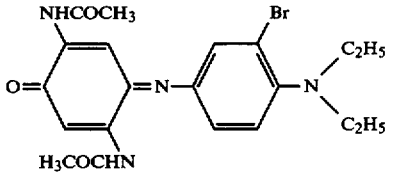 | 1.15 | 627 |
| 10-73 | 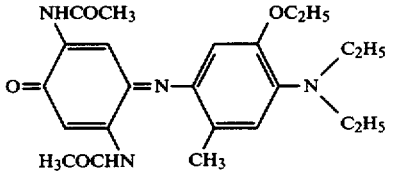 | 1.15 | 671 |
| 10-74 | 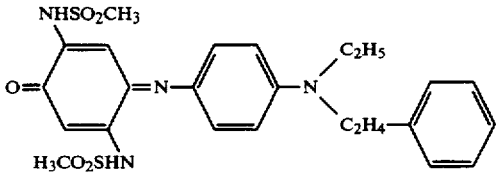 | 1.10 | 635 |
| 10-75 | 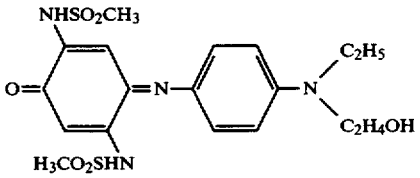 | 1.15 | 638 |
| 10-76 | 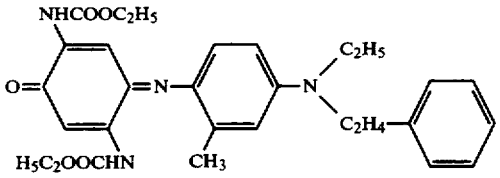 | 1.10 | 653 |

TABLE 5-continued
| No. | Structural Formula of the Dye | Color Density of the Recording | Maximum Absorption Wavelength (Chloroform (nm) |
|---|---|---|---|
| 10-77 | 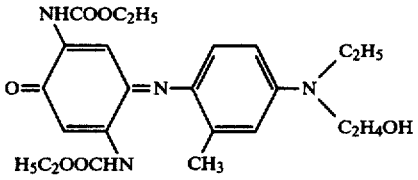 | 1.10 | 657 |
| 10-78 | 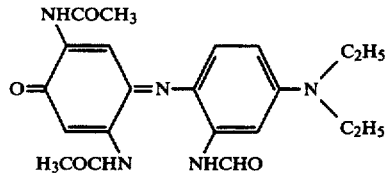 | 1.20 | 663 |
| 10-79 | 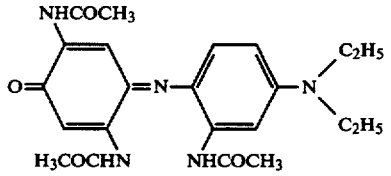 | 1.20 | 665 |
| 10-80 | 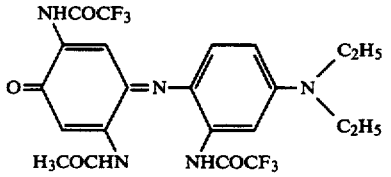 | 1.20 | 663 |
| 10-81 | 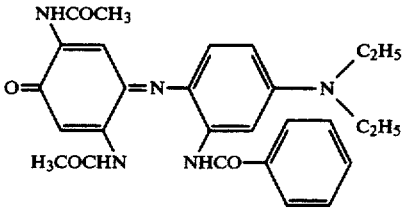 | 1.10 | 658 |
| 10-82 | 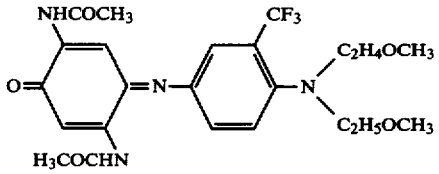 | 1.10 | 648 |
| 10-83 | 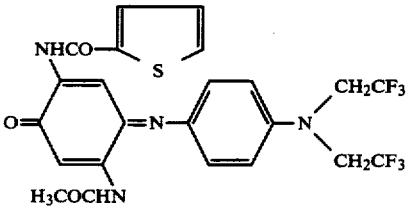 | 1.15 | 620 |
| 10-84 | 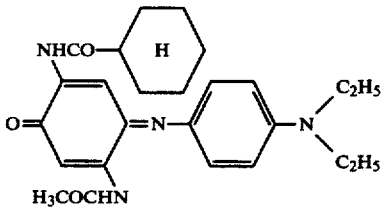 | 1.15 | 635 |

TABLE 5-continued

| No. | Structural Formula of the Dye | Color Density of the Recording | Maximum Absorption Wavelength (Chloroform (nm) |
|---|---|---|---|
| 10-85 | 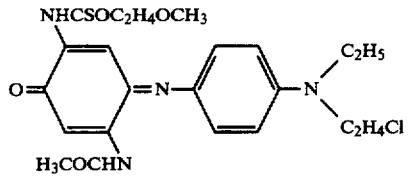 | 1.10 | 616 |

EXAMPLE 11

Preparation of the ink, preparation of the transfer sheet and transfer recording were carried out according to the procedure described in Example 1 except that the dye used in Example 1 was replaced by a dye of the following structural formula:

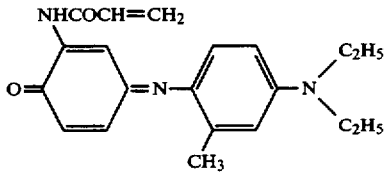

thereby it was possible to obtain uniform brilliant cyan color recording having a high color density of 1.40.

Further, a light fastness test was conducted on the obtained recording according to the procedures described in Example 1 to find that there was hardly decoloration or change in color after exposure to light for 40 hours.

The dye used in this example was produced as follows:

3.1 g of phenol compound of the following structural formula:

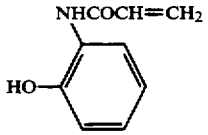

and 4.3 g of a compound of the following structural formula:

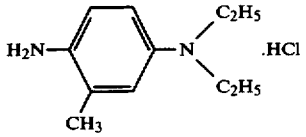

were added to 150 ml of ethanol, stirred at room temperature, and then a solution of 3.4 g of silver nitrate in 15 ml of water was added dropwise. Thereafter, 15 ml of a 28% ammonia water was added thereto, further a solution of 10.5 g of silver nitrate in 10 ml of water was added dropwise, and the reaction was effected at 30°–40° C. for 3 hours. After completion of the reaction, it was extracted with chloroform, the solvent was distilled off, and then the residue was purified by column chromatography using chloroform, to obtain a purified product of an indoaniline compound of the following structural formula:

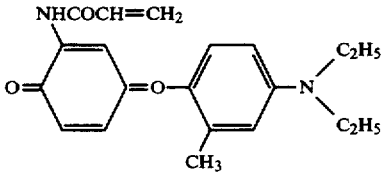

The maximum absorption wavelength (chloroform) of this product was 659 nm.

EXAMPLE 12

The indoaniline compounds set forth in Table 6 below were produced according to the procedures described in Example 11. The maximum absorption wavelength (chloroform) of each obtained indoaniline compound is shown in Table 6.

Preparation of the ink, preparation of the transfer sheet and transfer recording were carried out according to the procedures described in Example 1 except that the dye used in Example 1 was replaced by the indoaniline compounds set forth in Table 6 as the dyes respectively, thereby it was possible to obtain uniform brilliant cyan color recording having the color density set forth in Table 6 in each case.

A light fastness test was conducted on the obtained recording according to the procedures described in Example 1 to find that there was hardly decoloration or change in color.

TABLE 6
| No. | Structural Formula of the Dye | Color Density of the Recording | Maximum Absorption Wavelength (Chloroform) (nm) |
|---|---|---|---|
| 12-1 | 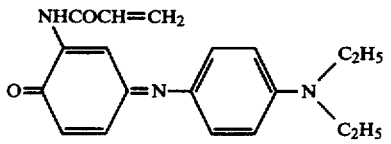 | 1.40 | 639 |
| 12-2 | 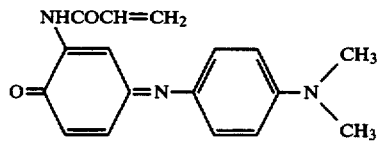 | 1.40 | 629 |
| 12-3 | 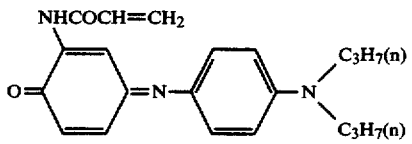 | 1.40 | 640 |
| 12-4 | 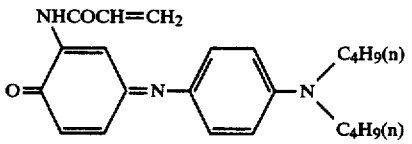 | 1.40 | 641 |
| 12-5 | 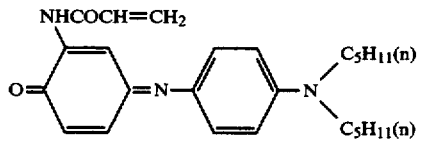 | 1.35 | 642 |
| 12-6 | 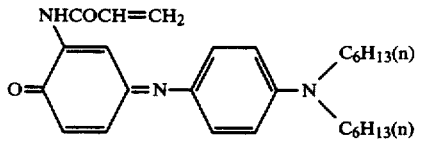 | 1.35 | 642 |
| 12-7 | 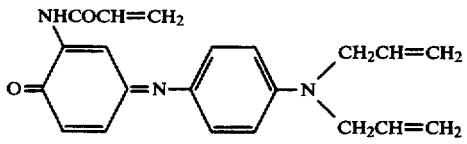 | 1.40 | 623 |
| 12-8 | 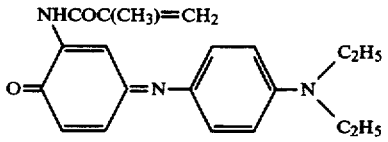 | 1.40 | 639 |
| 12-9 | 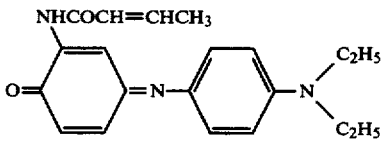 | 1.40 | 639 |
| 12-10 | 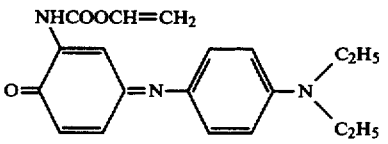 | 1.40 | 633 |

TABLE 6-continued
| No. | Structural Formula of the Dye | Color Density of the Recording | Maximum Absorption Wavelength (Chloroform) (nm) |
|---|---|---|---|
| 12-11 | 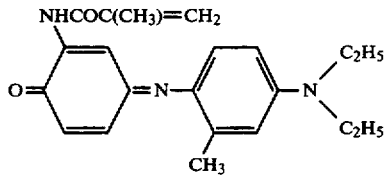 | 1.40 | 659 |
| 12-12 | 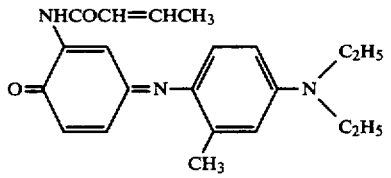 | 1.40 | 659 |
| 12-13 | 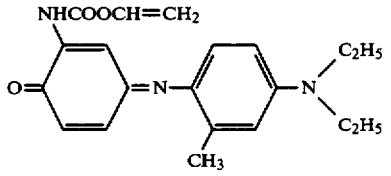 | 1.40 | 653 |
| 12-14 | 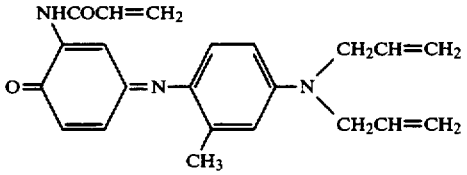 | 1.40 | 643 |
| 12-15 | 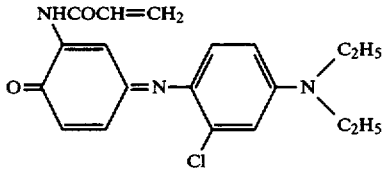 | 1.35 | 635 |
| 12-16 | 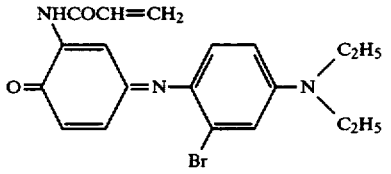 | 1.35 | 635 |
| 12-17 | 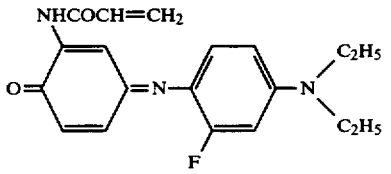 | 1.35 | 635 |
| 12-18 | 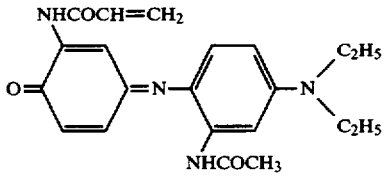 | 1.30 | 663 |

TABLE 6-continued
| No. | Structural Formula of the Dye | Color Density of the Recording | Maximum Absorption Wavelength (Chloroform) (nm) |
|---|---|---|---|
| 12-19 | 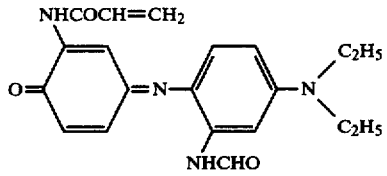 | 1.30 | 661 |
| 12-20 | 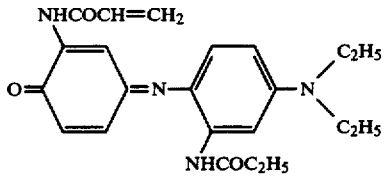 | 1.30 | 663 |
| 12-21 | 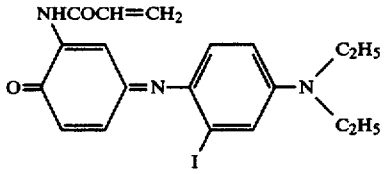 | 1.35 | 635 |
| 12-22 | 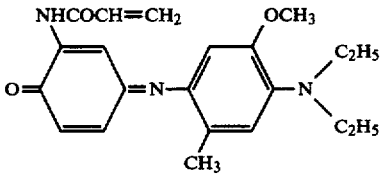 | 1.35 | 664 |
| 12-23 | 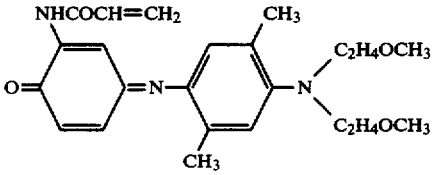 | 1.35 | 660 |
| 12-24 | 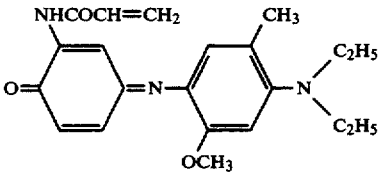 | 1.35 | 661 |
| 12-25 | 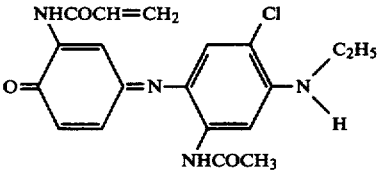 | 1.30 | 659 |
| 12-26 | 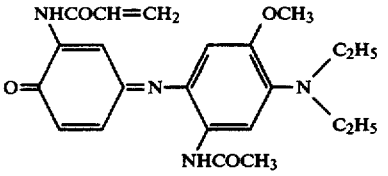 | 1.30 | 678 |

TABLE 6-continued
| No. | Structural Formula of the Dye | Color Density of the Recording | Maximum Absorption Wavelength (Chloroform) (nm) |
|---|---|---|---|
| 12-27 | 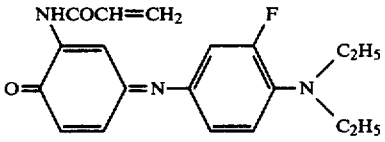 | 1.35 | 633 |
| 12-28 | 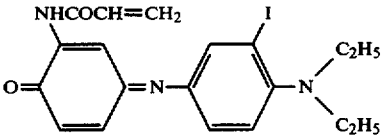 | 1.35 | 633 |
| 12-29 | 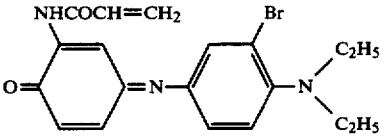 | 1.35 | 633 |
| 12-30 | 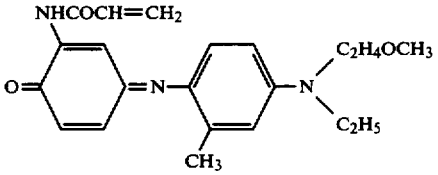 | 1.35 | 655 |
| 12-31 | 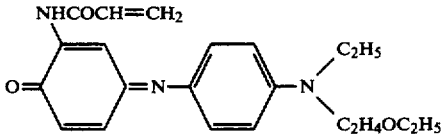 | 1.35 | 636 |
| 12-32 | 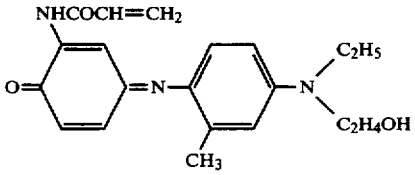 | 1.35 | 655 |
| 12-33 | 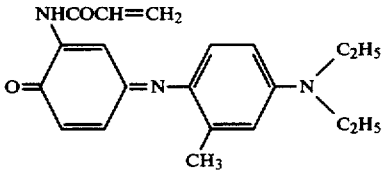 | 1.30 | 629 |
| 12-34 | 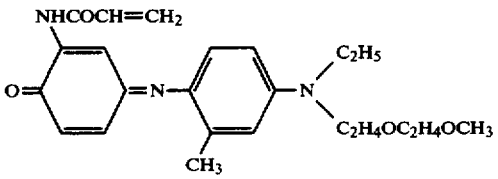 | 1.30 | 654 |

TABLE 6-continued
| No. | Structural Formula of the Dye | Color Density of the Recording | Maximum Absorption Wavelength (Chloroform) (nm) |
|---|---|---|---|
| 12-35 | 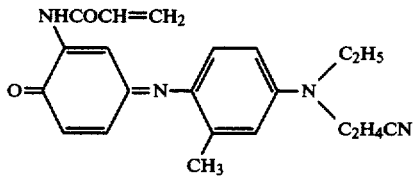 | 1.30 | 624 |
| 12-36 | 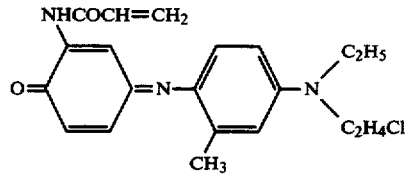 | 1.30 | 628 |
| 12-37 | 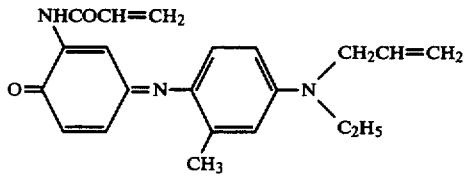 | 1.35 | 636 |
| 12-38 | 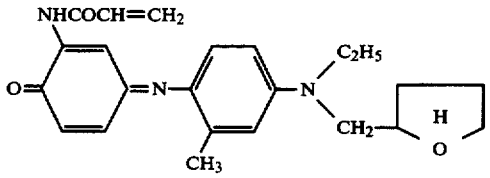 | 1.35 | 655 |
| 12-39 | 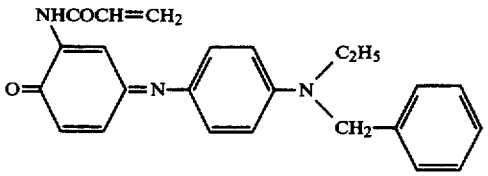 | 1.30 | 629 |
| 12-40 | 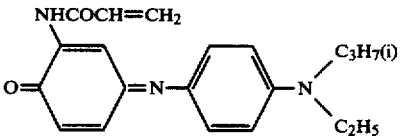 | 1.40 | 639 |
| 12-41 | 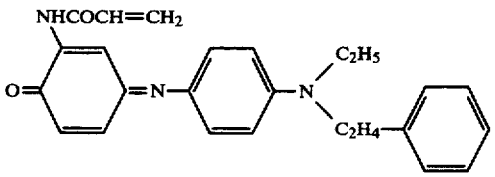 | 1.30 | 633 |
| 12-42 | 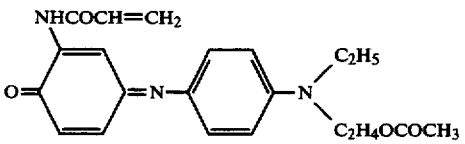 | 1.30 | 633 |

TABLE 6-continued
| No. | Structural Formula of the Dye | Color Density of the Recording | Maximum Absorption Wavelength (Chloroform) (nm) |
|---|---|---|---|
| 12-43 | 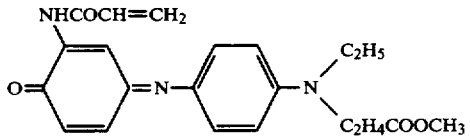 | 1.30 | 633 |
| 12-44 | 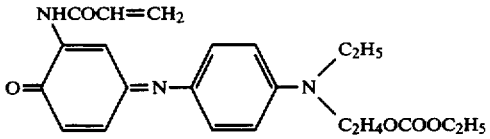 | 1.30 | 633 |
| 12-45 | 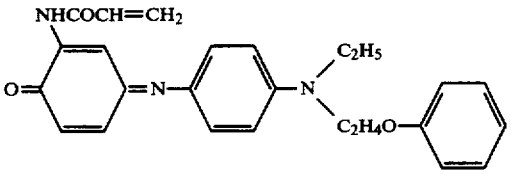 | 1.30 | 634 |
| 12-46 | 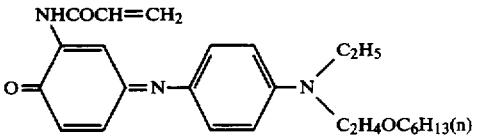 | 1.30 | 636 |
| 12-47 | 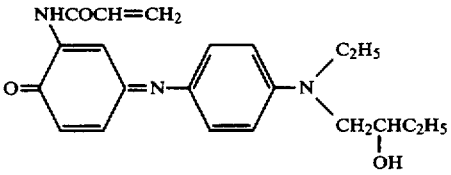 | 1.30 | 636 |
| 12-48 | 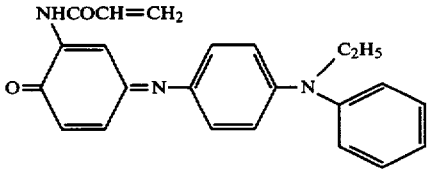 | 1.20 | 623 |
| 12-49 | 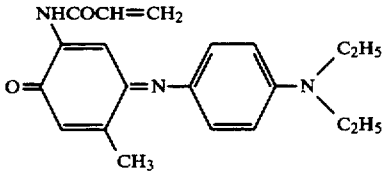 | 1.40 | 640 |
| 12-50 | 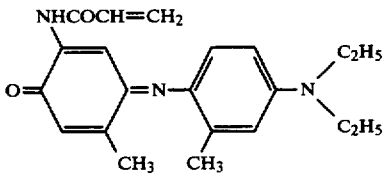 | 1.40 | 661 |

TABLE 6-continued
| No. | Structural Formula of the Dye | Color Density of the Recording | Maximum Absorption Wavelength (Chloroform) (nm) |
|---|---|---|---|
| 12-51 | 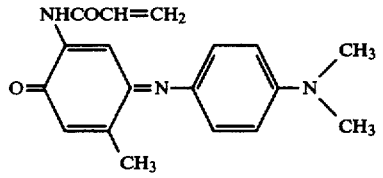 | 1.40 | 631 |
| 12-52 | 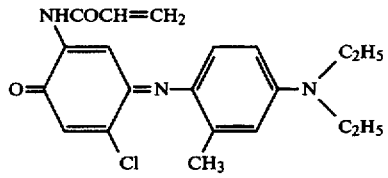 | 1.30 | 660 |
| 12-53 | 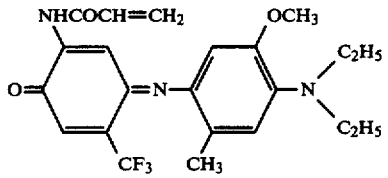 | 1.30 | 665 |
| 12-54 | 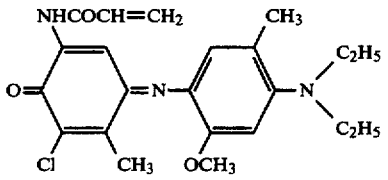 | 1.25 | 681 |
| 12-55 | 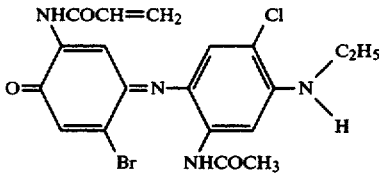 | 1.20 | 660 |
| 12-56 | 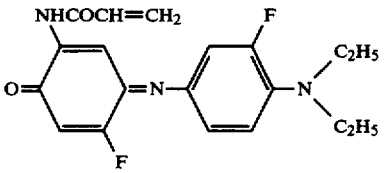 | 1.35 | 634 |
| 12-57 | 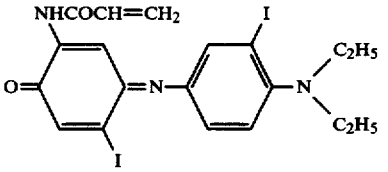 | 1.20 | 634 |
| 12-58 | 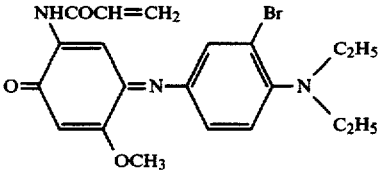 | 1.25 | 631 |

TABLE 6-continued
| No. | Structural Formula of the Dye | Color Density of the Recording | Maximum Absorption Wavelength (Chloroform) (nm) |
|---|---|---|---|
| 12-59 | 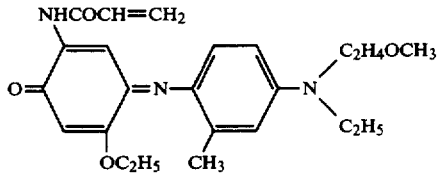 | 1.30 | 654 |
| 12-60 | 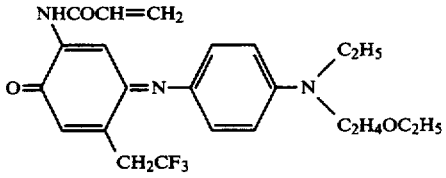 | 1.30 | 637 |
| 12-61 | 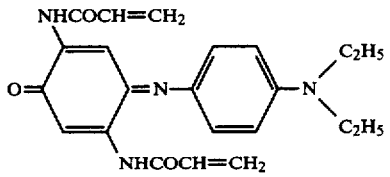 | 1.25 | 641 |
| 12-62 | 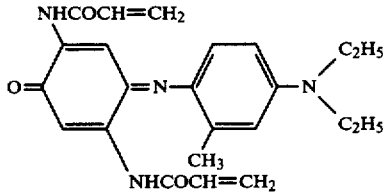 | 1.25 | 661 |
| 12-63 | 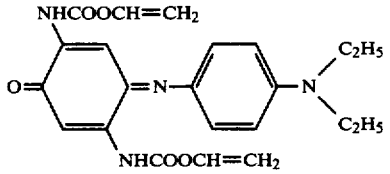 | 1.25 | 641 |
| 12-64 | 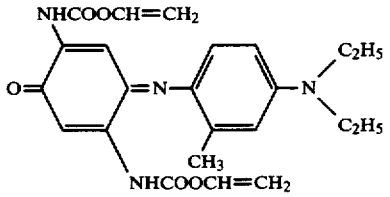 | 1.25 | 660 |
| 12-65 | 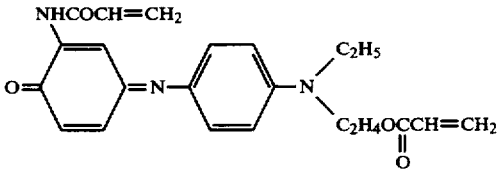 | 1.25 | 632 |
| 12-66 | 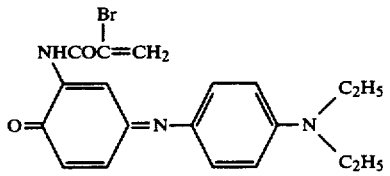 | 1.30 | 639 |

TABLE 6-continued

| No. | Structural Formula of the Dye | Color Density of the Recording | Maximum Absorption Wavelength (Chloroform) (nm) |
|---|---|---|---|
| 12-67 | 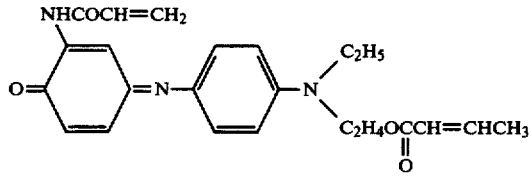 | 1.25 | 632 |
| 12-68 | 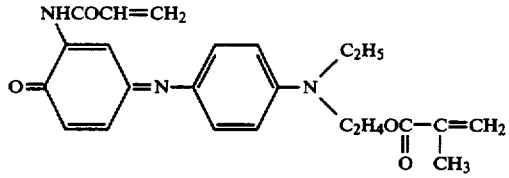 | 1.25 | 632 |

EXAMPLE 13

(i) Preparation of an Ink

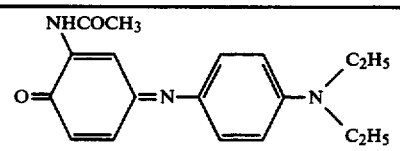

[A¹]

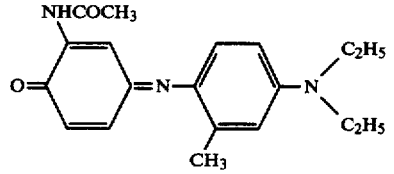

[B¹]

| | | | Mixing ratio |
|---|---|---|---|
| Mixed dye | [A¹] | 7 g | (50%) |
| | [B¹] | 7 g | (50%) |
| Polysulfone resin (UDEL P-1700) | | 10 g | |
| Chlorobenzene | | 50 g | |
| | Total | 74 g | |

The mixture of the above composition was treated by a paint conditioner for 10 minutes to prepare an ink. The dye and the resin had been completely dissolved and thus it was possible to obtain an ink in a uniform solution of a high concentration.

(ii) Preparation of a Transfer Sheet

The aforesaid ink was coated on a polyimide film (15 μm thick) using a bar coater (produced by RK Print Coat Instruments Co., No. 1) and dried in hot air at 60° C., thereby there was no separation of the dye and it was possible to obtain a uniformly coated transfer sheet.

(iii) Transfer Recording

Transfer recording was conducted according to the transfer recording procedures described in Example 1 using the transfer sheet obtained above and the recording body described in Example 1, thereby it was possible to obtain uniform brilliant cyan color recording having a high color density of 1.80 without unevenness in the image.

A light fastness test was conducted on the obtained recording according to the procedures described in Example 1 to find that there was hardly decoloration or change in color after exposure to light for 40 hours.

COMPARATIVE EXAMPLES 1 & 2

Inks were prepared by procedures similar to those described in Example 13 except that 14 g of the mixed dye used in Example 13 was replaced by 14 g of the dye [A¹] alone (Comparative Example 1) and 14 g of the dye [B¹] alone (Comparative Example 2) respectively. With each ink, a part of the ink did not dissolve and thus remained undissolved. Each ink was coated on a base film and dried, but there was remarkable separation of the dye, and thus a non-uniform transfer sheet was merely obtained. Thereafter, transfer recording was conducted using each obtained transfer sheet, but there was only obtained cyan color transfer recording with unevenness of the image and also distinct abrasion staining.

EXAMPLE 14

Preparation of the ink, preparation of the transfer sheet and transfer recording were carried out according to the procedures described in Example 13 except that the mixed dye used in Example 13 was replaced by the mixed dye set forth in Table 7, and as a result, it was possible to prepare inks of high concentrations, to obtain uniformly coated transfer sheets without separation of any ink and to obtain cyan color recording having the high color density set forth in Table 7.

TABLE 7
| No. | Structural Formula of the Dye | Mixing Ratio (%) | Color Density of the Recording |
|---|---|---|---|
| 14-1 | 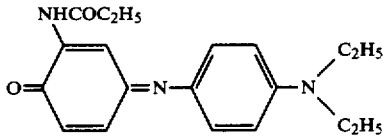 | 45 | 1.80 |
| | 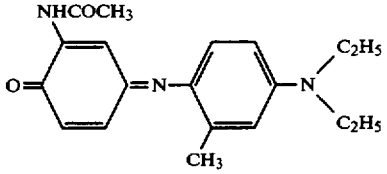 | 55 | |
| 14-2 | 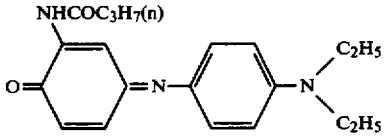 | 40 | 1.80 |
| | 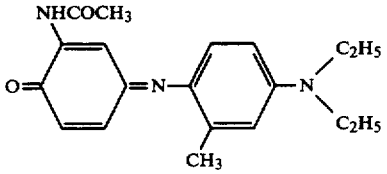 | 60 | |
| 14-3 | 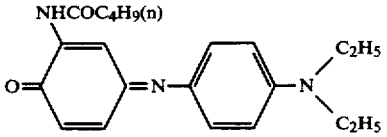 | 60 | 1.80 |
| | 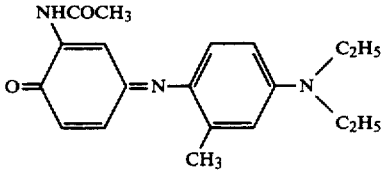 | 40 | |
| 14-4 | 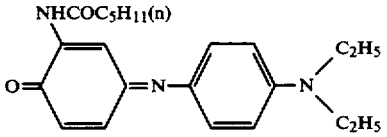 | 70 | 1.75 |
| | 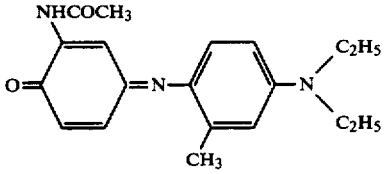 | 30 | |
| 14-5 | 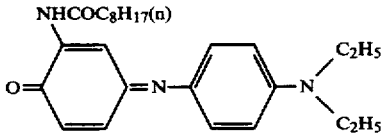 | 50 | 1.75 |

TABLE 7-continued
| No. | Structural Formula of the Dye | Mixing Ratio (%) | Color Density of the Recording |
|---|---|---|---|
| | 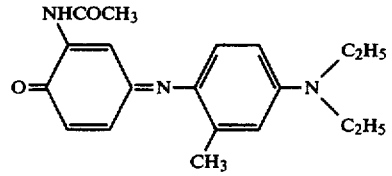 | 50 | |
| 14-6 | 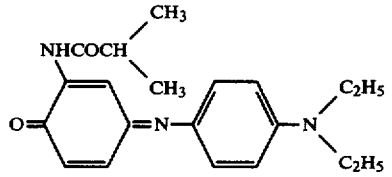 | 50 | 1.80 |
| | 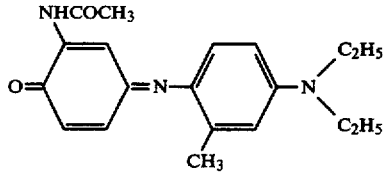 | 50 | |
| 14-7 | 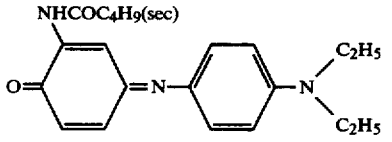 | 55 | 1.80 |
| | 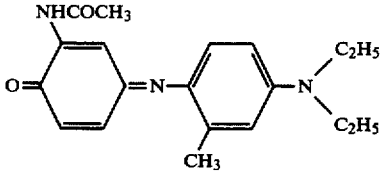 | 45 | |
| 14-8 | 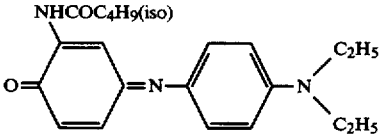 | 60 | 1.80 |
| | 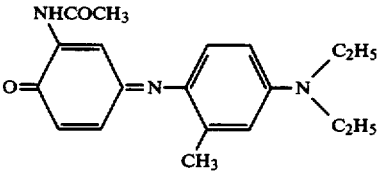 | 40 | |
| 14-9 | 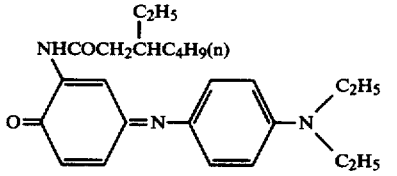 | 70 | 1.75 |
| | 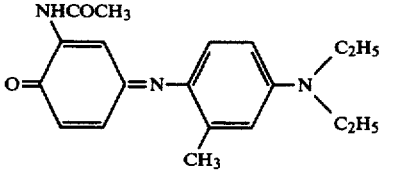 | 30 | |

TABLE 7-continued
| No. | Structural Formula of the Dye | Mixing Ratio (%) | Color Density of the Recording |
|---|---|---|---|
| 14-10 | 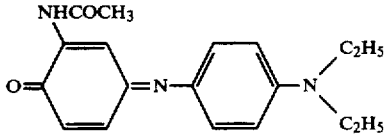 | 60 | 1.80 |
| | 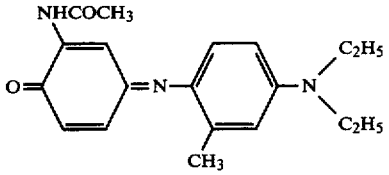 | 40 | |
| 14-11 | 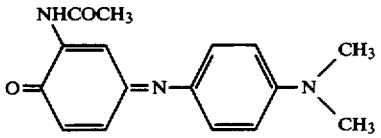 | 40 | 1.80 |
| | 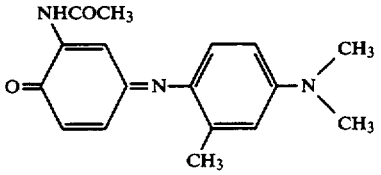 | 60 | |
| 14-12 | 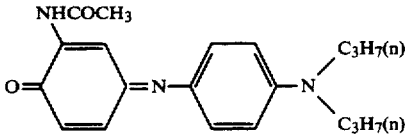 | 45 | 1.80 |
| | 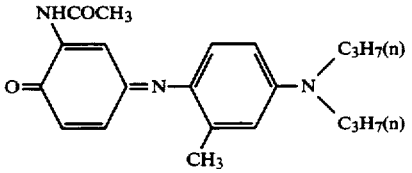 | 55 | |
| 14-13 | 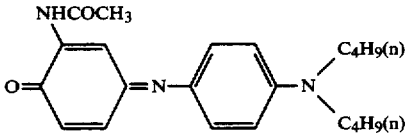 | 50 | 1.80 |
| | 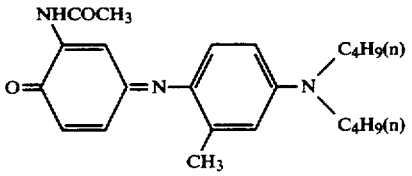 | 50 | |
| 14-14 | 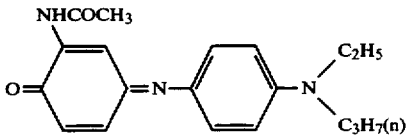 | 40 | 1.80 |

TABLE 7-continued
| No. | Structural Formula of the Dye | Mixing Ratio (%) | Color Density of the Recording |
|---|---|---|---|
| | 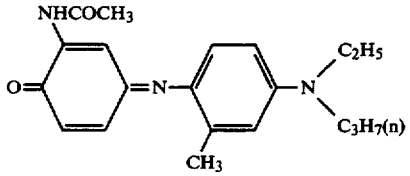 | 60 | |
| 14-15 | 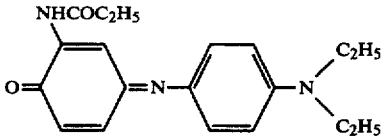 | 55 | 1.80 |
| | 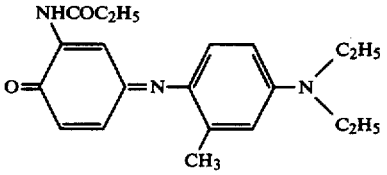 | 45 | |
| 14-16 | 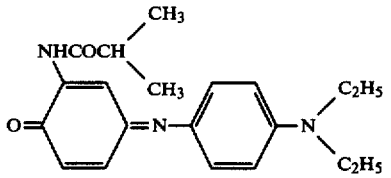 | 50 | 1.70 |
| | 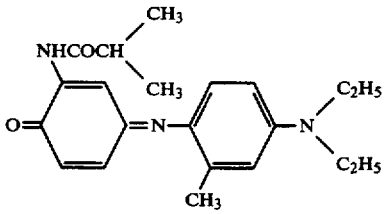 | 50 | |
| 14-17 | 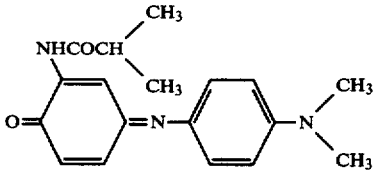 | 40 | 1.70 |
| | 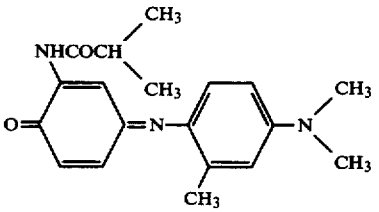 | 60 | |
| 14-18 | 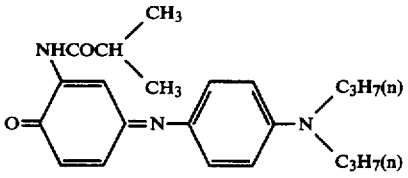 | 60 | 1.70 |

TABLE 7-continued
| No. | Structural Formula of the Dye | Mixing Ratio (%) | Color Density of the Recording |
|---|---|---|---|
| | 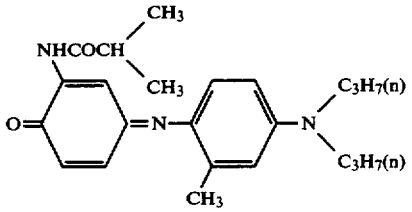 | 40 | |
| 14-19 | 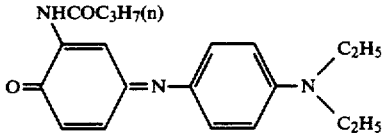 | 55 | 1.75 |
| | 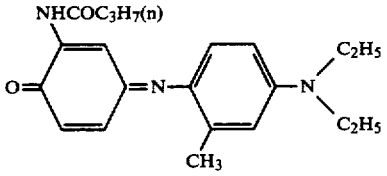 | 45 | |
| 14-20 | 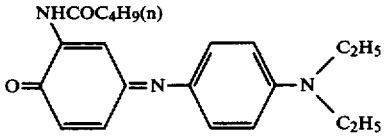 | 40 | 1.75 |
| | 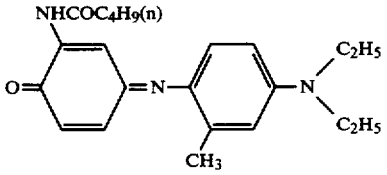 | 60 | |
| 14-21 | 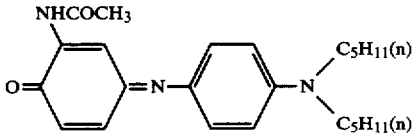 | 50 | 1.75 |
| | 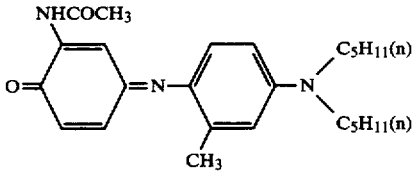 | 50 | |
| 14-22 | 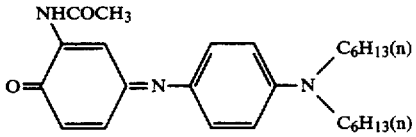 | 60 | 1.70 |
| | 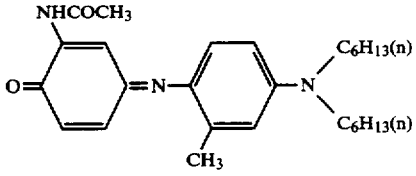 | 40 | |

TABLE 7-continued

| No. | Structural Formula of the Dye | Mixing Ratio (%) | Color Density of the Recording |
|---|---|---|---|
| 14-23 | 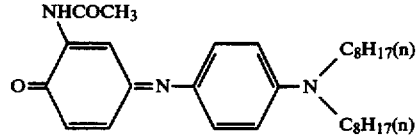 | 45 | 1.65 |
| | 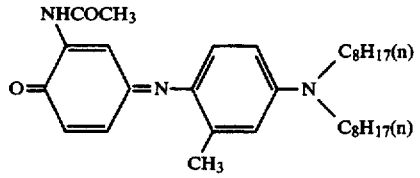 | 55 | |
| 14-24 | 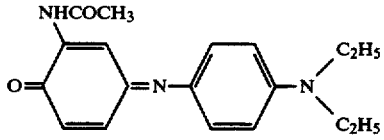 | 25 | 1.80 |
| | 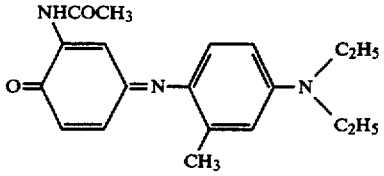 | 25 | |
| (14-24) | 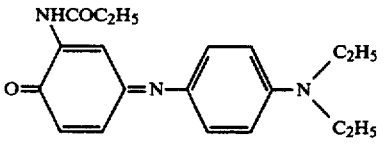 | 25 | |
| | 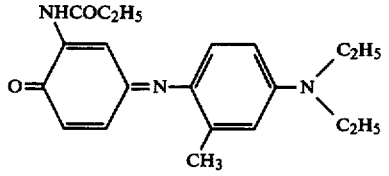 | 25 | |

EXAMPLE 15

(i) Preparation of the Ink

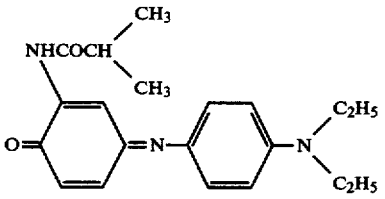

[A²]

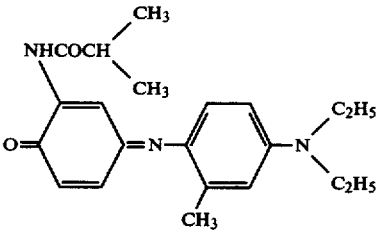

[B²]

| | | Mixing ratio |
|---|---|---|
| [A²] | 7 g | (50%) |

-continued

| | | | |
|---|---|---|---|
| Mixed dye | [A²] | 7 g | (50%) |
| | [B²] | 7 g | (50%) |
| Cellulose acetate* | | 10 g | |
| Methyl ethyl ketone | | 50 g | |
| Total | | 74 g | |

*L-30 (trade name) produced by Daimel Ltd.

The mixture of the above composition was treated by a paint conditioner for 10 minutes to prepare an ink. The dye and the resin had been completely dissolved and thus it was possible to obtain an ink in a uniform solution of a high concentration.

(ii) Preparation of a Transfer Sheet

The aforesaid ink was coated on a condenser paper sheet using a bar coater (produced by RK Print Coat Instruments Co., No. 1) and dried in hot air at 60° C., thereby there was no separation of the dye and it was possible to obtain a uniformly coated transfer sheet.

(ii) Transfer Recording

Transfer recording was conducted according to the procedures described in Example 1 using the transfer sheet obtained above and the recording body described in Example 1, thereby it was possible to obtain uniform brilliant cyan color recording having a high color density of 1.80 without unevenness of the image.

COMPARATIVE EXAMPLES 3 & 4

Inks were prepared by procedures similar to those described in Example 15 except that 14 g of the mixed dye used in Example 15 was replaced by 14 g of the dye [$A^2$]alone (Comparative Example 3) and 14 g of the dye [$B^2$]alone (Comparative Example 4) respectively. The obtained inks showed remarkable separation of the dye and gave non-uniform transfer sheets. Using these transfer sheets, transfer recording was conducted, but there was merely obtained cyan color transfer recording having much unevenness of the image and also distinct abrasion staining.

EXAMPLE 16

(i) Preparation of an Ink

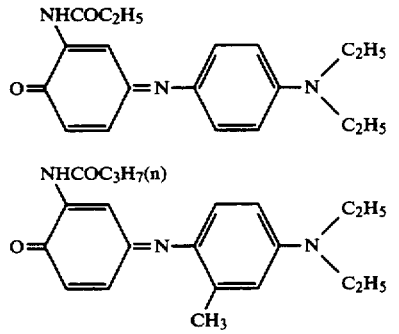

| | | | Mixing ratio |
|---|---|---|---|
| Mixed dye | [$A^3$] | 6 g | (60%) |
| | [$B^3$] | 4 g | (40%) |
| Ethyl cellulose* | | 10 g | |
| Methyl ethyl ketone | | 50 g | |
| Total | | 70 g | |

*Produced by Hercules, Inc.

The mixture of the above composition was treated by a paint conditioner for 10 minutes to prepare an ink. The dye and the resin had been completely dissolved and thus it was possible to obtain an ink in a uniform solution of a high concentration.

(ii) Preparation of a Transfer Sheet

The aforesaid ink was coated on a condenser paper sheet using a bar coater (produced by RK Print Coat Instruments Co., No. 1) and dried in hot air at 60° C., thereby there was no separation of the dye and it was possible to obtain a uniformly coated transfer sheet.

(iii) Transfer Recording

Transfer recording was conducted according to the procedures described in Example 1 using the transfer sheet obtained above and the recording body described in Example 1, thereby it was possible to obtain uniform brilliant cyan color recording having a high color density of 1.70 without unevenness of the image.

COMPARATIVE EXAMPLES 5 & 6

Inks were prepared by procedures similar to those described in Example 16 except that 10 g of the mixed dye used in Example 16 was replaced by 10 g of the dye [$A^3$] alone (Comparative Example 5) and 10 g of the dye [$B^3$] alone (Comparative Example 6) respectively. Each obtained ink showed remarkable separation of the ink, and the obtained sheets were non-uniform sheets. Thereafter, using these transfer sheets, transfer recording was conducted merely to obtain cyan color transfer recording with unevenness of the image and distinct abrasion staining.

EXAMPLE 17

A preparation of a transfer sheet according to the Example 1, a paragraph (ii) was repeated except that a polyethylene terephthalate film (6 μm thick), a back face of which was treated so as to provide heat-resisting and lubricating properties, was used as a base film in place of a polyimide film.

A transfer recording according to Example 1, paragraph (iii) was effected using the transfer sheet, thus formed, to obtain uniform brilliant cyan color recording having a high color density of 1.50.

The heat-resisting and lubricating treatments were effected by coating a polyethylene terephthalate film with a solution comprising 8 parts by weight of a polycarbonate resin, 1 part by weight of a phosphate ester type surfactant and 91 parts by weight of toluene followed by drying thereof. A thickness of dried heat-resisting and lubricating film was about 0.5 μm.

EXAMPLE 18

Preparation of the transfer sheet and transfer recording according to Example 17 were repeated except that the dyes set forth in Table 8 were used in the place of the dye used in the Example 17, thereby brilliant cyan color recording having the color density set forth in Table 8 was obtained in each case.

TABLE 8

| No. | Structural Formula of the Dye | Color Density of the Recording |
|---|---|---|
| 1 | 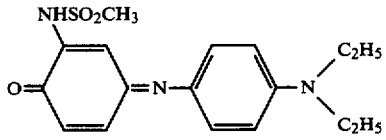 | 1.50 |
| 2 | 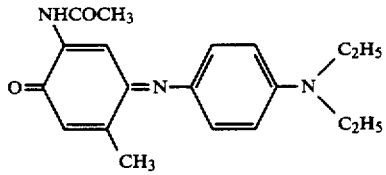 | 1.50 |
| 3 | 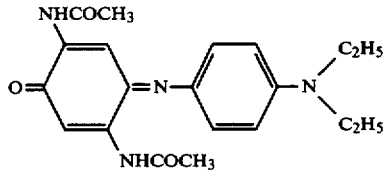 | 1.40 |

TABLE 8-continued

| No. | Structural Formula of the Dye | Color Density of the Recording |
|---|---|---|
| 4 | 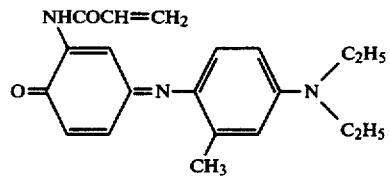 | 1.50 |
| 5 | 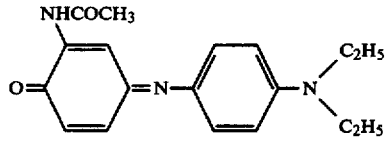 | 1.50 |
| 6 | 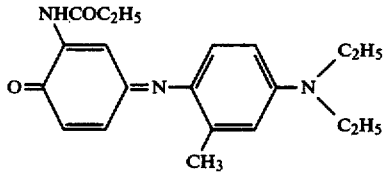 | 1.50 |
| 7 | 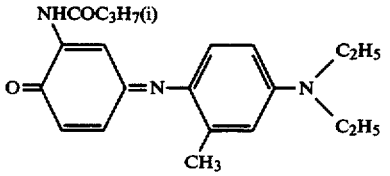 | 1.50 |
| 8 | 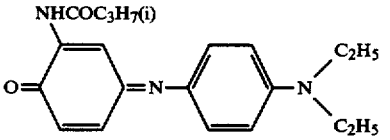 | 1.50 |
| 9 | 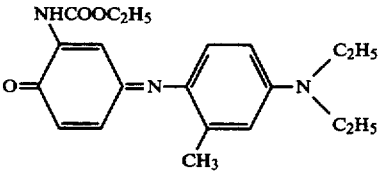 | 1.45 |
| 10 | 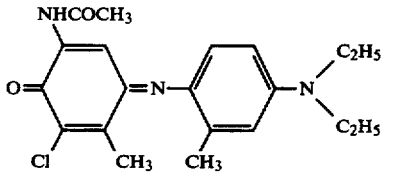 | 1.40 |
| 11 | 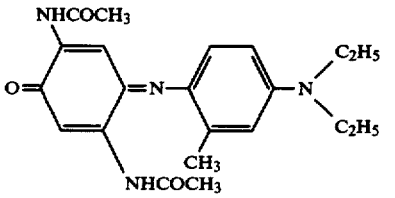 | 1.40 |

TABLE 8-continued

| No. | Structural Formula of the Dye | Color Density of the Recording |
|---|---|---|
| 12 | 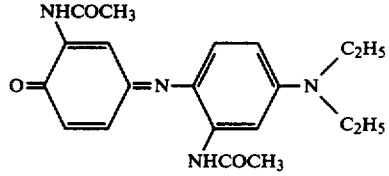 | 1.40 |

While the invention has been described in detail and with references to specific embodiment thereof, it will be apparent to one skilled in the art that various changes and modifications can be made therein without departing from the spirit and scope thereof.

What is claimed is:

1. A dye [and a binder] transfer sheet for heat-sensitive transfer recording which has an ink layer containing a sublimable dye *and a binder* formed on a base film, said sublimable dye being of the formula:

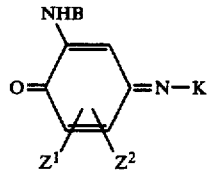

wherein —B represents

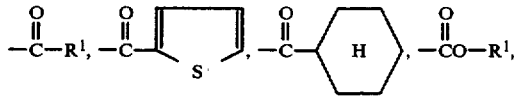

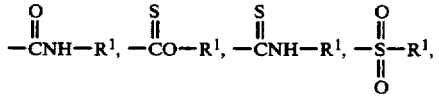

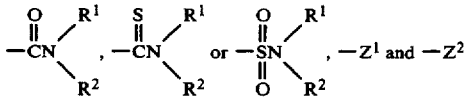

each represents hydrogen, alkyl optionally substituted by fluorine, alkoxy, halogen or —NHB, K represents

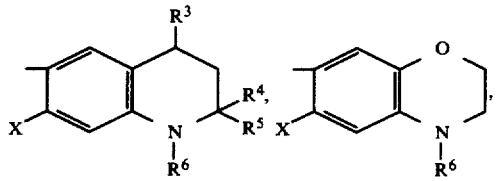

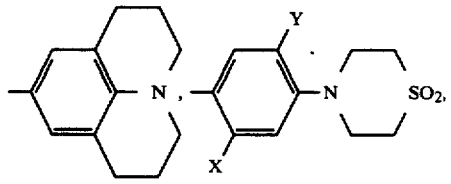

-continued

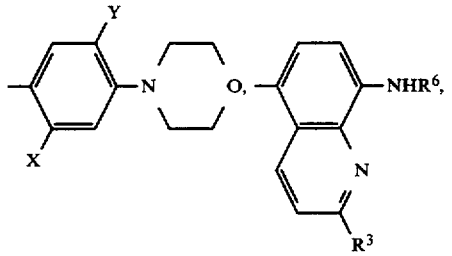

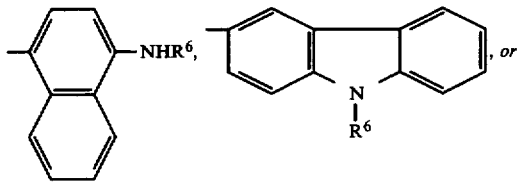

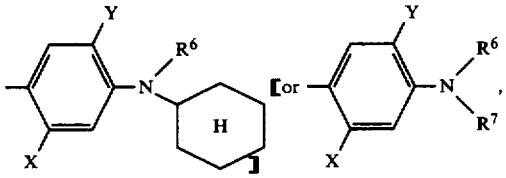

—$R^1$, —$R^2$, *and* —$R^6$ [and —$R^7$] each represents hydrogen, $C_1$–$C_8$ substituted or unsubstituted alkyl, substituted or unsubstituted vinyl, allyl or aryl, —$R^3$, —$R^4$ and —$R^5$ each represents hydrogen or methyl, —X represents hydrogen, alkyl optionally substituted by fluorine, alkoxy, formylamino, alkylcarbonylamino optionally substituted by fluorine, arylcarbonylamino or halogen, and —Y represents hydrogen, alkyl optionally substituted by fluorine, alkoxy or halogen.

[2. The dye transfer sheet for heat-sensitive transfer recording according to claim 1, wherein said dye is of the formula:

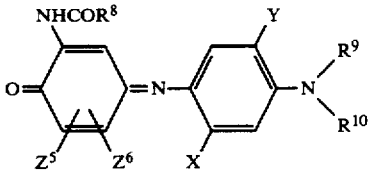

wherein —X represents hydrogen, alkyl optionally substituted by fluorine, alkoxy, formylamino, alkylcarbonylamino optionally substituted by fluorine, arylcarbonylamino or halogen, —Y represents hydrogen, alkyl optionally substituted by fluorine, alkoxy or halogen, —$Z^5$ and —$Z^6$ each represents halogen, alkyl optionally substituted by fluorine, alkoxy or halogen, and —$R^8$, —$R^9$ and —$R^{10}$ each represents hydrogen, $C_1$–$C_8$ substituted or unsubstituted alkyl, substituted or unsubstituted vinyl, allyl or aryl.]

3. [The] *A* dye transfer sheet for heat-sensitive transfer recording [according to claim 1] *which has an ink layer containing a sublimable dye and a binder formed on a base film*, wherein said dye is of the formula:

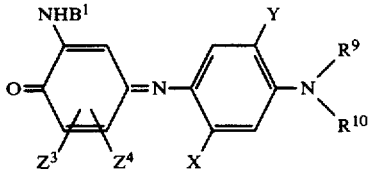

wherein —X represents hydrogen, alkyl optionally substituted by fluorine, alkoxy, formylamino, alkylcarbonylamino optionally substituted by fluorine, arylcarbonylamino or halogen, —$Z^3$, —$Z^4$and —Y each represents hydrogen, alkyl optionally substituted by fluorine, alkoxy or halogen, —$R^9$ and —$R^{10}$ each represents hydrogen, $C_1$–$C_8$ substituted or unsubstituted alkyl, allyl or aryl, —$B^1$ represents

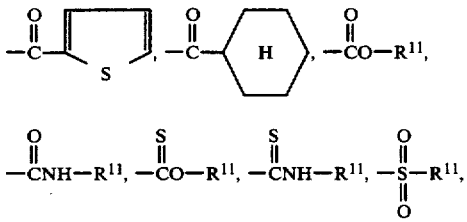

—$R^{11}$ and —$R^{12}$ each represents $C_1$–$C_8$ substituted or unsubstituted alkyl or aryl.

4. The dye transfer sheet for heat-sensitive transfer recording according to claim 1, wherein said dye is of the formula:

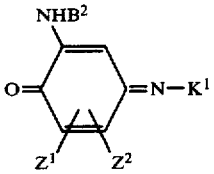

wherein —$B^2$ represents

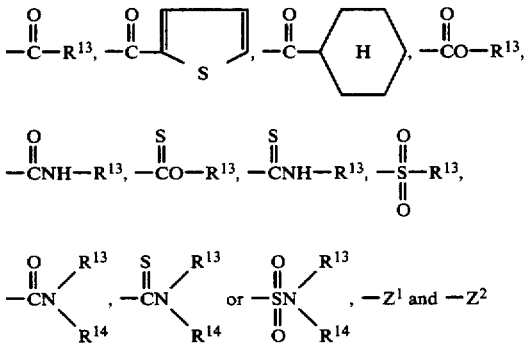

each represents hydrogen, alkyl optionally substituted by fluorine, alkoxy, halogen, or —$NHB^2$, —$K^1$ represents

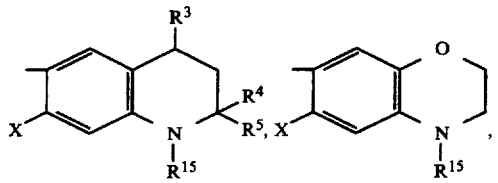

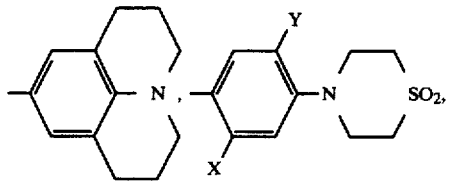

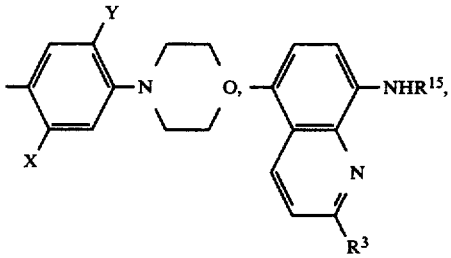

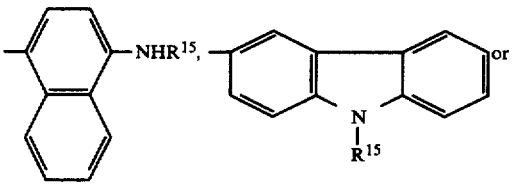

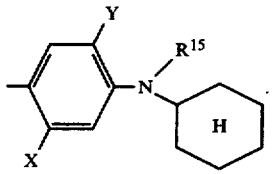

—$R^{13}$, —$R^{14}$ and —$R^{15}$ each represents $C_1$–$C_8$ substituted or unsubstituted alkyl, —$R^3$, —$R^4$ and —$R^5$ each represents hydrogen or methyl, —X represents hydrogen, alkyl optionally substituted by fluorine, alkoxy, formylamino, alkylcarbonylamino optionally substituted by fluorine, arylcarbonylamino or halogen, and —Y represents hydrogen, alkyl optionally substituted by fluorine, alkoxy or halogen.

5. [The] *A* dye transfer sheet for heat-sensitive transfer recording [according to claim 1], *which has an ink layer containing a sublimable dye and a binder formed on a base film* wherein said dye is of the formula:

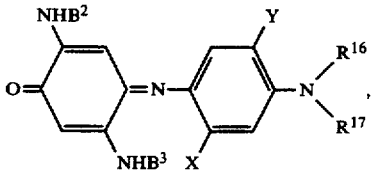

wherein —X represents hydrogen, alkyl optionally substituted by fluorine, alkoxy, formylamino, alkylcarbonylamino optionally substituted by fluorine, arylcarbonylamino or halogen, —Y represents hydrogen, alkyl optionally substituted by fluorine, alkoxy or halogen, —$R^{16}$ and —$R^{17}$ each represents hydrogen or $C_1$–$C_8$ substituted or unsubstituted alkyl, —$B^2$ and —$B^3$ each represents

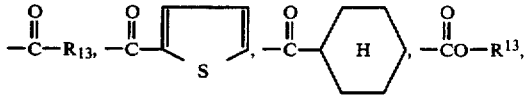

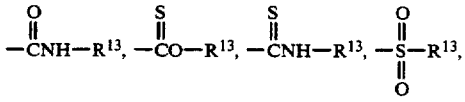

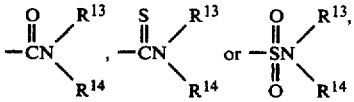

and —$R^{13}$ and —$R^{14}$each represents $C_1$–$C_8$ substituted or unsubstituted alkyl.

6. [The] *A* dye transfer sheet for heat-sensitive transfer recording [according to claim 1] *which has an ink layer containing a sublimable dye and a binder formed on a base film*, wherein said dye is of the formula:

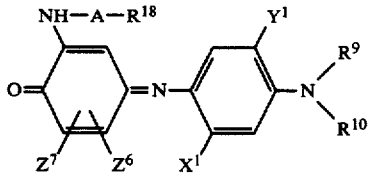

wherein —$X^1$ represents hydrogen, methyl, methoxy, formylamino, acetylamino, propionylamino, chlorine, bromine, iodine or fluorine, —$Y^1$ represents hydrogen, methoxy, ethoxy, chlorine, bromine, iodine, fluorine or methyl, —A— represents —CO— or —COO—, —$R^{18}$ represents substituted or unsubstituted vinyl, —$R^9$ and —$R^{10}$ each represents hydrogen, $C_1$–$C_8$ substituted or unsubstituted alkyl, allyl or aryl, and —$Z^7$ and —$Z^8$ each represents hydrogen, alkyl optionally substituted by fluorine, alkoxy, halogen or —NH—A—$R^{18}$.

7. [The] *A* dye transfer sheet for heat-sensitive transfer recording [according to claim 1] *which has an ink layer containing a sublimable dye and a binder formed on a base film*, wherein said dye is of the formula:

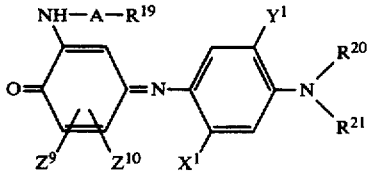

wherein: —$R^{19}$ represents hydrogen, $C_1$–$C_8$ straight-chain or branched-chain alkyl, allyl, vinyl, methylvinyl, $C_3$–$C_8$ alkoxyalkyl, aralkyl, cyclohexyl, thienyl, trifluoromethyl or aryl, —A— represents [—CO— or] —COO—, —$Y^1$ represents hydrogen, methoxy, ethoxy, chlorine, bromine, iodine, fluorine or methyl, —$Z^9$ and —$Z^{10}$ each represents hydrogen, methyl, trifluoromethyl, methoxy, ethoxy, chlorine, bromine [or —NH—A—$R^{19}$], —$X^1$ represents hydrogen, methyl, methoxy, formylamino, acetylamino, propionylamino, chlorine, bromine, iodine or fluorine, and $-R^{20}$ and $-R^{21}$ each represents hydrogen, $C_1$–$C_8$ straight-chain or branched-chain alkyl, $C_3$–$C_8$ alkoxyalkyl, $C_2$–$C_4$ hydroxyalkyl, $C_1$–$C_8$ halogenated alkyl, β-cyanoethyl, alkenyl, methylalkenyl or tetrahydrofurfuryl.

8. [The] *A* dye transfer sheet for heat-sensitive transfer recording [according to claim 1] *which has an ink layer containing a sublimable dye and a binder formed on a base film*, wherein said dye is of the formula:

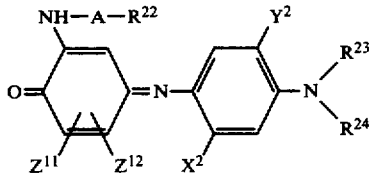

wherein: $-R^{22}$, $-R^{23}$ and $-R^{24}$ each represents $C_1$–$C_8$ straight-chain or branched-chain alkyl or alkenyl, —A— represents [—CO— or] —COO—, $-X^2$, [$-Y^2$,] $-Z^{11}$ and $-Z^{12}$ each represents hydrogen, methyl, methoxy, or chlorine, *and $Y^2$ represents methyl, methoxy or chlorine.*

9. The dye transfer sheet for heat-sensitive transfer recording according to claim [1] *138*, wherein said dye is of the formula:

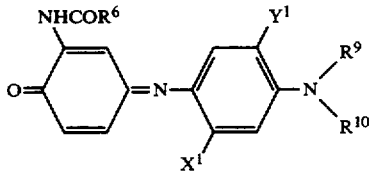

wherein: $-X^1$ represents hydrogen, methyl, methoxy, formylamino, acetylamino, propionylamino, chlorine, bromine, iodine or fluorine, $-Y^1$ represents hydrogen, methoxy, ethoxy, chlorine, bromine, iodine, fluorine or methyl, and $-R^8$, $-R^9$ and $-R^{10}$ each represents hydrogen, $C_1$–$C_8$ substituted or unsubstituted alkyl, allyl or aryl.

10. [The] *A* dye transfer sheet for heat-sensitive transfer recording [according to claim 1] *which has an ink layer containing a sublimable dye and a binder formed on a base film*, wherein said dye is of the formula:

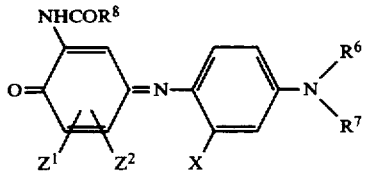

wherein $R^8$ represents $C_1$–$C_4$ alkyl, $CF_3$, $-CH{=}CH_2$, $-C(CH_3){=}CH_2$ or $-CH{=}CHCH_3$, $R^6$ represents $C_1$–$C_6$ alkyl, $C_3$–$C_8$ alkoxyalkyl, $C_2$–$C_3$ hydroxyalkyl, $-C_2H_4CN$, $-C_2H_4Cl$,

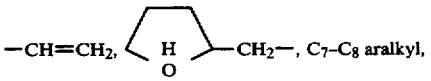

$-CH{=}CH_2$, $-CH_2-$, $C_7$–$C_8$ aralkyl, $-C_2H_4OCOCH_3$, $-C_2H_4COOCH_3$, $-C_2H_4OCOOC_2H_5$, -continued

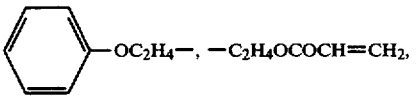

$-OC_2H_4-$, $-C_2H_4OCOCH{=}CH_2$, $-C_2H_4OCOCH{=}CHCH_3$ or $-C_2H_4OCOC(CH_3){=}CH_2$, $R^7$ represents $R^6$ or

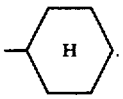

X represents hydrogen, [$-CH_3$,] $-NHCOCH_3$, —NHCHO or $-NHCOC_2H_5$, $Z^1$ and $Z^2$ each represents hydrogen, $-CH_3$, —Cl, $-OCH_3$, $-NHCOCH_3$, $-NHCOC_2H_5$ or $-NHCOCH{=}CH_2$.

11. [The] *A* dye transfer sheet for heat-sensitive transfer recording [according to claim 1] *which has an ink layer containing a sublimable dye and a binder formed on a base film*, wherein said dye is of the formula:

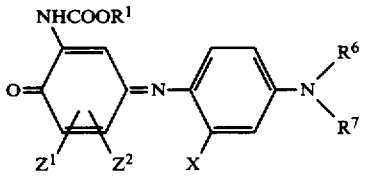

wherein $R^1$ represents $C_1$–$C_4$alkyl or $C_7$–$C_8$ aralkyl, $R^6$ and $R^7$ each represents $-CH_3$, $-C_2H_5$ or $-C_2H_4OH$, X represents hydrogen or $-CH_3$, $Z^1$ and $Z^2$ each represents hydrogen, $-CH_3$, —Cl, $-NHCOOCH_3$ or $-NHCOOC_2H_5$.

12. The dye transfer sheet for heat-sensitive *dye* transfer recording according to claim [1] *138*, wherein said dye is of the formula:

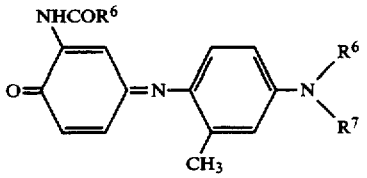

wherein $R^6$, $R^7$ and $R^8$ each represents $C_1$–$C_4$ alkyl.

13. The dye transfer sheet for heat-sensitive *dye* transfer recording according to claim [1] *138*, wherein said dye is of the formula:

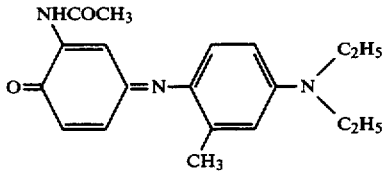

14. The dye transfer sheet for heat-sensitive *dye* transfer recording according to claim [1] *138*, wherein said dye is a mixture of a dye [[A]] (*A*) of the formula

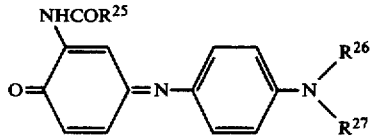

(A)

wherein $R^{25}$, $R^{26}$ and $R^{27}$ each represents $C_1$–$C_8$ straight-chain or branched-chain alkyl and a dye [[B]] (*B*) of the formula:

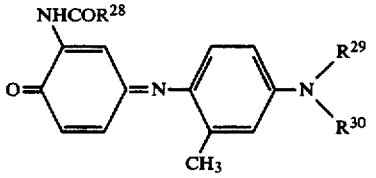

(B)

wherein $R^{28}$, $R^{29}$ and $R^{27}$ each represents $C_1$–$C_8$ [each represents] straight-chain or branched-chain alkyl.

15. The dye transfer sheet for heat-sensitive transfer recording according to claim 14, wherein the dye [A] accounts for 5–95% by weight and the dye [B] accounts for 95–5% by weight.

16. The dye transfer sheet for heat-sensitive transfer recording according to claim 14, wherein $R^{25}$ and $R^{28}$ each represents $C_1$–$C_4$ straight chain or branched-chain alkyl, and $R^{26}$, $R^{27}$, $R^{29}$ and $R^{30}$ each represents $C_1$–$C_4$ straight-chain alkyl.

17. The dye transfer sheet for heat-sensitive transfer recording according to claim 14, wherein the mixture comprises a dye of the structural formula:

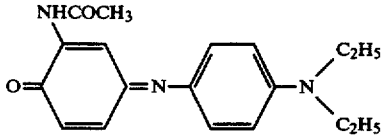

and a dye of the structural formula:

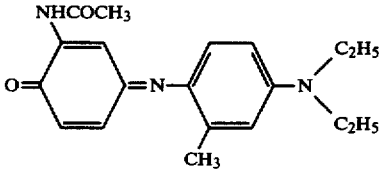

18. The dye transfer sheet for heat-sensitive transfer recording according to claim 1, wherein the base film is [of] a tissue paper.

19. The dye transfer sheet for heat-sensitive transfer recording according to claim 1, wherein the base film is a flim of a polyester, polyamide or polyimide.

20. The dye transfer sheet for heat-sensitive transfer recording according to claim 19, wherein the base film is a film of a polyethylene terephthalate or polyimide.

21. The dye transfer sheet for heat-sensitive transfer recording according to claim 1, wherein the base film is a plastic film providing a heat-resistive layer on a back face thereof.

22. The dye transfer sheet for heat-sensitive transfer recording according to claim 1, wherein the base film has a thickness of 3 to 50 μm.

23. The dye transfer sheet for heat-sensitive transfer recording according to claim 1, wherein the ink layer has a thickness of 0.1 to 5 μm.

24. The dye transfer sheet for heat-sensitive transfer recording according to claim 1, wherein the ink layer is formed on the base film with an ink which is prepared by dissolving or dispersing [the dye of the formula [I]] *said dye* together with a binder in a water or an organic solvent followed by drying thereof.

*25. The dye transfer sheet for heat-sensitive transfer recording according to claim 3, wherein the base film is a tissue paper.*

*26. The dye transfer sheet for heat-sensitive transfer recording according to claim 3, wherein the base film is a film of a polyester, polyamide or polyimide.*

*27. The dye transfer sheet for heat-sensitive transfer recording according to claim 26, wherein the base film is a film of a polyethylene terephthalate or polyimide.*

*28. The dye transfer sheet for heat-sensitive transfer recording according to claim 3, wherein the base film is a plastic film providing a heat-resistive layer on a back face thereof.*

*29. The dye transfer sheet for heat-sensitive transfer recording according to claim 3, wherein the base film has a thickness of 3 to 50 μm.*

*30. The dye transfer sheet for heat-sensitive transfer recording according to claim 3, wherein the ink layer has a thickness of 0.1 to 5 μm.*

*31. The dye transfer sheet for heat-sensitive transfer recording according to claim 3, wherein the ink layer is formed in the base film with an ink which is prepared by dissolving or dispersing said dye together with a binder in a water or an organic solvent followed by drying thereof.*

*32. The dye transfer sheet for heat-sensitive transfer recording according to claim 5, wherein the base film is a tissue paper.*

*33. The dye transfer sheet for heat-sensitive transfer recording according to claim 5, wherein the base film is a film of a polyester, polyamide or polyimide.*

*34. The dye transfer sheet for heat-sensitive transfer recording according to claim 33, wherein the base film is a film of a polyethylene terephthalate or polyimide.*

*35. The dye transfer sheet for heat-sensitive transfer recording according to claim 5, wherein the base film is a plastic film providing a heat-resistive layer on a back face thereof.*

*36. The dye transfer sheet for heat-sensitive transfer recording according to claim 5, wherein the base film has a thickness of 3 to 50 μm.*

*37. The dye transfer sheet for heat-sensitive transfer recording according to claim 5, wherein the ink layer has a thickness of 0.1 to 5 μm.*

*38. The dye transfer sheet for heat-sensitive transfer recording according to claim 5, wherein the ink layer is formed in the base film with an ink which is prepared by dissolving or dispersing said dye together with a binder in a water or an organic solvent followed by drying thereof.*

*39. The dye transfer sheet for heat-sensitive transfer recording according to claim 6, wherein the base film is a tissue paper.*

*40. The dye transfer sheet for heat-sensitive transfer recording according to claim 6, wherein the base film is a film of a polyester, polyamide or polyimide.*

*41. The dye transfer sheet for heat-sensitive transfer recording according to claim 40, wherein the base film is a film of a polyethylene terephthalate or polyimide.*

*42. The dye transfer sheet for heat-sensitive transfer recording according to claim 6, wherein the base film is a*

*plastic film providing a heat-resistive layer on a back face thereof.*

*43. The dye transfer sheet for heat-sensitive transfer recording according to claim 6, wherein the base film has a thickness of 3 to 50 μm.*

*44. The dye transfer sheet for heat-sensitive transfer recording according to claim 6, wherein the ink layer has a thickness of 0.1 to 5 μm.*

*45. The dye transfer sheet for heat-sensitive transfer recording according to claim 6, wherein the ink layer is formed in the base film with an ink which is prepared by dissolving or dispersing said dye together with a binder in a water or an organic solvent followed by drying thereof.*

*46. The dye transfer sheet for heat-sensitive transfer recording according to claim 7, wherein the base film is a tissue paper.*

*47. The dye transfer sheet for heat-sensitive transfer recording according to claim 7, wherein the base film is a film of a polyester, polyamide or polyimide.*

*48. The dye transfer sheet for heat-sensitive transfer recording according to claim 47, wherein the base film is a film of a polyethylene terephthalate or polyimide.*

*49. The dye transfer sheet for heat-sensitive transfer recording according to claim 7, wherein the base film is a plastic film providing a heat-resistive layer on a back face thereof.*

*50. The dye transfer sheet for heat-sensitive transfer recording according to claim 7, wherein the base film has a thickness of 3 to 50 μm.*

*51. The dye transfer sheet for heat-sensitive transfer recording according to claim 7, wherein the ink layer has a thickness of 0.1 to 5 μm.*

*52. The dye transfer sheet for heat-sensitive transfer recording according to claim 7, wherein the ink layer is formed in the base film with an ink which is prepared by dissolving or dispersing said dye together with a binder in a water or an organic solvent followed by drying thereof.*

*53. The dye transfer sheet for heat-sensitive transfer recording according to claim 8, wherein the base film is a tissue paper.*

*54. The dye transfer sheet for heat-sensitive transfer recording according to claim 8, wherein the base film is a film of a polyester, polyamide or polyimide.*

*55. The dye transfer sheet for heat-sensitive transfer recording according to claim 54, wherein the base film is a film of a polyethylene terephthalate or polyimide.*

*56. The dye transfer sheet for heat-sensitive transfer recording according to claim 8, wherein the base film is a plastic film providing a heat-sensitive layer on a back face thereof.*

*57. The dye transfer sheet for heat-sensitive transfer recording according to claim 8, wherein the base film has a thickness of 3 to 50 μm.*

*58. The dye transfer sheet for heat-sensitive transfer recording according to claim 8, wherein the ink layer has a thickness of 0.1 to 5 μm.*

*59. The dye transfer sheet for heat-sensitive transfer recording according to claim 8, wherein the ink layer is formed in the base film with an ink which is prepared by dissolving or dispersing said dye together with a binder in a water or an organic solvent followed by drying thereof.*

*60. The dye transfer sheet for heat-sensitive transfer recording according to claim 10, wherein the base film is a tissue paper.*

*61. The dye transfer sheet for heat-sensitive transfer recording according to claim 10, wherein the base film is a film of a polyester, polyamide or polyimide.*

*62. The dye transfer sheet for heat-sensitive transfer recording according to claim 61, wherein the base film is a film of a polyethylene terephthalate or polyimide.*

*63. The dye transfer sheet for heat-sensitive transfer recording according to claim 10, wherein the base film is a plastic film providing a heat-resistive layer on a back face thereof.*

*64. The dye transfer sheet for heat-sensitive transfer recording according to claim 10, wherein the base film has a thickness of 3 to 50 μm.*

*65. The dye transfer sheet for heat-sensitive transfer recording according to claim 10, wherein the ink layer has a thickness of 0.1 to 5 μm.*

*66. The dye transfer sheet for heat-sensitive transfer recording according to claim 10, wherein the ink layer is formed in the base film with an ink which is prepared by dissolving or dispersing said dye together with a binder in a water or an organic solvent followed by drying thereof.*

*67. The dye transfer sheet for heat-sensitive transfer recording according to claim 11, wherein the base film is a tissue paper.*

*68. The dye transfer sheet for heat-sensitive transfer recording according to claim 11, wherein the base film is a film of a polyester, polyamide or polyimide.*

*69. The dye transfer sheet for heat-sensitive transfer recording according to claim 68, wherein the base film is a film of a polyethylene terephthalate or polyimide.*

*70. The dye transfer sheet for heat-sensitive transfer recording according to claim 11, wherein the base film is a plastic film providing a heat-resistive layer on a back face thereof.*

*71. The dye transfer sheet for heat-sensitive transfer recording according to claim 11, wherein the base film has a thickness of 3 to 50 μm.*

*72. The dye transfer sheet for heat-sensitive transfer recording according to claim 11, wherein the ink layer has a thickness of 0.1 to 5 μm.*

*73. The dye transfer sheet for heat-sensitive transfer recording according to claim 11, wherein the ink layer is formed in the base film with an ink which is prepared by dissolving or dispersing said dye together with a binder in a water or an organic solvent followed by drying thereof.*

*74. A dye transfer sheet for heat-sensitive transfer recording which has an ink layer containing a sublimable dye and a binder formed on the base film, said sublimable dye being of the formula:*

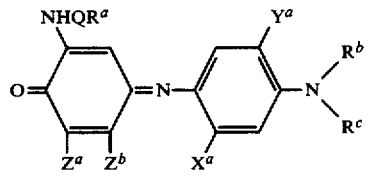

*wherein: Q is —CO—; $Z^a$ and $Z^b$ are each independently hydrogen, methyl, trifluoromethyl, trifluoroethyl, methoxy, ethoxy, chlorine, or bromine, wherein $Z^a$ and $Z^b$ are not both hydrogen; $X^a$ is hydrogen, methyl, methoxy, trifluoromethyl, chlorine, iodine, bromine, fluorine, formylamino, or propionylamino; $Y^a$ is hydrogen, methyl, methoxy, chlorine, bromine or fluorine; $R^a$ is $C_2$–$C_8$ alkyl, $C_1$–$C_8$ substituted alkyl, allyl, or phenyl; and $R^b$ and $R^c$ are each independently hydrogen or $C_1$–$C_8$ substituted or unsubstituted alkyl, wherein $R^b$ and $R^c$ are not both hydrogen.*

*75. The dye transfer sheet for heat-sensitive transfer recording according to claim 74, wherein the base film is a tissue paper.*

*76. The dye transfer sheet for heat-sensitive transfer recording according to claim 74, wherein the base film is a film of a polyester, polyamide or polyimide.*

*77. The dye transfer sheet for heat-sensitive transfer recording according to claim 76, wherein the base film is a film of a polyethylene terephthalate or polyimide.*

*78. The dye transfer sheet for heat-sensitive transfer recording according to claim 74, wherein the base film is a plastic film providing a heat-sensitive layer on a back face thereof.*

*79. The dye transfer sheet for heat-sensitive transfer recording according to claim 74, wherein the base film has a thickness of 3 to 50 μm.*

*80. The dye transfer sheet for heat-sensitive transfer recording according to claim 74, wherein the ink layer has a thickness of 0.1 to 5 μm.*

*81. The dye transfer sheet for heat-sensitive transfer recording according to claim 74, wherein the ink layer is formed in the base film with an ink which is prepared by dissolving or dispersing said dye together with a binder in a water or an organic solvent followed by drying thereof.*

*82. The dye transfer sheet for heat-sensitive transfer recording which has an ink layer containing a sublimable dye and a binder formed on a base film, said sublimable dye being of the formula:*

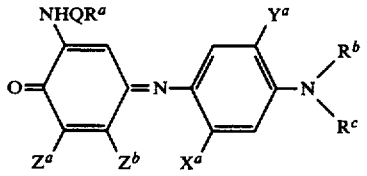

*wherein: Q is —CO—O—; $Z^a$ and $Z^b$ are each independently hydrogen, methyl, or chlorine; $X^a$ is methyl, chlorine, bromine, trifluoromethyl, or hydrogen; $Y^a$ is hydrogen, chlorine, methyl, or methoxy; $R^a$ is $C_1$–$C_8$ alkyl, phenyl, or $C_1$–$C_8$ alkoxyalkyl; and $R^b$ and $R^c$ are each independently $C_1$–$C_8$ alkyl, phenethyl, or hydrogen, wherein $R^b$ and $R^c$ are not both hydrogen.*

*83. The dye transfer sheet for heat-sensitive transfer recording according to claim 82, wherein the base film is a tissue paper.*

*84. The dye transfer sheet for heat-sensitive transfer recording according to claim 82, wherein the base film is a film of a polyester, polyamide or polyimide.*

*85. The dye transfer sheet for heat-sensitive transfer recording according to claim 84, wherein the base film is a film of a polyethylene terephthalate or polyimide.*

*86. The dye transfer sheet for heat-sensitive transfer recording according to claim 82, wherein the base film is a plastic film providing a heat-resistive layer on a back face thereof.*

*87. The dye transfer sheet for heat-sensitive transfer recording according to claim 82, wherein the base film has a thickness of 3 to 50 μm.*

*88. The dye transfer sheet for heat-sensitive transfer recording according to claim 82, wherein the ink layer has a thickness of 0.1 to 5 μm.*

*89. The dye transfer sheet for heat-sensitive transfer recording according to claim 82, wherein the ink layer is formed in the base film with an ink which is prepared by dissolving or dispersing said dye together with a binder in a water or an organic solvent followed by drying thereof.*

*90. The dye transfer sheet for heat-sensitive transfer recording which has an ink layer containing a sublimable dye and a binder formed on the base film, said sublimable dye being a member selected from the group consisting of*

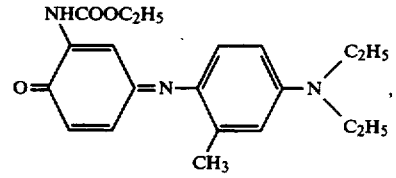

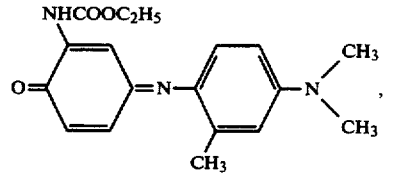

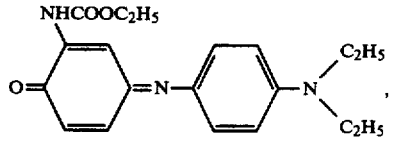

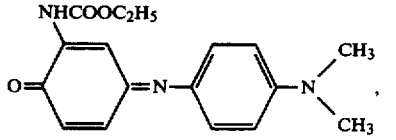

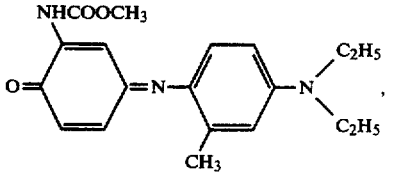

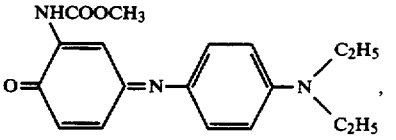

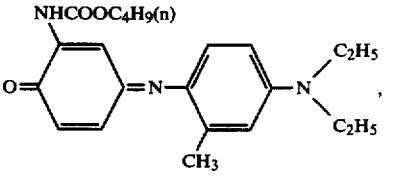

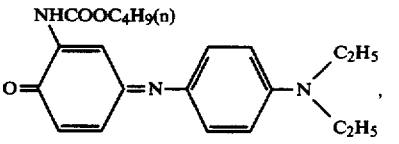

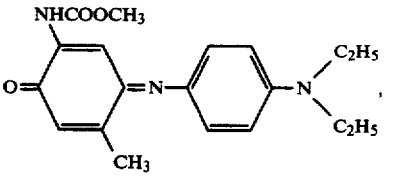

-continued
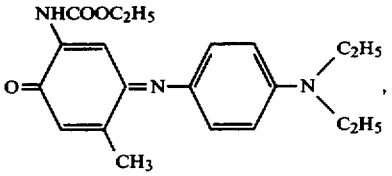
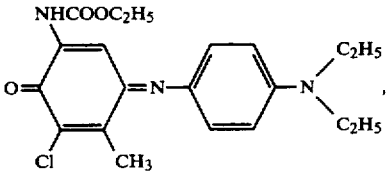
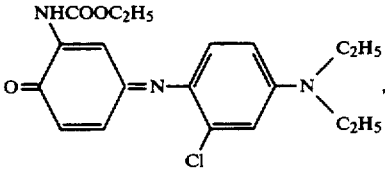
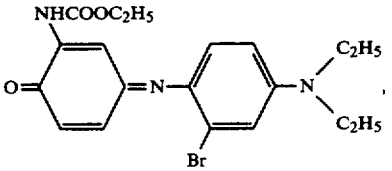
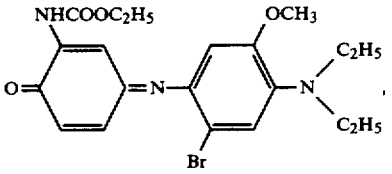
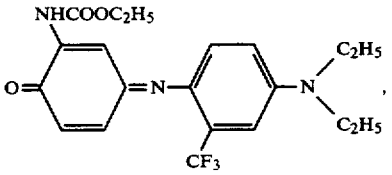
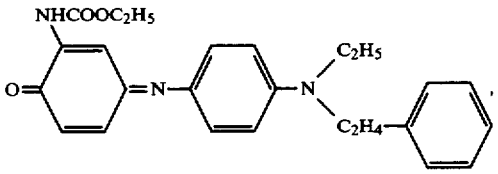
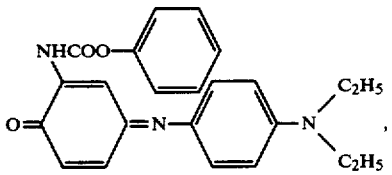
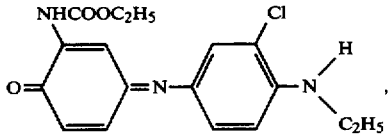
-continued
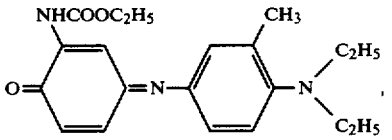
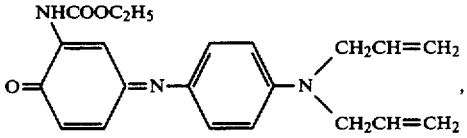
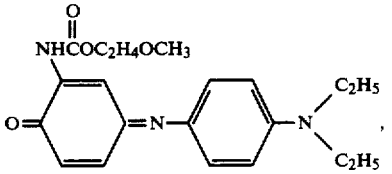
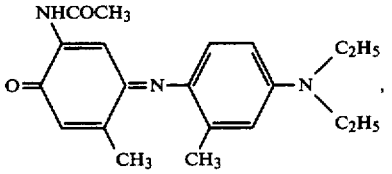
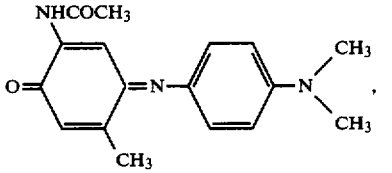
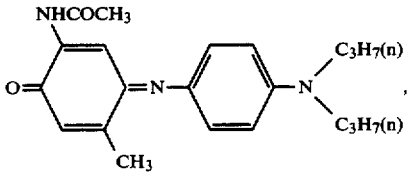
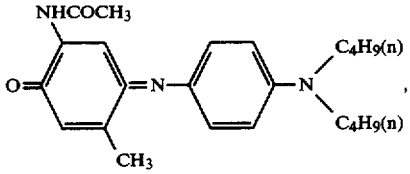
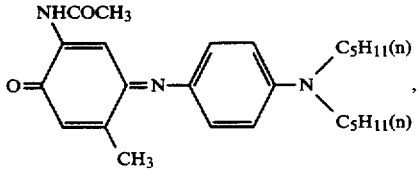
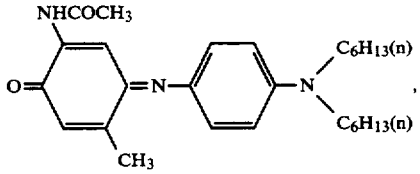

-continued
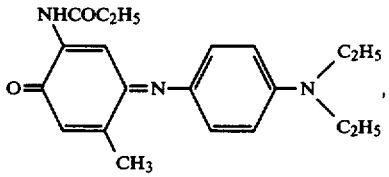
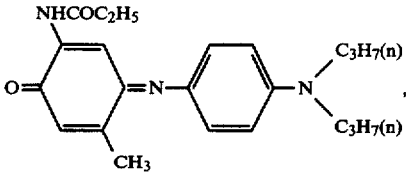
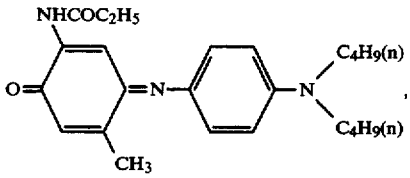
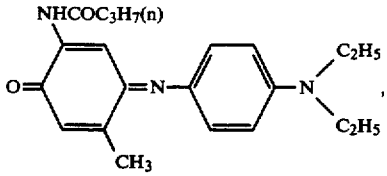
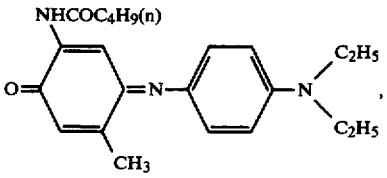
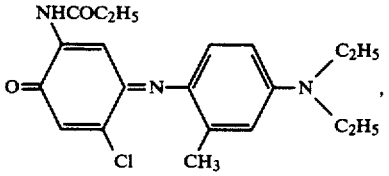
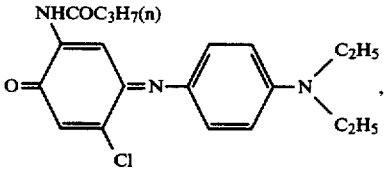
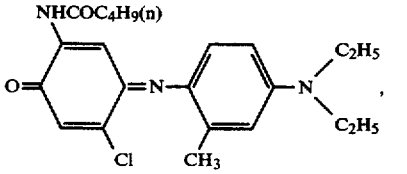
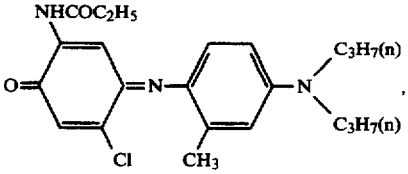
-continued
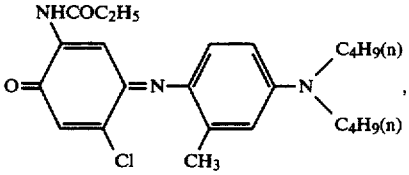
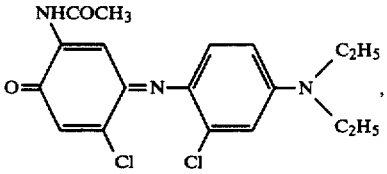
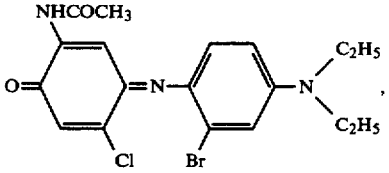
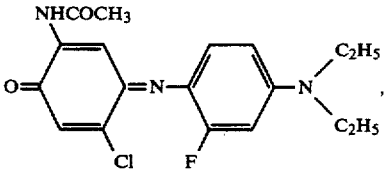
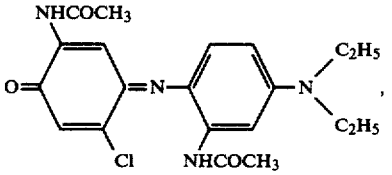
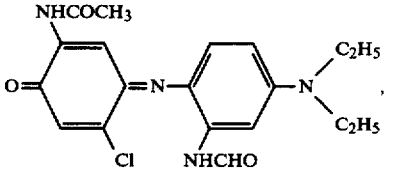
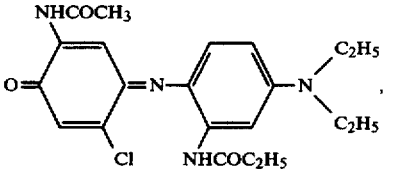
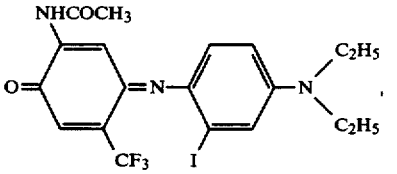

-continued
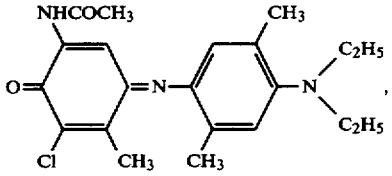
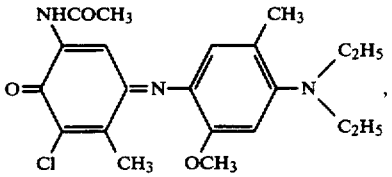
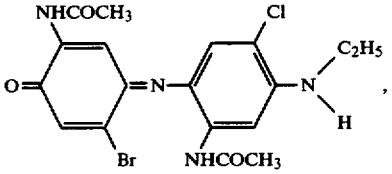
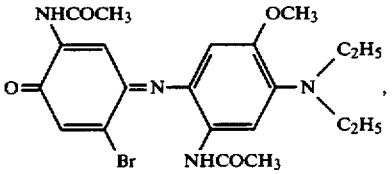
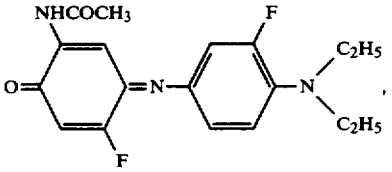
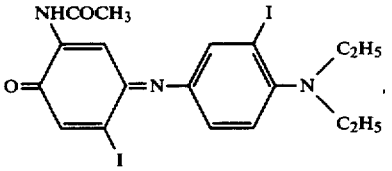
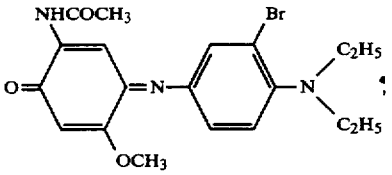
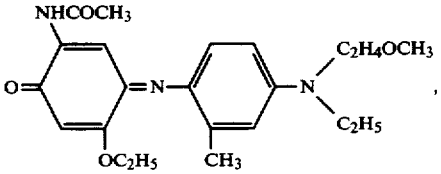
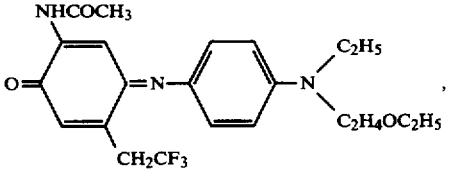
-continued
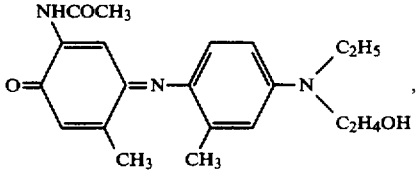
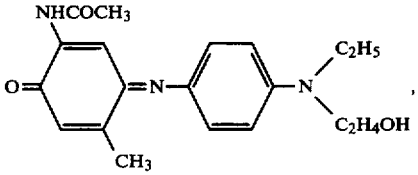
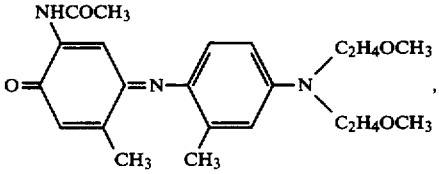
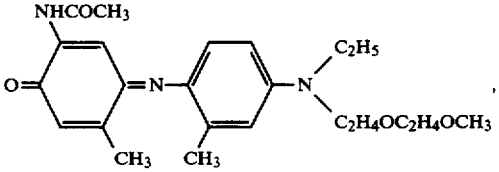
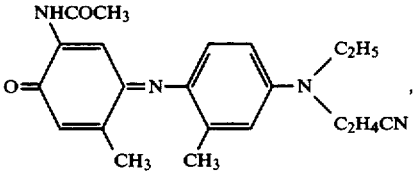
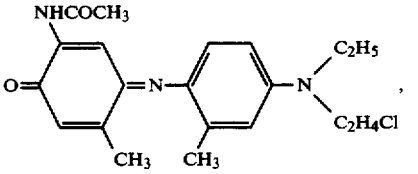
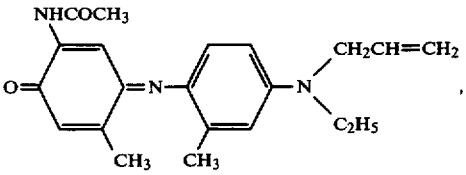
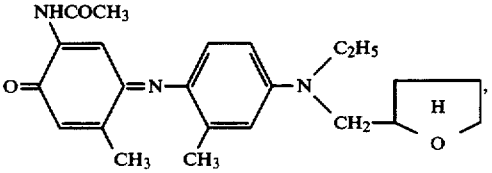
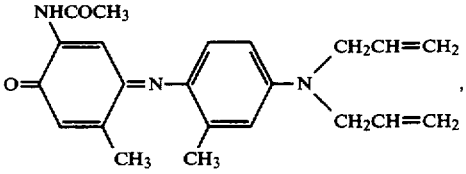

-continued
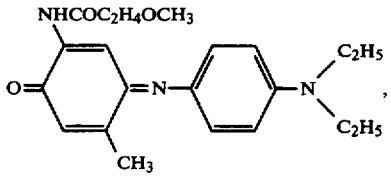
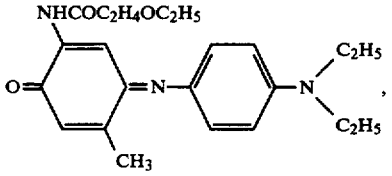
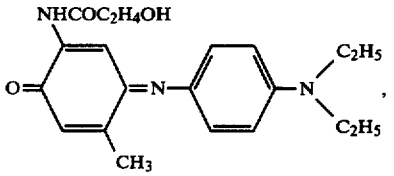
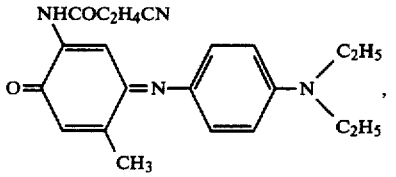
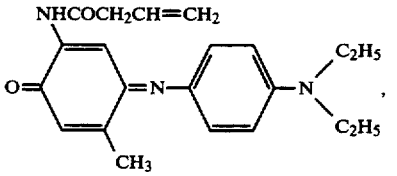
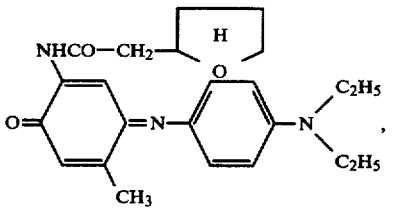
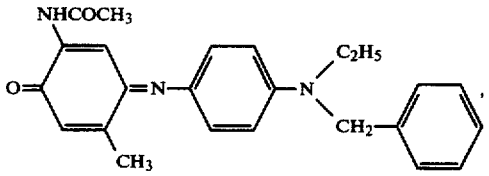
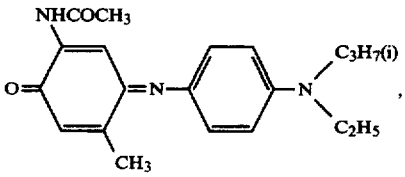
-continued
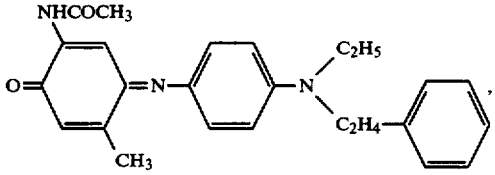
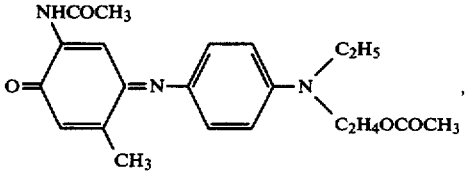
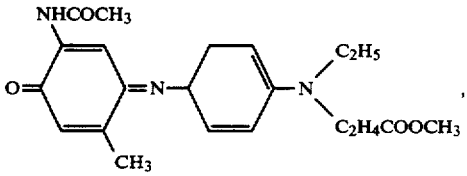
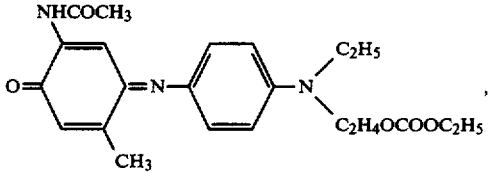
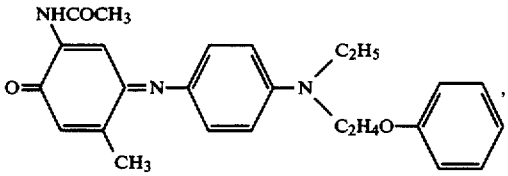
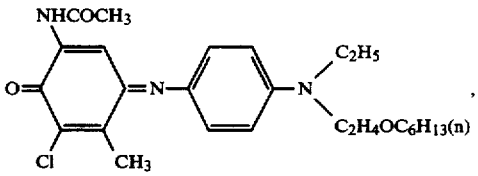
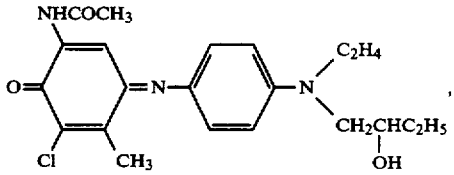
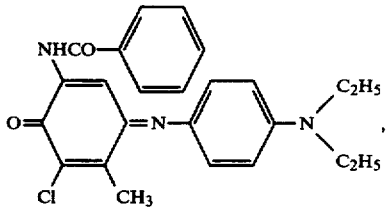

-continued

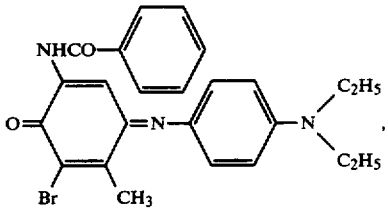

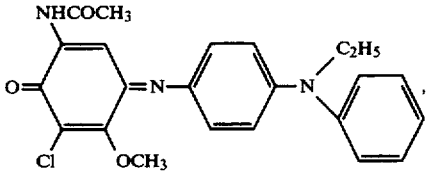

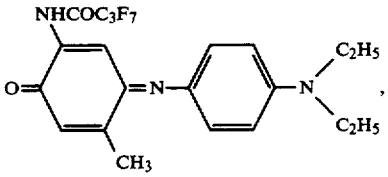

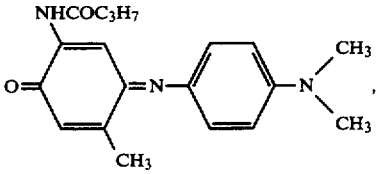

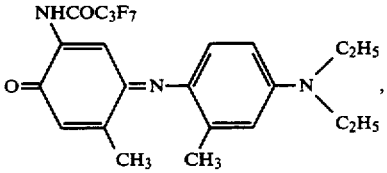

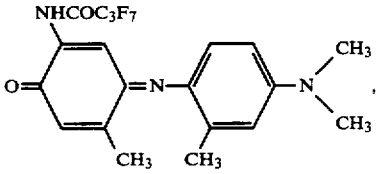

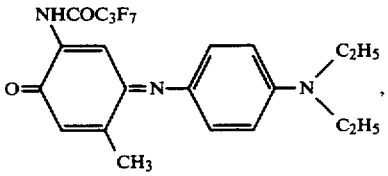

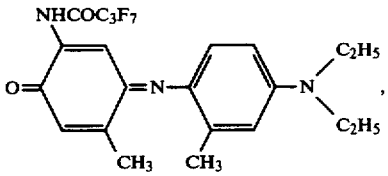

-continued

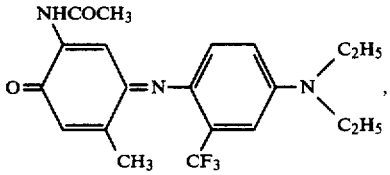

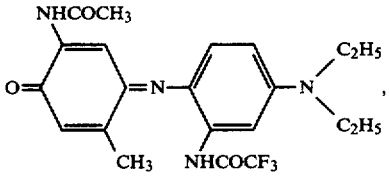

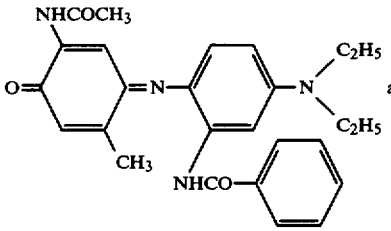

and

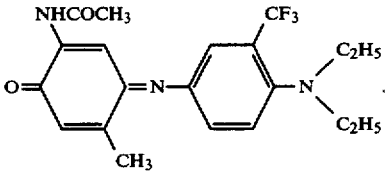

*91. The dye transfer sheet for heat-sensitive transfer recording according to claim 90, wherein the base film is a tissue paper.*

*92. The dye transfer sheet for heat-sensitive transfer recording according to claim 90, wherein the base film is a film of a polyester, polyamide or polyimide.*

*93. The dye transfer sheet for heat-sensitive transfer recording according to claim 92, wherein the base film is a film of a polyethylene terephthalate or polyimide.*

*94. The dye transfer sheet for heat-sensitive transfer recording according to claim 90, wherein the base film is a plastic film providing a heat-resistive layer on a back face thereof.*

*95. The dye transfer sheet for heat-sensitive transfer recording according to claim 90, wherein the base film has a thickness of 3 to 50 μm.*

*96. The dye transfer sheet for heat-sensitive transfer recording according to claim 90, wherein the ink layer has a thickness of 0.1 to 5 μm.*

*97. The dye transfer sheet for heat-sensitive transfer recording according to claim 90, wherein the ink layer is formed in the base film with an ink which is prepared by dissolving or dispersing said dye together with a binder in a water or an organic solvent followed by drying thereof.*

*98. A dye transfer sheet for heat-sensitive transfer recording which has an ink layer containing a sublimable dye and a binder formed on the base film, wherein said dye is of the formula:*

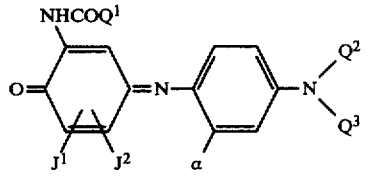

*wherein: —$J^1$ and —$J^2$ each independently represents hydrogen; alkyl; alkyl substituted by fluorine; alkoxy; or halogen, wherein —$J^1$ and —$J^2$ are not both hydrogen, —α represents hydrogen or methyl, —$Q^2$ and —$Q^3$ each independently represents hydrogen, $C_1$–$C_8$ substituted or unsubstituted alkyl, allyl or aryl, and —$Q^1$ represents $C_2$–$C_8$ alkyl, $C_1$–$C_8$ substituted alkyl, allyl or aryl.*

*99. The dye transfer sheet for heat-sensitive transfer recording according to claim 98, wherein the base film is a tissue paper.*

*100. The dye transfer sheet for heat-sensitive transfer recording according to claim 99, wherein the base film is a plastic film providing a heat-resistive layer on a back face thereof.*

*101. The dye transfer sheet for heat-sensitive transfer recording according to claim 99, wherein the base film has a thickness of 3 to 50 μm.*

*102. The dye transfer sheet for heat-sensitive transfer recording according to claim 99, wherein the ink layer has a thickness of 0.1 to 5 μm.*

*103. The dye transfer sheet for heat-sensitive transfer recording according to claim 99, wherein the ink layer is formed in the base film with an ink which is prepared by dissolving or dispersing said dye together with a binder in a water or an organic solvent followed by drying thereof.*

*104. The dye transfer sheet for heat-sensitive transfer recording according to claim 99, wherein the ink layer has a thickness of 0.1 to 5 μm.*

*105. The dye transfer sheet for heat-sensitive transfer recording according to claim 99, wherein the ink layer is formed in the base film with an ink which is prepared by dissolving or dispersing said dye together with a binder in a water or an organic solvent followed by drying thereof.*

*106. The dye transfer sheet for heat-sensitive transfer recording according to claim 98, wherein the base film is a film of a polyester, polyamide or polyimide.*

*107. The dye transfer sheet for heat-sensitive transfer recording according to claim 106, wherein the base film is a film of a polyethylene terephthalate or polyimide.*

*108. The dye transfer sheet for heat-sensitive transfer recording which has an ink layer containing a sublimable dye and a binder formed on the base film, wherein said dye is of the formula:*

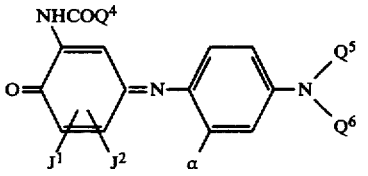

*wherein: —$J^1$ and —$J^2$ each independently represents hydrogen; alkyl; alkyl substituted by fluorine; alkoxy; or halogen, wherein —$J^1$ and —$J^2$ are not both hydrogen, —α represents hydrogen or methyl, one of —$Q^5$ and —$Q^6$ represents $C_3$–$C_8$ alkyl, $C_1$–$C_8$ substituted alkyl, allyl or aryl, and the other of —$Q^5$ and —$Q^6$ represents hydrogen, $C_1$–$C_8$ substituted or unsubstituted alkyl, allyl or aryl, and —$Q^4$ represents hydrogen, $C_1$–$C_8$ substituted alkyl, allyl or aryl.*

*109. The dye transfer sheet for heat-sensitive transfer recording according to claim 108, wherein the base film is a tissue paper.*

*110. The dye transfer sheet for heat-sensitive transfer recording according to claim 108, wherein the base film is a film of a polyester, polyamide or polyimide.*

*111. The dye transfer sheet for heat-sensitive transfer recording according to claim 110, wherein the base film is a film of a polyethylene terephthalate or polyimide.*

*112. The dye transfer sheet for heat-sensitive transfer recording according to claim 108, wherein the base film is a plastic film providing a heat-resistive layer on a back face thereof.*

*113. The dye transfer sheet for heat-sensitive transfer recording according to claim 108, wherein the base film has a thickness of 3 to 50 μm.*

*114. The dye transfer sheet for heat-sensitive transfer recording according to claim 108, wherein the ink layer has a thickness of 0.1 to 5 μm.*

*115. The dye transfer sheet for heat-sensitive transfer recording according to claim 108, wherein the ink layer is formed in the base film with an ink which is prepared by dissolving or dispersing said dye together with a binder in a water or an organic solvent followed by drying thereof.*

*116. The dye transfer sheet for heat-sensitive transfer recording which has an ink layer containing a sublimable dye and a binder formed on the base film, wherein said dye is of the formula:*

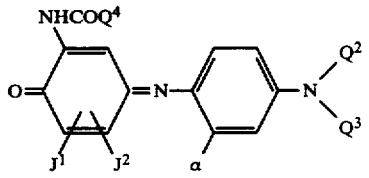

*wherein: —$J^3$ represents hydrogen; alkyl, alkyl substituted by fluorine; alkoxy; or halogen, —$J^4$ represents alkyl having more than 2 carbon atoms; alkyl substituted by fluorine; alkoxy; or halogen, —α represents hydrogen or methyl, and —$Q^4$, —$Q^2$ and —$Q^3$ each independently represents hydrogen, $C_1$–$C_8$ substituted or unsubstituted alkyl, allyl or aryl.*

*117. The dye transfer sheet for heat-sensitive transfer recording according to claim 116, wherein the base film is a tissue paper.*

*118. The dye transfer sheet for heat-sensitive transfer recording according to claim 116, wherein the base film is a film of a polyester, polyamide or polyimide.*

*119. The dye transfer sheet for heat-sensitive transfer recording according to claim 118, wherein the base film is a film of a polyethylene terephthalate or polyimide.*

*120. The dye transfer sheet for heat-sensitive transfer recording according to claim 116, wherein the base film is a plastic film providing a heat-resistive layer on a back face thereof.*

*121. The dye transfer sheet for heat-sensitive transfer recording according to claim 116, wherein the base film has a thickness of 3 to 50 μm.*

*122. The dye transfer sheet for heat-sensitive transfer recording according to claim 116, wherein the ink layer has a thickness of 0.1 to 5 μm.*

*123. The dye transfer sheet for heat-sensitive transfer recording according to claim 116, wherein the ink layer is formed in the base film with an ink which is prepared by*

*dissolving or dispersing said dye together with a binder in a water or an organic solvent followed by drying thereof.*

*124. The dye transfer sheet for heat-sensitive transfer recording which has an ink layer containing a sublimable dye and a binder formed on the base film, wherein said dye is of the formula:*

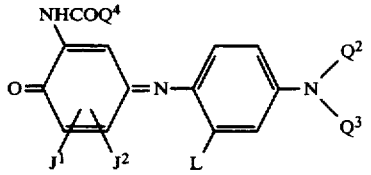

*wherein: —$J^1$ and —$J^2$ each independently represents hydrogen; alkyl, alkyl substituted by fluorine; alkoxy; or halogen, wherein —$J^1$ and —$J^2$ are not both hydrogen, —$Q^4$, —$Q^2$ and —$Q^3$ each independently represents hydrogen, $C_1$–$C_8$ substituted or unsubstituted alkyl, allyl or aryl, —L represents hydrogen; alkyl having more than 2 carbon atoms; alkyl substituted by fluorine; alkoxy; formylamino; alkylcarbonylamino, alkylcarbonylamino substituted by fluorine; arylcarbonylamino; or halogen, provided that —$Q^4$ is not methyl, when —L is hydrogen.*

*125. The dye transfer sheet for heat-sensitive transfer recording according to claim 124, wherein the base film is a tissue paper.*

*126. The dye transfer sheet for heat-sensitive transfer recording according to claim 124, wherein the base film is a film of a polyester, polyamide or polyimide.*

*127. The dye transfer sheet for heat-sensitive transfer recording according to claim 126, wherein the base film is a film of a polyethylene terephthalate or polyimide.*

*128. The dye transfer sheet for heat-sensitive transfer recording according to claim 124, wherein the base film is a plastic film providing a heat-resistive layer on a back face thereof.*

*129. The dye transfer sheet for heat-sensitive transfer recording according to claim 124, wherein the base film has a thickness of 3 to 50 μm.*

*130. The dye transfer sheet for heat-sensitive transfer recording which has an ink layer containing a sublimable dye and a binder formed on the base film, wherein said dye is of the formula:*

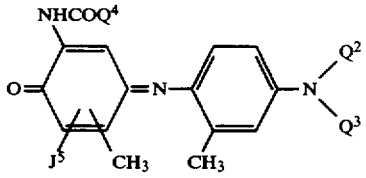

*wherein: —$J^5$ represents hydrogen; alkyl, alkyl substituted by fluorine; alkoxy; bromine; iodine; or fluorine, and —$Q^4$, —$Q^2$ and —$Q^3$ each independently represents hydrogen, $C_1$–$C_8$ substituted or unsubstituted alkyl, allyl, or aryl.*

*131. The dye transfer sheet for heat-sensitive transfer recording according to claim 130, wherein the base film is a tissue paper.*

*132. The dye transfer sheet for heat-sensitive transfer recording according to claim 130, wherein the base film is a film of a polyester, polyamide or polyimide.*

*133. The dye transfer sheet for heat-sensitive transfer recording according to claim 132, wherein the base film is a film of a polyethylene terephthalate or polyimide.*

*134. The dye transfer sheet for heat-sensitive transfer recording according to claim 130, wherein the base film is a plastic film providing a heat-resistive layer on a back face thereof.*

*135. The dye transfer sheet for heat-sensitive transfer recording according to claim 130, wherein the base film has a thickness of 3 to 50 μm.*

*136. The dye transfer sheet for heat-sensitive transfer recording according to claim 130, wherein the ink layer has a thickness of 0.1 to 5 μm.*

*137. The dye transfer sheet for heat-sensitive transfer recording according to claim 130, wherein the ink layer is formed in the base film with an ink which is prepared by dissolving or dispersing said dye together with a binder in a water or an organic solvent followed by drying thereof.*

*138. A dye transfer sheet for heat-sensitive transfer recording which has an ink layer containing a sublimable dye and a binder formed on a base film, said sublimable dye being of the formula:*

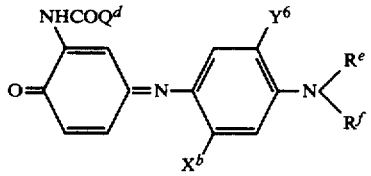

*where —$R^d$, —$R^e$ and —$R^f$ each represents hydrogen, $C_1$–$C_8$ substituted or unsubstituted alkyl, allyl or aryl, —$X^b$ represents hydrogen, alkyl, alkyl substituted by fluorine, alkoxy, formylamino, alkylcarbonylamino, alkylcarbonylamino substituted by fluorine, arylcarbonylamino, arylcarbonylamino substituted by fluorine, arylcarbonylamino or halogen, and —$Y^6$ represents hydrogen, alkyl, alkyl substituted by fluorine, alkoxy or halogen.*

*139. The dye transfer sheet for heat-sensitive transfer recording according to claim 138, wherein the base film is a tissue paper.*

*140. The dye transfer sheet for heat-sensitive transfer recording according to claim 138, wherein the base film is a film of a polyester, polyamide or polyimide.*

*141. The dye transfer sheet for heat-sensitive transfer recording according to claim 140, wherein the base film is a film of a polyethylene terephthalate or polyimide.*

*142. The dye transfer sheet for heat-sensitive transfer recording according to claim 138, wherein the base film is a plastic film providing a heat-resistive layer on a back face thereof.*

*143. The dye transfer sheet for heat-sensitive transfer recording according to claim 138, wherein the base film has a thickness of 3 to 50 μm.*

*144. The dye transfer sheet for heat-sensitive transfer recording according to claim 138, wherein the ink layer has a thickness of 0.1 to 5 μm.*

*145. The dye transfer sheet for heat-sensitive transfer recording according to claim 138, wherein the ink layer is formed in the base film with an ink which is prepared by dissolving or dispersing said dye together with a binder in a water or an organic solvent followed by drying thereof.*

*146. A dye transfer sheet for heat-sensitive transfer recording which has an ink layer containing a sublimable dye and a binder formed on the base film, said sublimable dye being of the formula:*

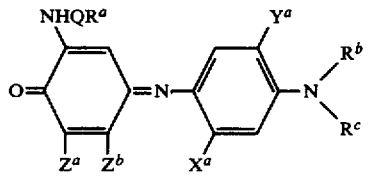

*wherein: Q is —CO—; $Z^a$ and $Z^b$ are each independently hydrogen, methyl, trifluoromethyl, trifluoroethyl, methoxy, ethoxy, chlorine, or bromine, wherein $Z^a$ and $Z^b$ are not both hydrogen; $X^a$ is hydrogen, methyl, methoxy, trifluoromethyl, chlorine, iodine, bromine, fluorine, formylamino, or propionylamino; $Y^a$ is hydrogen, methyl, methoxy, chlorine, bromine or fluorine; $R^a$ is $C_1$–$C_8$ unsubstituted or substituted alkyl, allyl, trifluoromethyl, or phenyl; and either of $R^b$ and $R^c$ is $C_1$–$C_8$ substituted alkyl and the rest of them is hydrogen or $C_1$–$C_8$ substituted or unsubstituted alkyl.*

*147. The dye transfer sheet for heat-sensitive transfer recording according to claim 146, wherein the base film is a tissue paper.*

*148. The dye transfer sheet for heat-sensitive transfer recording according to claim 146, wherein the base film is a film of a polyester, polyamide or polyimide.*

*149. The dye transfer sheet for heat-sensitive transfer recording according to claim 148, wherein the base film is a film of a polyethylene terephthalate or polyimide.*

*150. The dye transfer sheet for heat-sensitive transfer recording according to claim 146, wherein the base film is a plastic film providing a heat-resistive layer on a back face thereof.*

*151. The dye transfer sheet for heat-sensitive transfer recording according to claim 146, wherein the base film has a thickness of 3 to 50 μm.*

*152. The dye transfer sheet for heat-sensitive transfer recording according to claim 146, wherein the ink layer has a thickness of 0.1 to 5 μm.*

*153. The dye transfer sheet for heat-sensitive transfer recording according to claim 146, wherein the ink layer is formed in the base film with an ink which is prepared by dissolving or dispersing said dye together with a binder in a water or an organic solvent followed by drying thereof.*

*154. The dye transfer sheet for heat-sensitive transfer recording which has an ink layer containing a sublimable dye and a binder formed on the base film, said sublimable dye being of the formula:*

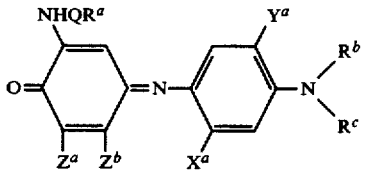

*wherein: Q is —CO—; $Z^a$ is hydrogen, methyl, trifluoromethyl, trifluoroethyl, methoxy, ethoxy, chlorine, or bromine, $Z^b$ is ethyl, trifluoromethyl, trifluoroethyl, methoxy, ethoxy, chlorine, or bromine, wherein $Z^a$ and $Z^b$ are not both hydrogen; $X^a$ is hydrogen, methyl, methoxy, trifluoromethyl, chlorine, iodine, bromine, fluorine, formylamino, or propionylamino; $Y^a$ is hydrogen, methyl, methoxy, chlorine, bromine or fluorine; $R^a$ is $C_1$–$C_8$ unsubstituted or substituted alkyl, allyl, trifluoromethyl, or phenyl; and $R^b$ and $R^c$ are each independently hydrogen or $C_1$–$C_8$ substituted or unsubstituted alkyl, wherein $R^b$ and $R^c$ are not both hydrogen.*

*155. The dye transfer sheet for heat-sensitive transfer recording according to claim 154, wherein the base film is a tissue paper.*

*156. The dye transfer sheet for heat-sensitive transfer recording according to claim 154, wherein the base film is a film of a polyester, polyamide, or polyimide.*

*157. The dye transfer sheet for heat-sensitive transfer recording according to claim 156, wherein the base film is a film of a polyethylene terephthalate or polyimide.*

*158. The dye transfer sheet for heat-sensitive transfer recording according to claim 154, wherein the base film is a plastic film providing a heat-resistive layer on a back face thereof.*

*159. The dye transfer sheet for heat-sensitive transfer recording according to claim 154, wherein the base film has a thickness of 3 to 50 μm.*

*160. The dye transfer sheet for heat-sensitive transfer recording according to claim 154, wherein the ink layer has a thickness of 0.1 to 5 μm.*

*161. The dye transfer sheet for heat-sensitive transfer recording according to claim 154, wherein the ink layer is formed in the base film with an ink which is prepared by dissolving or dispersing said dye together with a binder in a water or an organic solvent followed by drying thereof.*

*162. The dye transfer sheet for heat-sensitive transfer recording which has an ink layer containing a sublimable dye and a binder formed on the base film, said sublimable dye being of the formula:*

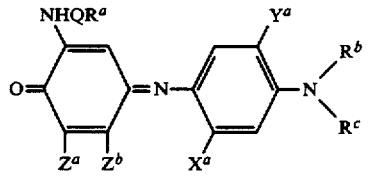

*wherein: Q is —CO—; $Z^a$ and $Z^b$ are each independently hydrogen, methyl, trifluoromethyl, trifluoroethyl, methoxy, ethoxy, chlorine, or bromine, and $Z^a$ and $Z^b$ are not both hydrogen; $X^a$ is ethyl, methoxy, trifluoromethyl, chlorine, iodine, bromine, fluorine, formylamino, or propionylamino; $Y^a$ is hydrogen; $R^a$ is $C_1$–$C_8$ unsubstituted or substituted alkyl, allyl, trifluoromethyl, or phenyl; and $R^b$ and $R^c$ are each independently hydrogen or $C_1$–$C_8$ substituted or unsubstituted alkyl, wherein $R^b$ and $R^c$ are not both hydrogen.*

*163. The dye transfer sheet for heat-sensitive transfer recording according to claim 162, wherein the base film is a tissue paper.*

*164. The dye transfer sheet for heat-sensitive transfer recording according to claim 162, wherein the base film is a film of a polyester, polyamide or polyimide.*

*165. The dye transfer sheet for heat-sensitive transfer recording according to claim 164, wherein the base film is a film of a polyethylene terephthalate or polyimide.*

*166. The dye transfer sheet for heat-sensitive transfer recording according to claim 162, wherein the base film is a plastic film providing a heat-resistive layer on a back face thereof.*

*167. The dye transfer sheet for heat-sensitive transfer recording according to claim 162, wherein the base film has a thickness of 3 to 50 μm.*

*168. The dye transfer sheet for heat-sensitive transfer recording according to claim 162, wherein the ink layer has a thickness of 0.1 to 5 μm.*

*169. The dye transfer sheet for heat-sensitive transfer recording according to claim 162, wherein the ink layer is formed in the base film with an ink which is prepared by dissolving or dispersing said dye together with a binder in a water or an organic solvent followed by drying thereof.*

* * * * *